US010932573B2

(12) United States Patent
Masunaga et al.

(10) Patent No.: US 10,932,573 B2
(45) Date of Patent: Mar. 2, 2021

(54) BACKREST, LUMBAR SUPPORT, CHAIR, ATTACHMENT STRUCTURE FOR OPTIONAL MEMBER, OPTIONAL MEMBER, AND FURNITURE

(71) Applicant: OKAMURA CORPORATION, Yokohama (JP)

(72) Inventors: Hiroshi Masunaga, Yokohama (JP); Shinpei Totsuka, Yokohama (JP)

(73) Assignee: OKAMURA CORPORATION, Yokohama (JP)

( * ) Notice: Subject to any disclaimer, the term of this patent is extended or adjusted under 35 U.S.C. 154(b) by 60 days.

(21) Appl. No.: 16/307,795

(22) PCT Filed: Jun. 9, 2017

(86) PCT No.: PCT/JP2017/021467
§ 371 (c)(1),
(2) Date: Dec. 6, 2018

(87) PCT Pub. No.: WO2017/213251
PCT Pub. Date: Dec. 14, 2017

(65) Prior Publication Data
US 2019/0298069 A1     Oct. 3, 2019

(30) Foreign Application Priority Data

Jun. 10, 2016 (JP) .............................. JP2016-116113
Apr. 3, 2017 (JP) .............................. JP2017-074011
Apr. 3, 2017 (JP) .............................. JP2017-074012

(51) Int. Cl.
*A47C 7/40* (2006.01)
*A47C 7/46* (2006.01)
*A47C 7/02* (2006.01)

(52) U.S. Cl.
CPC ................ *A47C 7/462* (2013.01); *A47C 7/02* (2013.01); *A47C 7/40* (2013.01); *A47C 7/46* (2013.01)

(58) Field of Classification Search
CPC .. A47C 7/462; A47C 7/40; A47C 7/46; A47C 7/02
(Continued)

(56) References Cited

U.S. PATENT DOCUMENTS

2004/0124689 A1* 7/2004 Numa ................... A47C 31/023
                                                                    297/452.56
2005/0062323 A1   3/2005 Dicks
2017/0267145 A1* 9/2017 Gonzalez Uribe et al. ..................
                                                                    B60N 2/686

FOREIGN PATENT DOCUMENTS

DE   202004011519 U1   11/2004
JP   A-10-211051          8/1998
(Continued)

OTHER PUBLICATIONS

Japanese Office Action in JP Application No. 2016-116113, dated Nov. 5, 2019.
(Continued)

*Primary Examiner* — Mark R Wendell
(74) *Attorney, Agent, or Firm* — Nixon Peabody LLP; Jeffrey L. Costellia

(57) ABSTRACT

A backrest (7) includes: a tensile material (71) on which a load support surface (71*f*) configured to receive a load of a seated person is formed; a back front frame (80F) that supports an outer peripheral end portion (71*e*) of the tensile material (71); an attachment portion (87) which is formed in the back front frame (80F) and faces the tensile material (71) in a state where the attachment portion (87) is separated from the tensile material (71) in a direction intersecting the load support surface (71*f*); and a lumber support (200) that
(Continued)

is attachable to and detachable from the attachment portion (87), in which the lumber support (200) includes an attaching portion (222) which extends in a direction along the load support surface (71*f*), is inserted into a gap (S) between the tensile material (71) and the attachment portion (87), and is fixed to the attachment portion (87).

13 Claims, 41 Drawing Sheets

(58) Field of Classification Search
USPC .................................................. 297/284.5
See application file for complete search history.

(56) References Cited

FOREIGN PATENT DOCUMENTS

| JP | 2004-049656 | 2/2004 |
|---|---|---|
| JP | B-4133067 | 8/2008 |
| JP | A-2012-152569 | 8/2012 |
| JP | 2012-250078 | 12/2012 |
| JP | A-2013-094287 | 5/2013 |
| JP | B-5474118 | 4/2014 |
| JP | A-2014-079492 | 5/2014 |
| JP | A-2015-093085 | 5/2015 |
| JP | A-2015-144643 | 8/2015 |
| JP | B-5823818 | 11/2015 |

OTHER PUBLICATIONS

European Search Report (Application No. 17810424.6) dated Nov. 21, 2019.
International Search Report for PCT/JP2017/021467 dated Sep. 12, 2017.
Japanese Office Action (Application No. 2017-074011) dated Oct. 6, 2020.
Japanese Notice of Allowance (Application No. 2017-074012) dated Oct. 6, 2020.

* cited by examiner

FIG. 19
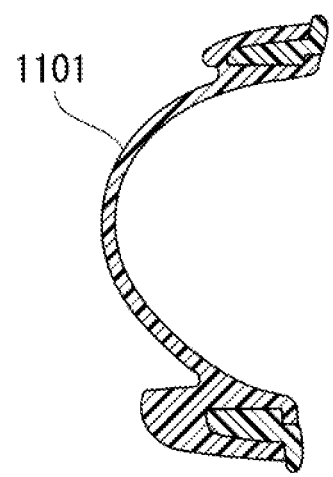
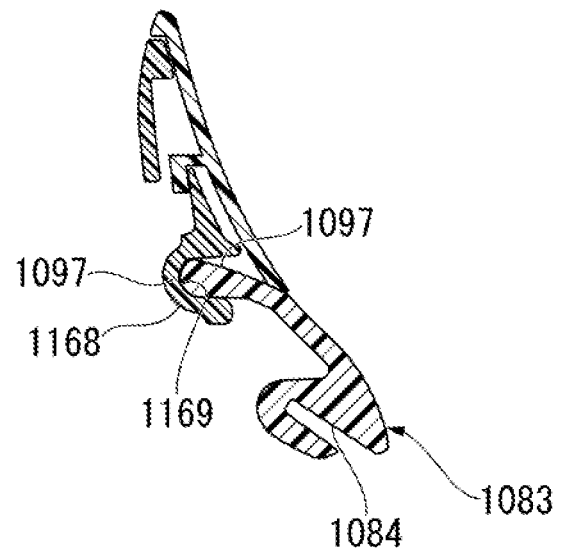

FIG. 25
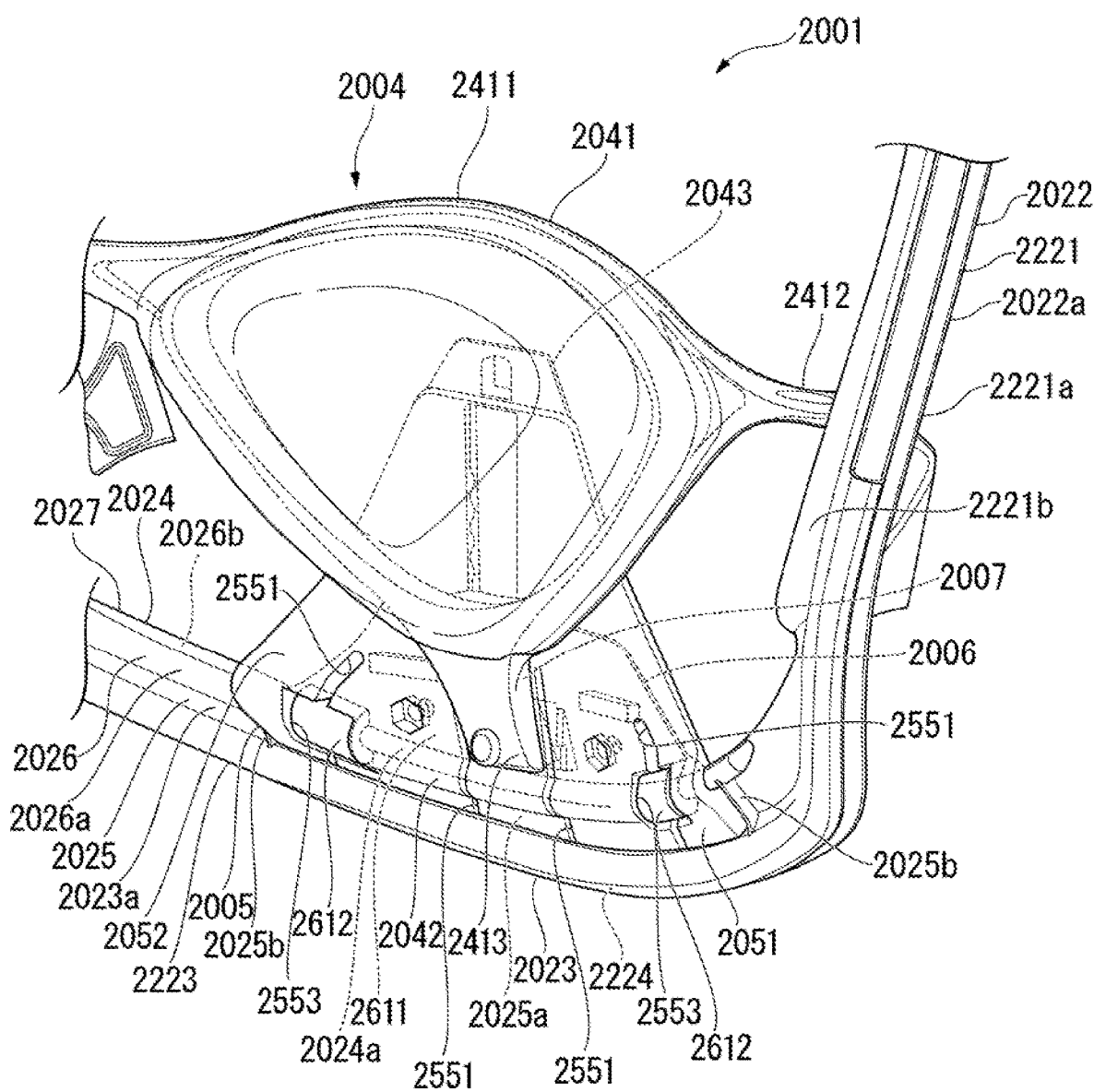
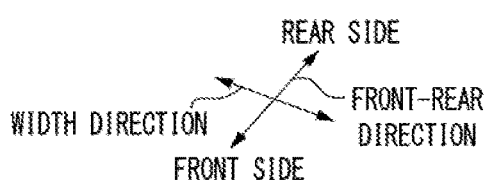

FIG. 26
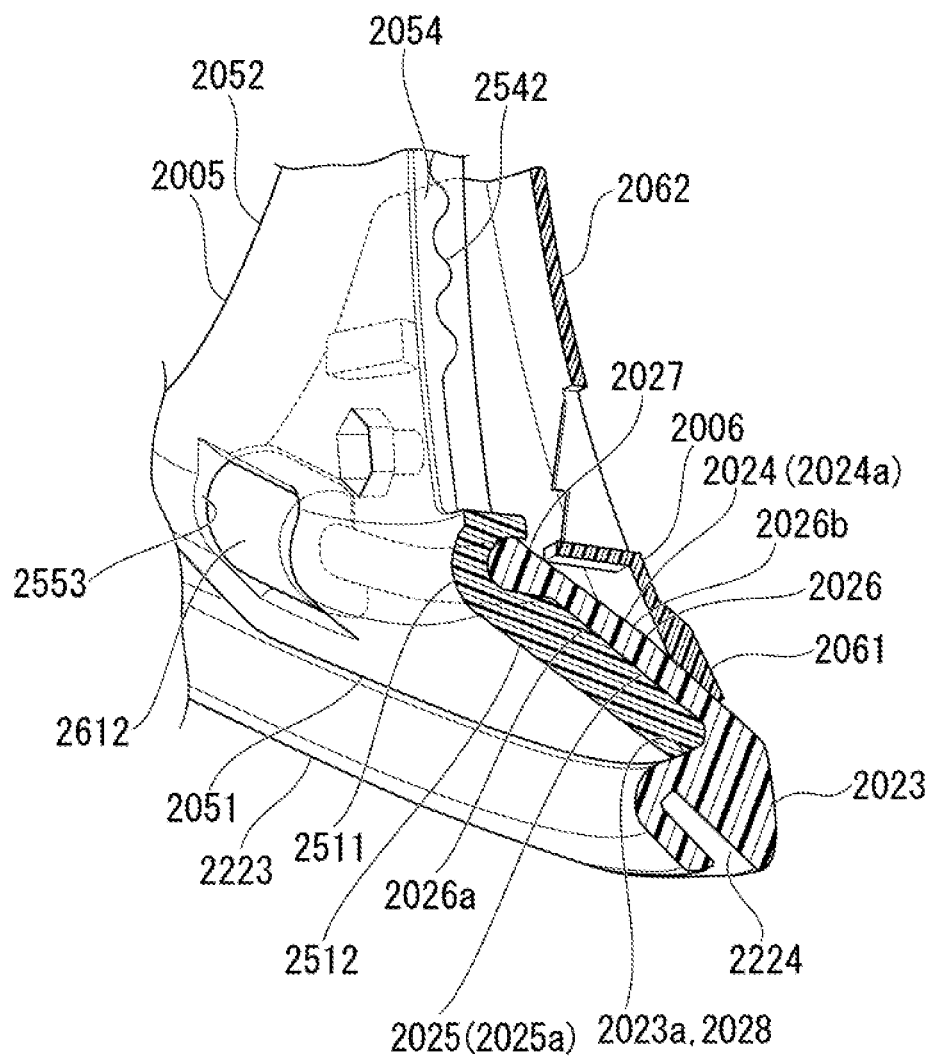
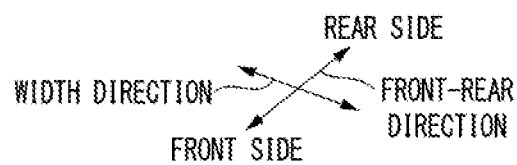

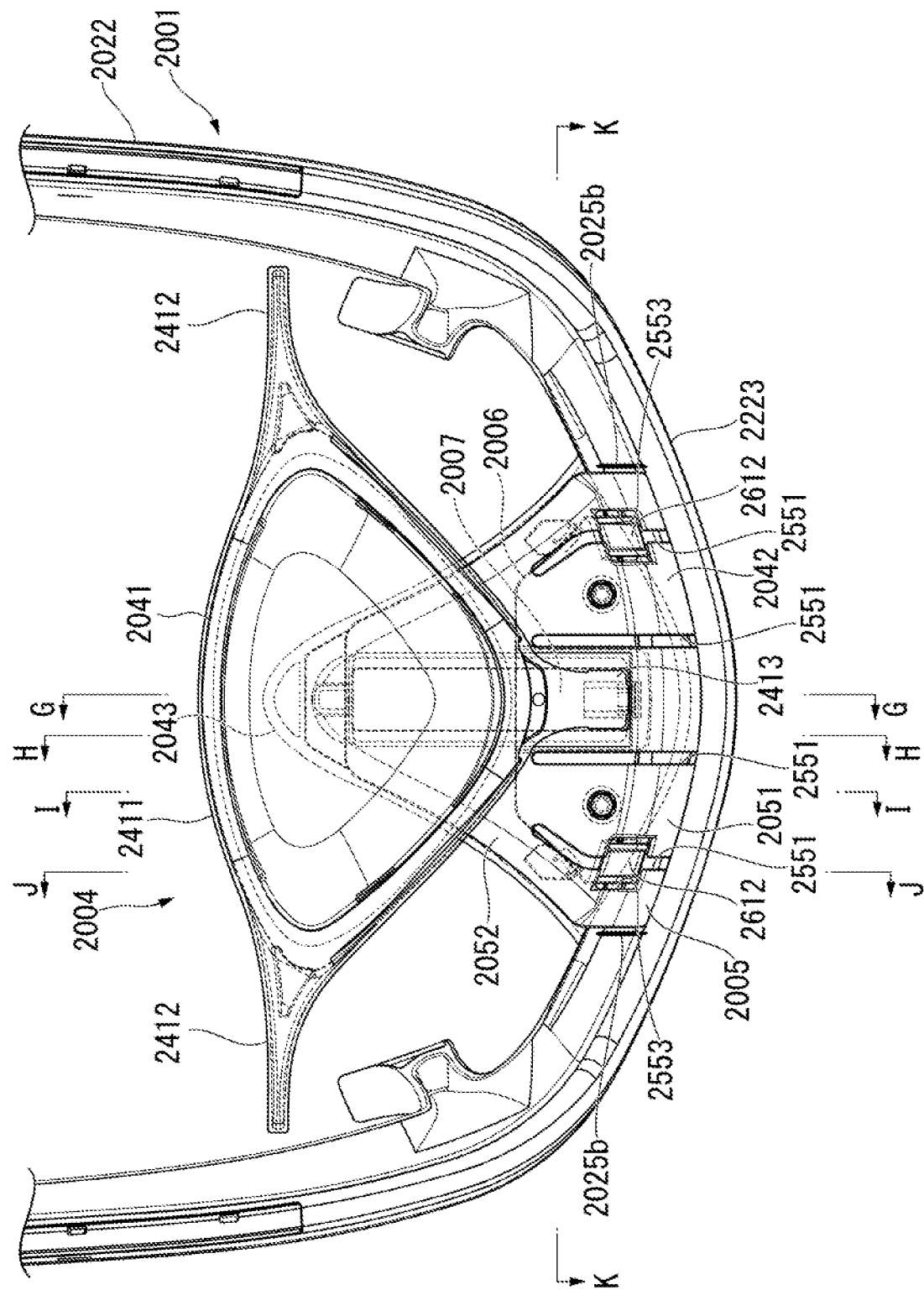

FRONT SIDE ←----→ REAR SIDE

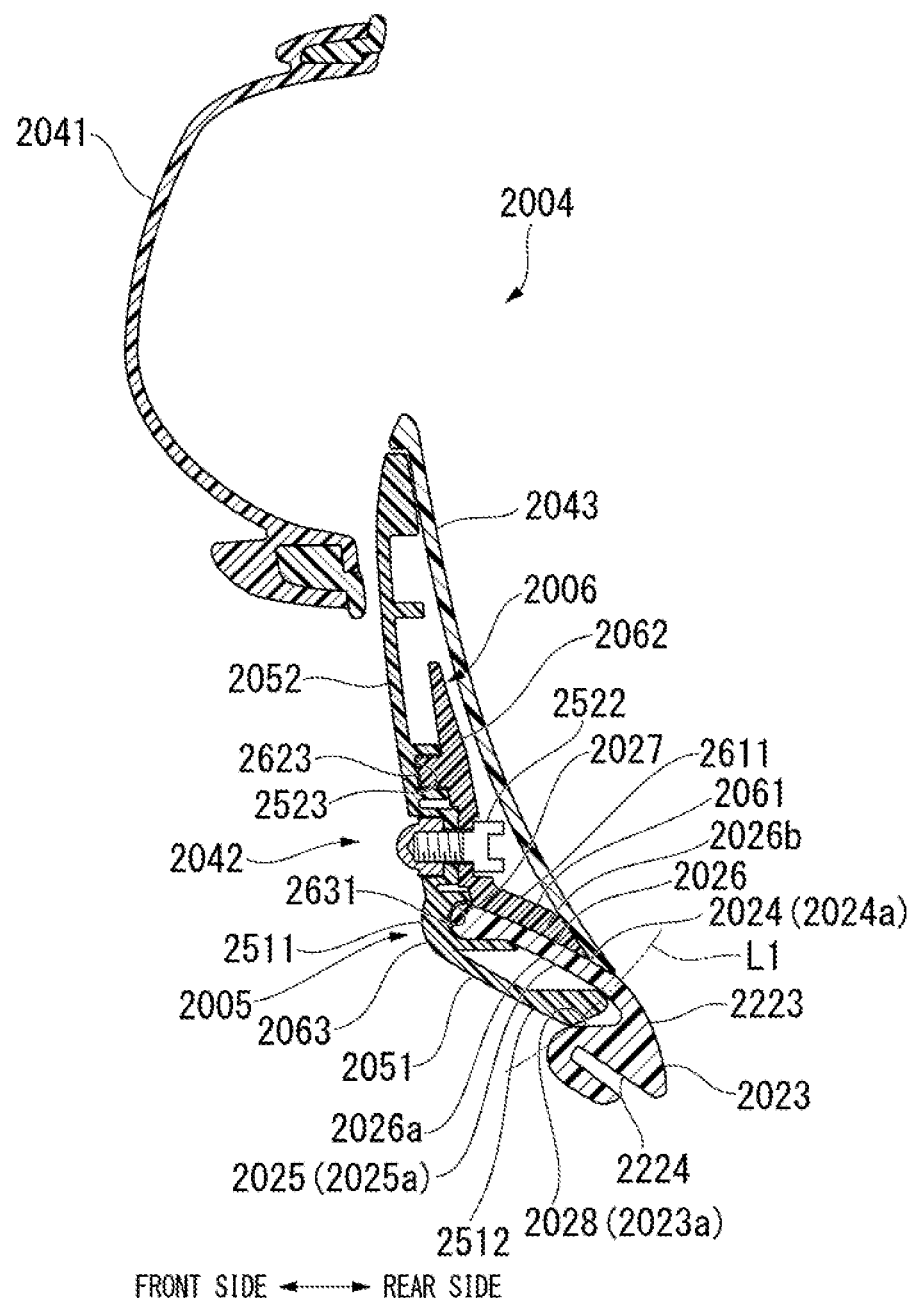

FRONT SIDE ←→ REAR SIDE

BACKREST, LUMBAR SUPPORT, CHAIR, ATTACHMENT STRUCTURE FOR OPTIONAL MEMBER, OPTIONAL MEMBER, AND FURNITURE

TECHNICAL FIELD

The present invention relates to a backrest, a lumbar support, a chair, an attachment structure for an optional member, an optional member, and furniture.

Priority is claimed on Japanese Patent Application No. 2016-116113 filed Jun. 10, 2016, Japanese Patent Application No. 2017-074011 filed Apr. 3, 2017, and Japanese Patent Application No. 2017-074012 filed Apr. 3, 2017, the contents of which are incorporated herein by reference.

BACKGROUND ART

As described in Patent Document 1, a chair in which a backrest is provided in front of a backrest support frame rising from a rear portion of a seat surface and the backrest includes a net-shaped tensile material, a back frame holding an outer peripheral portion of the tensile material, and a lumbar support provided behind the tensile material is known. In this configuration, the lumbar support is attached to a lumbar support holding portion which extends upward from a lower portion of the back frame and is integrally formed with the back frame.

In such a chair, if the lumbar support is set as an optional member to be selectively attached to the chair, even when the lumbar support is not attached to the chair, the lumbar support holding portion integrally formed with the back frame remains and hence an appearance is impaired.

In contrast, for example, as shown in Patent Document 2, there is proposed a chair having a configuration in which both end portions of a lumbar support in a width direction are supported to be attachable or detachable by side frame bars provided at both left and right sides of a back frame via a pair of left and right holding members.

In the chair with this configuration, a convex portion provided in each holding member is fitted to a concave portion formed in the corresponding side frame bar so that the holding member for supporting the end portion of the lumbar support is attachable to or detachable from the side frame bar.

Further, conventionally, there are cases in which the backrest of the chair is provided with a lumbar support, a headrest, or a hanger as an optional member.

For example, Patent Document 3 discloses a chair (furniture) in which an optional member such as a hanger or a headrest can be strongly and easily attached to a backrest. The optional member disclosed in Patent Document 3 can be attached to an attached surface of a main body support member of the backrest of the chair by surface contact.

Further, Patent Document 4 discloses a chair (furniture) in which attachment, replacement, and positional adjustment of an optional member can be easily performed. In the chair disclosed in Patent Document 4, an upper frame of the backrest is held between a front attaching member and a rear attaching member of an attachment member of a hanger (optional member) while the front attaching member and the rear attaching member both contact a contact surface of the upper frame.

Further, in the backrest disclosed in Patent Documents 4 and 5, an optional member is attached to a frame member for supporting a surface material which receives a load of a seated person. The optional member includes an attaching portion attached to the frame member. The attaching portion disclosed in Patent Documents 4 and 5 is joined to the frame member by a bolt while the frame member is sandwiched by two members.

Since the frame member is provided with a surface material support portion for supporting the surface material, the attaching portion is provided with an opening portion in which the surface material support portion is disposed so as not to interfere with the surface material support portion.

Further, the backrest disclosed in Patent Document 5 is attached to the frame member while a convex portion formed in the attaching portion is inserted into a groove portion formed in the frame member.

Document of Related Art

Patent Document

Patent Document 1: Japanese Patent No. 4133067
Patent Document 2: Japanese Patent No. 5823818
Patent Document 3: Japanese Unexamined Patent Application, First Publication No. 2014-079492
Patent Document 4: Japanese Unexamined Patent Application, First Publication No. 2015-144643
Patent Document 5: Japanese Patent No. 5474118

SUMMARY OF INVENTION

Technical Problem

However, in the configuration disclosed in Patent Document 2, the concave portion formed in the side frame bar is formed to be recessed rearward from a position facing the front tensile material in the side frame bar.

Thus, in order to attach the holding member to the side frame bar, the holding member needs to be inserted into a gap between the tensile material and the side frame bar, and then the holding member is pressed rearward so that the convex portion of the holding member is fitted to the concave portion of the side frame bar. Since the gap between the tensile material and the side frame bar in the front-rear direction is small, an operation of attaching the holding member is complicated.

Such a problem is not limited to the lumbar support and is also common to a case in which another optional member is attached to the backrest.

Further, an attachment portion of the optional member formed in the conventional chairs of Patent Document 3 and Patent Document 4 includes a bent or curved portion which is bent or curved in various directions including the front-rear direction or the vertical direction, or a protruding portion, in order to harmonize with the design of the entire chair or to follow the body shape of the seated person to enhance the comfort at the time of sitting. Further, the optional attachment member or the optional member attached to the attachment portion has a shape matching the above-described shape of the attachment portion.

However, when the optional member or the optional attachment member is molded by a die, there are cases in which the shape of the attachment portion does not completely fit to the shape of the above-described member due to factors such as tolerance at molding (i.e., surface contact cannot be performed or the area of surface contact is very small). When the optional member or the optional attachment member is attached to the attachment portion of the backrest while the shapes of both members do not fit to each other in this way, there is a possibility that rattling or local overload may occur. As a result, there is a possibility that the attachment state between the optional member and the attachment portion is not robustly maintained.

Further, when a load is applied to the optional member and moment caused by the load is applied to the attaching portion in a rotation direction so as to be separated from the frame member, a force is applied in a direction in which the attaching portion is separated from the frame member through the opening portion of the attaching portion. For this reason, there is a demand for a structure that more reliably prevents the optional member from being separated from the frame member due to the moment caused by the load applied to the optional member.

Further, even when the convex portion formed in the attaching portion is inserted into the groove portion formed in the frame member, as in the backrest disclosed in Patent Document 5, the protruding direction of the convex portion of the attaching portion becomes opposite to the direction of the applied moment. In this case, the convex portion may be separated from the groove portion due to the moment caused by the load applied to the optional member, and therefore there is a demand for a structure that more reliably prevents the optional member from being separated from the frame member.

The present invention has been made in view of the above-described circumstances and an object of the present invention is to provide a backrest, a lumbar support, and a chair capable of improving workability when an optional member such as the lumbar support is attached to the backrest.

Further, the present invention has been made in view of the above-described circumstances and an object of the present invention is to provide an attachment structure for an optional member capable of robustly maintaining an attachment state between an optional member and an attachment portion.

Further, an object of the present invention is to provide a backrest capable of more reliably preventing an optional member from being separated from a frame member due to moment caused by a load applied to the optional member.

Solution to Problem

A backrest according to an aspect of the present invention includes: a tensile material on which a load support surface configured to receive a load of a seated person is formed; a frame member that supports an outer peripheral end portion of the tensile material; an attachment portion which is formed in the frame member and faces the tensile material in a state where the attachment portion is separated from the tensile material in a direction intersecting the load support surface; and an optional member that is attachable to and detachable from the attachment portion, in which the optional member includes an attaching portion which extends in a direction along the load support surface, is inserted into a gap between the tensile material and the attachment portion, and is fixed to the attachment portion.

According to such a configuration, the attachment portion that is separated from and faces the tensile material is provided in the frame member, and the attaching portion of the optional member is inserted into the gap between the tensile material and the attachment portion to be fixed thereto. Accordingly, an attachment operation of the optional member to the frame member can be easily performed by inserting the attaching portion of the optional member into the gap between the tensile material and the attachment portion in a direction along the load support surface of the tensile material.

Further, in the backrest according to the present invention, the attachment portion may protrude from the frame member along the load support surface.

With such a configuration, the attaching portion of the optional member is inserted into the gap between the tensile material and the attachment portion protruding from the frame member along the load support surface to be fixed thereto. Accordingly, since the attaching portion of the optional member is covered by the attachment portion of the frame member when the backrest is viewed from the opposite side to the tensile material with respect to the frame member, an appearance is improved.

Further, in the backrest according to the present invention, the frame member may include a concave portion which is disposed on a side facing the tensile material with respect to the attachment portion and accommodates the attaching portion.

According to such a configuration, since the attaching portion is accommodated in the concave portion, it is possible to prevent the attaching portion of the optional member from being exposed to the outside and to improve an appearance.

Further, in the backrest according to the present invention, the optional member may include: a first member that includes the attaching portion; a second member that is disposed on a side separated from the tensile material with respect to the attachment portion; and a connection member that connects the first member and the second member to each other in a state where the attachment portion is sandwiched between the attaching portion of the first member and the second member.

In this way, when the first member and the second member are connected to each other by the connection member while the attachment portion is sandwiched by the first member, the attaching portion, and the second member, the optional member can be strongly attached to the attachment portion of the frame member.

Further, in the backrest according to the present invention, the optional member may be a lumbar support.

According to such a configuration, the attachment operation of the lumbar support to the backrest is performed by inserting the attaching portion into the gap between the tensile material and the attachment portion in a direction along the load support surface of the tensile material, and hence the attachment operation of the lumbar support can be easily performed.

Further, a lumbar support of the present invention is attachable to or detachable from a backrest including a tensile material on which a load support surface configured to receive a load of a seated person is formed and a frame member which supports an outer peripheral end portion of the tensile material, the frame member including an attachment portion which faces the tensile material in a state where the attachment portion is separated from the tensile material in a direction intersecting the load support surface, the lumbar support including: an attaching portion which extends in a direction along the load support surface, is inserted into a gap between the tensile material and the attachment portion, and is fixed to the attachment portion; and a lumbar support main body which is supported by the attaching portion and is disposed at a rear side of the tensile material.

With such a configuration, the attachment operation of the lumbar support to the backrest is performed by inserting the attaching portion into the gap between the tensile material and the attachment portion in a direction along the load support surface of the tensile material, and hence the attachment operation of the lumbar support can be easily performed.

A chair according to the present invention includes: a support structure which is installed on a floor; a seat body which is supported by the support structure; and the backrest supported by the support structure.

According to such a chair, the attachment operation of the optional member such as the lumbar support to the backrest is performed by inserting the attaching portion into the gap between the tensile material and the attachment portion in a direction along the load support surface of the tensile material, and hence the attachment operation of the optional member can be easily performed.

Further, an attachment structure for an optional member according to the present invention is attachable to an attached surface of furniture, and includes an attaching portion which is capable of being displaced so as to accord with a shape of the attached surface while contacting the attached surface.

According to the above-described configuration, since the attaching portion is displaced so as to accord with the shape of the attached surface while contacting the attached surface, the attaching portion can be attached to the attached surface to remove a gap caused by a difference in shape between the attached surface and a contact surface (hereinafter, simply referred to as a contact surface) of the attaching portion of the optional member facing the attached surface. Accordingly, even when there is a difference in shape between the attachment portion and the optional member, it is possible to satisfactorily attach the optional member to the attached surface and to robustly maintain the attachment state between the optional member and the attachment portion.

Further, the attachment structure for the optional member according to the present invention may further include an optional main body which is attached to the attaching portion in a freely attachable and detachable manner.

According to the above-described configuration, since the attaching portion is attached to the attaching portion in a freely detachable manner, it is possible to manufacture, in a compact size, a portion to be displaced so as to accord with the shape of the attached surface separately from the optional main body, and to replace only the attaching portion if necessary at the time of inspection or breakage.

Further, in the attachment structure for the optional member according to the present invention, a cutout which penetrates the attaching portion in a thickness direction of the attaching portion and extends from a center of the attaching portion toward an outer periphery of the attaching portion may be formed in the attaching portion.

According to the above-described configuration, it is possible to obtain a structure in which the attaching portion is easily displaceable in the thickness direction (a direction toward or away from the attached surface). Further, it is possible to easily set the displacement amount of the attaching portion in design merely by appropriately setting the length and the number of the cutouts.

Further, in the attachment structure for the optional member according to the present invention, the cutout may reach the outer periphery of the attaching portion and may open outward from the outer periphery, the attaching portion may include a plurality of division portions divided by the cutout, and each of the plurality of division portions may be capable of being displaced so as to accord with the shape of the attached surface.

According to the above-described configuration, it is possible to obtain a structure in which the attaching portion is more easily displaced in the thickness direction. Further, it is possible to obtain a structure in which the attaching portion is easily displaced also in a direction intersecting the extension direction of the cutout.

Further, in the attachment structure for the optional member according to the present invention, the attaching portion may be integrally formed with the optional member and may be elastically deformed to contact the attached surface.

According to the above-described configuration, since the configuration of the attaching portion is simplified, it is possible to reduce the manufacturing cost of the attaching portion.

An optional member according to the present invention includes the attachment structure for the optional member.

According to the above-described configuration, even when there is a difference in shape between the attached surface and the contact surface of the optional member, it is possible to satisfactorily attach the optional member to the attached surface and to robustly maintain the attachment state between the optional member and the attachment portion.

Furniture according to the present invention includes the optional member.

According to the above-described configuration, even when there is a difference in shape between the attachment portion and the optional member, it is possible to satisfactorily attach the optional member to the attached surface and to robustly maintain the attachment state between the optional member and the attachment portion in the furniture.

A backrest according to another aspect of the present invention includes: a surface material that is configured to receive a load of a seated person; a frame member that supports an outer peripheral end portion of the surface material; and an optional member that is attached to the frame member and configured to receive a load applied from a first side to a second side in a surface perpendicular direction of the surface material, in which the frame member includes: a base portion which supports the surface material; a first locking portion which protrudes from the base portion to the first side in the surface perpendicular direction, and has a bulging portion formed at a tip end portion of the first locking portion and bulging in relation to a base end side of the first locking portion; and a second locking portion which is surrounded by the base portion and the first locking portion, and is formed in a concave shape to open to the first side in the surface perpendicular direction, in which the optional member includes: a main body portion which is configured to receive a load applied from the first side to the second side in the surface perpendicular direction; and an attaching portion which is attached to the frame member and supports the main body portion, in which the attaching portion includes: a first engaged portion which is fitted to the bulging portion from the first side in the surface perpendicular direction and sandwiches the first locking portion in a direction perpendicular to the surface perpendicular direction; and a second engaged portion which is formed, on a side separated from the main body portion with respect to the first engaged portion, to be continuous with the first engaged portion, and is inserted into the second locking portion from the first side in the surface perpendicular direction, and in which a rotation restraint surface is formed on an inner surface of the second locking portion, the rotation restraint surface intersecting a locus of the second engaged portion when the second engaged portion inserted into the second locking portion rotates about the bulging portion toward a direction separated from the second locking portion.

When a load is applied to the main body portion of the optional member from the first side to the second side in the surface perpendicular direction of the surface material (a direction perpendicular to the surface material), the load is also applied to the attaching portion through the main body portion. Since the first engaged portion of the attaching portion sandwiches the first locking portion of the frame member and is locked to the first locking portion, the displacement of the first engaged portion from the first side to the second side in the surface perpendicular direction is restrained. For this reason, moment is applied to the attaching portion in a rotation direction about the bulging portion of the first locking portion. To a portion of the attaching portion on a side closer to a connection portion with the main body portion than the bulging portion of the first locking portion, a force caused by this moment is applied from the first side to the second side in the surface perpendicular direction, and to the second engaged portion corresponding to the opposite side thereof, the force is applied from the second side to the first side in the surface perpendicular direction. Accordingly, the second engaged portion tries to rotate from the second side to the first side in the surface perpendicular direction (to be separated from the second locking portion) about the bulging portion of the first locking portion.

In the present invention, the rotation restraint surface is formed in the second locking portion into which the second engaged portion is inserted. Accordingly, when the second engaged portion rotates away from the second locking portion due to the force caused by the moment, the second engaged portion contacts the rotation restraint surface. For this reason, the rotation is restrained and hence the separation from the second locking portion is more reliably prevented. In other words, when the load input to the optional member increases, the moment increases so that the second engaged portion more strongly contacts the rotation restraint surface. As a result, it is possible to prevent the attaching portion of the optional member from being separated from the frame member and to more reliably prevent the optional member from being separated from the frame member.

Further, the first engaged portion is fitted to the bulging portion of the first locking portion from the first side in the surface perpendicular direction and sandwiches the first locking portion in a direction perpendicular to the surface perpendicular direction. Accordingly, it is possible to more reliably prevent the first engaged portion from being separated from the first locking portion by the load applied to the optional member from the first side to the second side in the surface perpendicular direction.

Further, in the backrest according to the present invention, the attaching portion may include a first attaching member and a second attaching member that are connected to each other, the first engaged portion may be provided in the first attaching member and the second attaching member, and the first locking portion may be sandwiched between the first attaching member and the second attaching member, and the second engaged portion may be provided in the first attaching member.

Since the attaching portion includes two members which are respectively attached to the frame member, the attaching portion can be easily attached to the frame member. For example, since the first attaching member and the second attaching member may be connected to each other while the first attaching member is disposed at one side of the frame member and the second attaching member is disposed at the other side thereof, it is possible to easily attach the attaching portion to the frame member as compared with a case in which an attaching portion is attached to the frame member while deforming one member.

Further, in the backrest according to the present invention, the first engaged portion may include a concave portion which opens to the second side in the surface perpendicular direction and is fitted to the first locking portion from the first side in the surface perpendicular direction.

With such a configuration, the first engaged portion can be easily and reliably locked to the first locking portion.

Advantageous Effects of Invention

According to the present invention, it is possible to improve workability when an optional member such as a lumbar support is attached to a backrest.

Further, according to the present invention, even when there is a difference in shape between an optional member and an attachment portion, it is possible to satisfactorily attach an attaching portion to an attached surface and to robustly maintain an attachment state between the optional member and the attachment portion.

Further, according to the present invention, it is possible to more reliably prevent a frame member from being separated from an optional member due to moment caused by a load applied to the optional member.

BRIEF DESCRIPTION OF DRAWINGS

FIG. 19 is a cross-sectional view taken along a line D-D of FIG. 13.

FIG. 25 is a perspective view showing a part of the backrest according to the third embodiment of the present invention.

FIG. 26 is a cross-sectional perspective view showing a lower frame member of the backrest according to the third embodiment of the present invention.

FIG. 28 is a front view showing a lower side of the backrest according to the third embodiment of the present invention.

FIG. 32 is a cross-sectional view taken along a line I-I of FIG. 28.

DESCRIPTION OF EMBODIMENTS

First Embodiment

Hereinafter, a chair according to a first embodiment of the present invention will be described with reference to the drawings.

Figure 1:
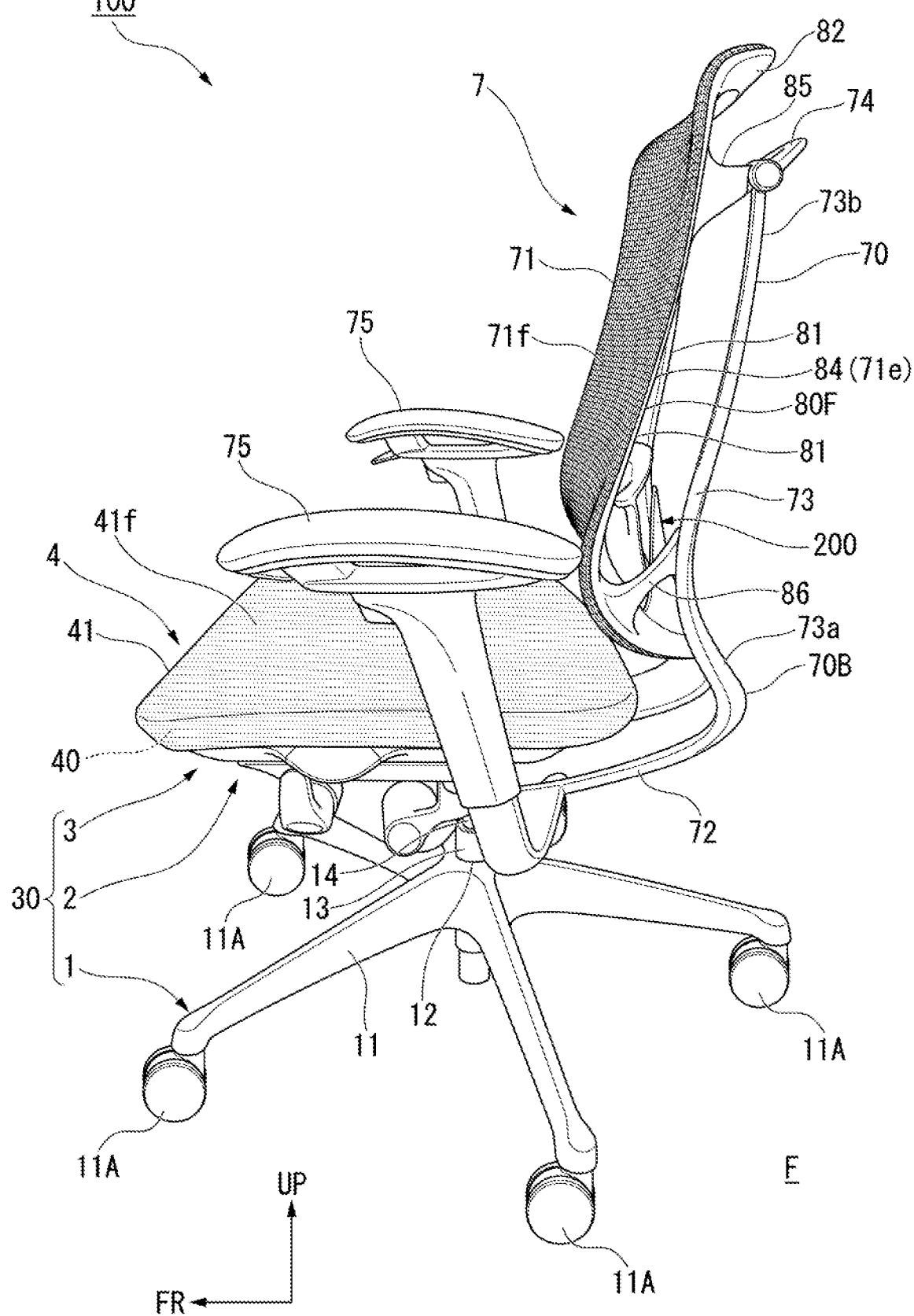
FIG. 1 is a perspective view showing a chair according to a first embodiment of the present invention as viewed from a side.
Figure 2:
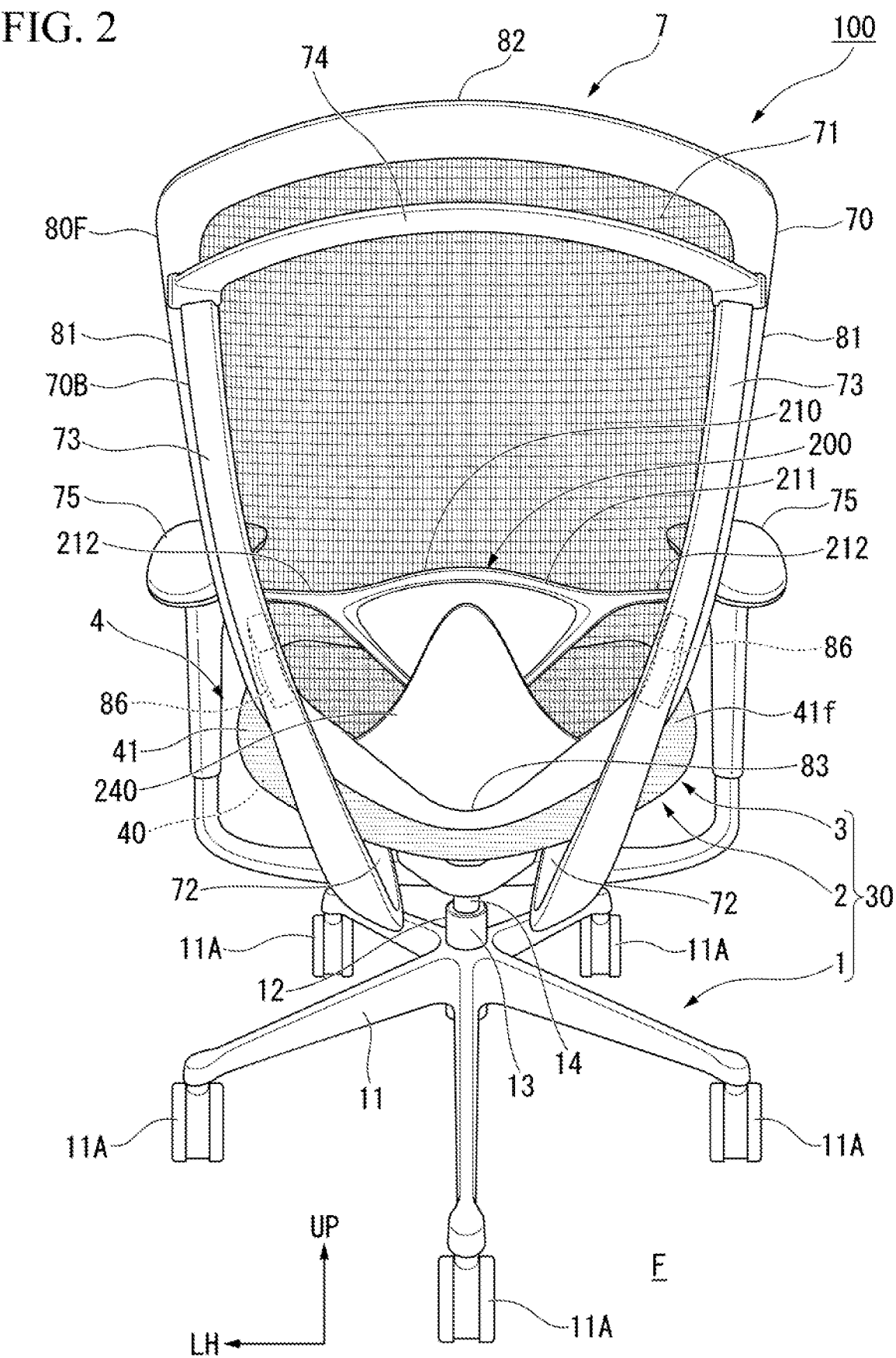
FIG. 2 is a perspective view showing the chair according to the first embodiment of the present invention as viewed from a rear side (backrest side).

FIG. 1 is a perspective view showing the chair according to the first embodiment of the present invention as viewed from a side. FIG. 2 is a perspective view showing the chair according to the first embodiment of the present invention as viewed from a rear side (backrest side).

As shown in FIGS. 1 and 2, a chair 100 includes a leg 1 which is installed on a floor F, a box-shaped support base 2 (not shown) which is installed at the upper portion of the leg 1, a seat receiving member 3 that is attached to the upper portion of the support base 2, a seat body 4 which is slidably supported on the seat receiving member 3 and on which a seated person sits, and a backrest 7 which extends from the support base 2 and supports the seated person sitting on the seat body 4.

In the following description, for convenience of description, a direction in which the seated person sitting on the seat body 4 faces forward will be referred to as a "front side" and the opposite direction will be referred to as a "rear side". Further, a direction connecting a position on the side of the floor F where the chair 100 is installed and the opposite side will be referred to as a "vertical direction". Further, a width direction of the chair 100a, that is, a horizontal direction perpendicular to the front-rear direction will be referred to as a "width direction". Further, in the drawings, the front side is indicated by an arrow FR, the upper side is indicated by an arrow UP, and the left side is indicated by an arrow LH.

The leg 1 includes a multi-legged bar 11 with casters 11A and a leg pillar 12 which stands up from the center portion of the multi-legged bar 11 and incorporates a gas spring (not shown) as an elevation mechanism.

An outer tube 13, which constitutes the lower portion of the leg pillar 12, is fitted and supported on the multi-legged bar 11 so as not to be rotatable. The support base 2 is fixed to and supported by upper end portion of an inner tube 14 which constitutes the upper portion of the leg pillar 12, and the lower portion of the inner tube 14 is supported by the outer tube 13 to be rotatable in the horizontal direction.

An elevation adjustment mechanism of the leg pillar 12 and a tilt adjustment mechanism of the backrest 7 are built in the support base 2.

The seat receiving member 3 includes four link arms (which are not shown and are the same hereinafter) which are attached to the upper portion of the support base 2 and a pair of left and right fixed frames (which are not shown and are the same hereinafter) which connects the link arms to each other.

In the embodiment, the leg 1, the support base 2, and the seat receiving member 3 constitute a support structure 30.

The seat body 4 includes a seat frame 40 and a seat surface tensile material 41 stretched over the seat frame 40. An upper surface of the seat surface tensile material 41 serves as a seat portion load support surface 41f which receives the load of the seated person.

The backrest 7 includes a back frame 70 and a tensile material 71 that is stretched over the back frame 70. A front surface of the tensile material 71 serves as a load support surface 71f which receives the load of the seated person.

The back frame 70 includes a back rear frame 70B which is a reinforcement member connected to the support base 2 and ensuring the strength of the back frame 70 and a back front frame (frame member) 80F which is provided at the front side of the back rear frame 70B.

The back rear frame 70B includes lower edge portions 72, side edge portions 73, and an upper edge portion 74. The lower edge portions 72, the side edge portions 73, and the upper edge portion 74 are integrally formed by, for example, metal such as aluminum or resin having a predetermined strength.

The lower edge portions 72 are connected to the tilt adjustment mechanism inside the support base 2 and extend from both left and right sides of the rear portion of the support base 2. The lower edge portion 72 is gradually inclined rearward as it goes upward. Further, the lower edge portions 72 are respectively provided with armrests 75 which are disposed at the sides of the seat body 4.

The side edge portion 73 is formed to be continuous to the upper end portion of each lower edge portion 72. Each side edge portion 73 is gradually inclined outward in the width direction as it goes upward.

A lower portion 73a of the side edge portion 73 is gradually inclined forward as it goes upward. An upper portion 73b of the side edge portion 73 is gradually inclined rearward as it goes upward. The upper portions 73b of the side edge portions 73 are connected by the upper edge portion 74.

The back front frame 80F includes a pair of vertical bars 81 which are disposed to be separated from each other in the width direction of the backrest 7 (along the load support surface 71f), an upper bar 82 which connects the upper ends of the pair of vertical bars 81, and a connection portion 83 which connects the lower ends of the pair of vertical bars 81. The vertical bars 81, the upper bar 82, and the connection portion 83 are integrally formed of, for example, resin or the like into an annular shape and are formed to be elastically deformable in response to a force applied from the tensile material 71.

As shown in FIG. 2, each vertical bar 81 extends in the vertical direction. Specifically, the vertical bar 81 is gradually inclined inward in the width direction as it goes downward.

As shown in FIG. 1, the outer edge portion of the back front frame 80F is provided with a groove 84 which is formed continuously in the circumferential direction to be depressed toward the inside of the backrest 7. An outer peripheral end portion 71e of the tensile material 71 is caught in the groove 84.

The upper and lower end portions of each vertical bar 81 of the back front frame 80F are respectively provided with an upper connection portion 85 and a lower connection portion 86 extending rearward. The front end portions of the upper connection portion 85 and the lower connection portion 86 are connected to the side edge portion 73 of the back rear frame 70B.

As shown in FIGS. 1 and 2, a lumber support (optional member) 200 is attached to the backrest 7 of the chair 100 to be attachable and detachable.

Figure 3:
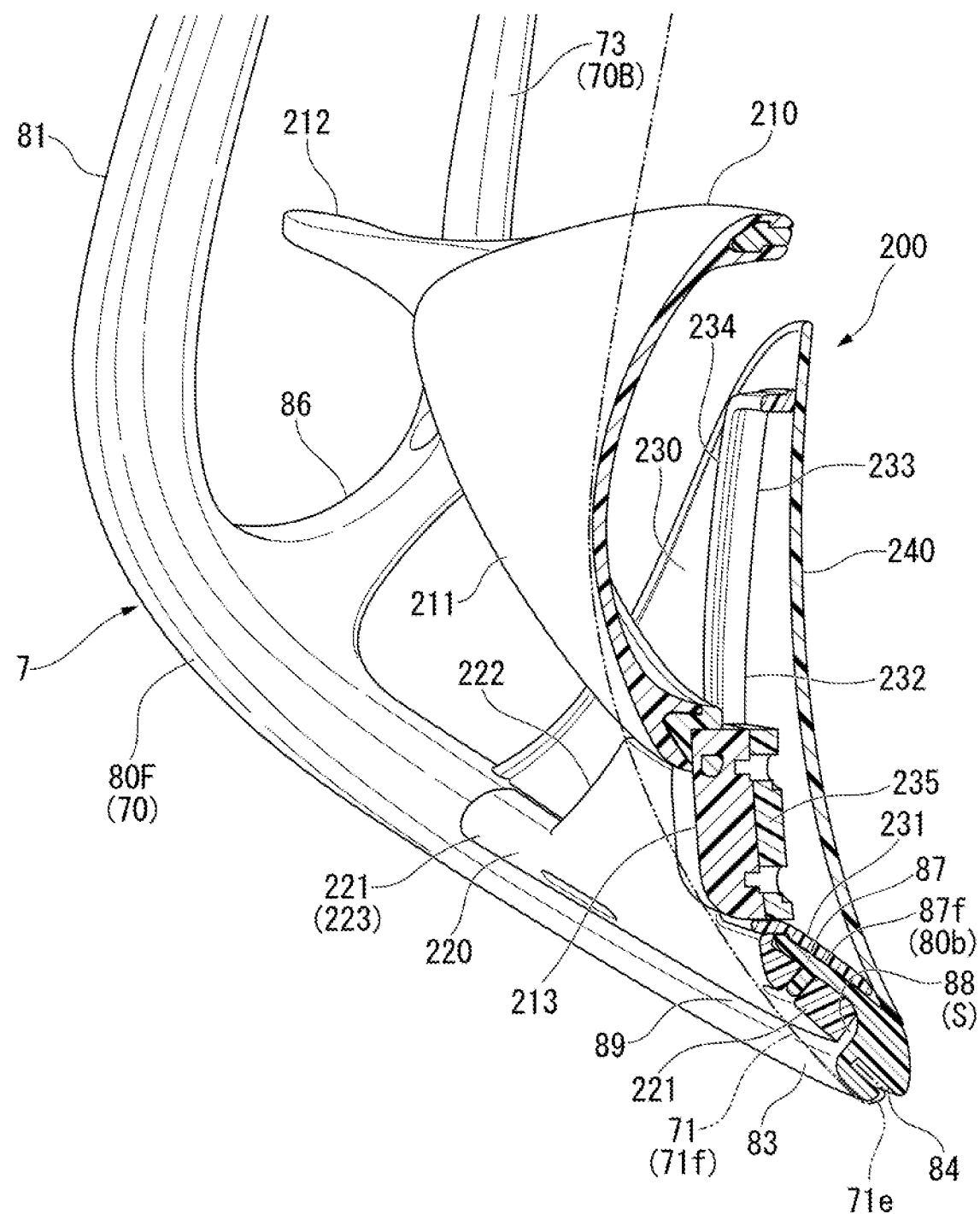
FIG. 3 is a perspective cross-sectional view showing an attachment structure of a lumbar support with respect to a back front frame of the chair according to the first embodiment of the present invention.
Figure 4:
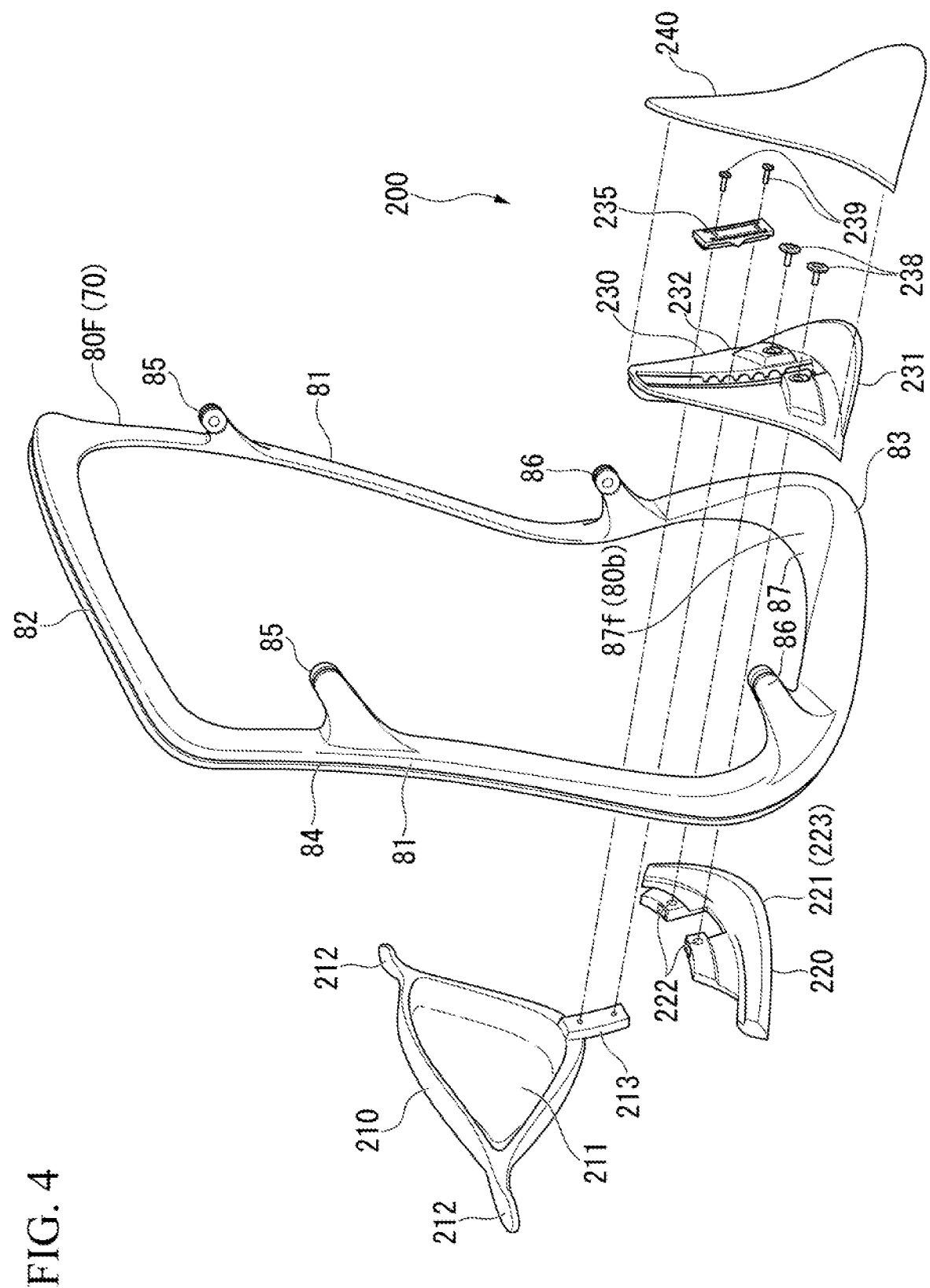
FIG. 4 is a perspective development view showing a configuration of the lumbar support attached to the back front frame of the chair according to the first embodiment of the present invention.

FIG. 3 is a perspective cross-sectional view showing an attachment structure of the lumber support with respect to the back front frame. FIG. 4 is a perspective development view showing a configuration of the lumber support attached to the back front frame.

As shown in FIG. 3, the lumber support 200 is attached to the lower end portion of the back front frame 80F, that is, to the connection portion 83. For this reason, the connection portion 83 includes an attachment portion 87 which is provided on a side separated from the tensile material 71, gradually extends forward as it goes upward to protrude from the back front frame 80F along the load support surface 71f. The attachment portion 87 faces the tensile material 71 in a direction intersecting the load support surface 71f. As shown in FIG. 4, a surface 87f of the attachment portion 87 on the side separated from the tensile material 71 forms a back surface 80b of the back front frame 80F.

As shown in FIG. 3, a concave portion 88 which is recessed toward the outer peripheral side of the back front frame 80F is formed in the connection portion 83 at a position in which the tensile material 71 faces the attachment portion 87 (on a side adjacent to the tensile material 71) so that the concave portion 88 is continuously formed in the circumferential direction of the back front frame 80F.

Further, the connection portion 83 includes an edge portion 89 which is provided on the side adjacent to the tensile material 71, extends toward the inner peripheral side of the backrest 7, and comes into contact with the tensile material 71. The concave portion 88 is formed between the edge portion 89 and the attachment portion 87.

As shown in FIGS. 3 and 4, the lumber support 200 includes a lumber support main body 210, a first bracket (first member) 220 and a second bracket (second member) 230 which support the lumber support main body 210 on the back front frame 80F of the backrest 7, and a back surface cover 240 (shown in FIG. 4) which covers the first bracket 220 and the second bracket 230 from the back surface side.

The lumber support main body 210 is disposed along the rear side of the tensile material 71 of the backrest 7.

The lumber support main body 210 integrally includes a main support portion 211 which is disposed at the center portion of the backrest 7 in the width direction, and elevation operation portions 212 and 212 which respectively extend outward in the width direction from both sides of the main support portion 211 in the width direction, and are configured to elevate the lumber support main body 210. Note that the shape or structure of the lumber support main body 210 is not limited to an example disclosed herein and can be appropriately modified.

The lumber support main body 210 integrally includes an arm portion 213 which extends downward from the main support portion 211.

Figure 5:
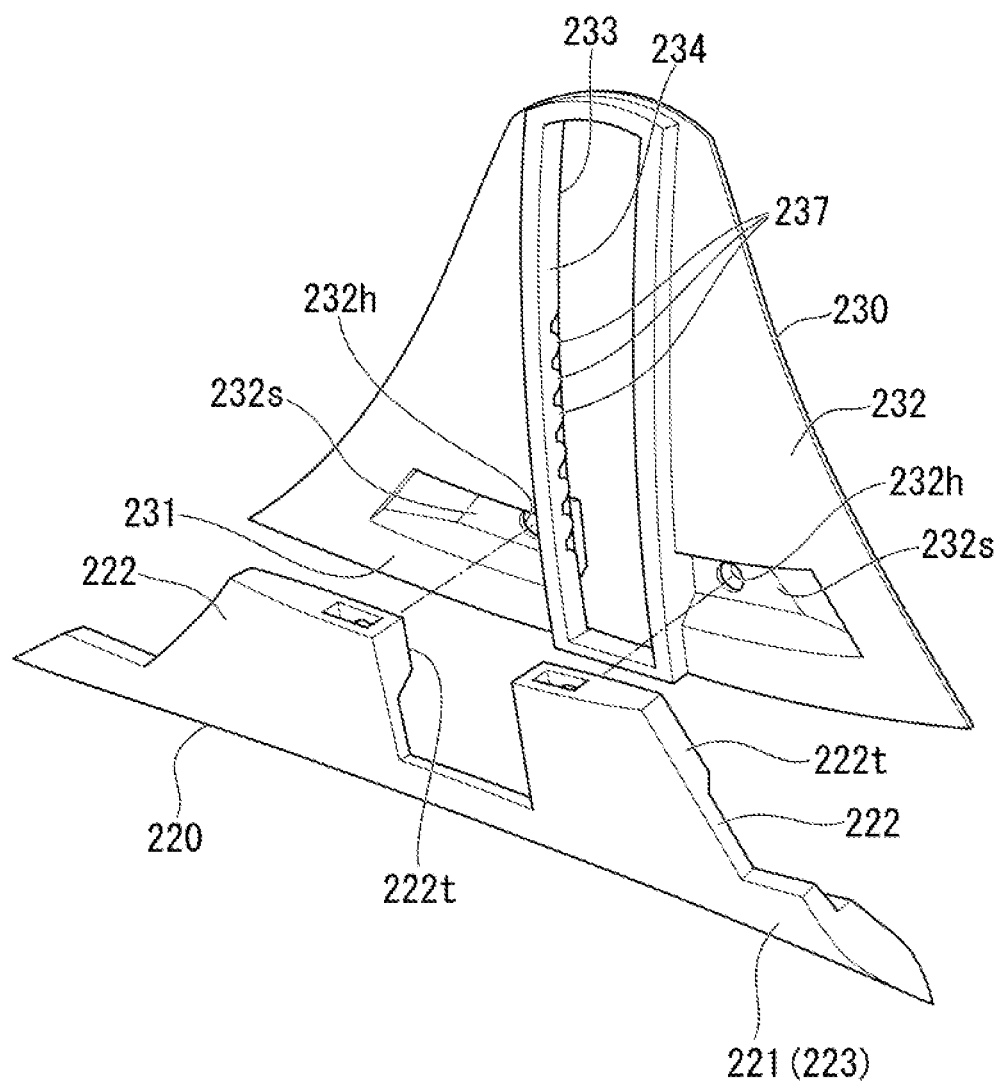
FIG. 5 is a perspective view showing a first bracket and a second bracket of the chair according to the first embodiment of the present invention as viewed obliquely from a front.

FIG. 5 is a perspective view showing the first bracket and the second bracket as viewed obliquely from the front side.

As shown in FIGS. 3 to 5, the first bracket 220 integrally includes a base portion 221 which is accommodated in the concave portion 88 formed in the connection portion 83, and a pair of wall portions 222 and 222 which erect upward from both sides of the base portion 221 in the width direction.

The base portion 221 is formed with a predetermined length to be continuous in the circumferential direction of the back front frame 80F inside the concave portion 88. The base portion 221 is disposed to be accommodated in the concave portion 88 and abut the rear attachment portion 87 from the front side, and serves as an attaching portion 223 which fixes the lumber support 200 to the back front frame 80F.

As shown in FIG. 5, the pair of wall portions 222 and 222 are formed with a gap in the width direction therebetween so that the gap is larger than the width dimension of the arm portion 213 of the lumber support main body 210. The wall portions 222 and 222 integrally include convex portions 222t and 222t which protrude rearward.

As shown in FIG. 3, the second bracket 230 is disposed at a position separated from the tensile material 71 with respect to the attachment portion 87. As shown in FIGS. 4 and 5, the second bracket 230 integrally includes a base portion 231 and an extension portion 232 extending upward from the base portion 231.

The base portion 231 is disposed along the surface 87f of the attachment portion 87 of the back front frame 80F (the back surface 80b of the back front frame 80F). The base portion 231 and the base portion 221 of the first bracket 220 are disposed to face each other with the attachment portion 87 of the back front frame 80F interposed therebetween.

As shown in FIG. 5, engagement concave portions 232s and 232s are formed in the extension portion 232 at positions facing the convex portions 222t and 222t of the first bracket 220. The engagement concave portions 232s respectively engage with the convex portions 222t and a pair of left and right bolts (connection members) 238 (see FIG. 4) are inserted through penetration holes 232h formed in the second bracket 230 from the rear side and are threaded into screw holes (not shown) formed in the convex portions 222t and 222t of the first bracket 220, thereby the first bracket 220 and the second bracket 230 are connected to each other into a single body. Accordingly, the attachment portion 87 of the back front frame 80F is sandwiched and held by the base portion 221 (the attaching portion 223) of the first bracket 220 and the base portion 231 of the second bracket 230.

Figure 6:
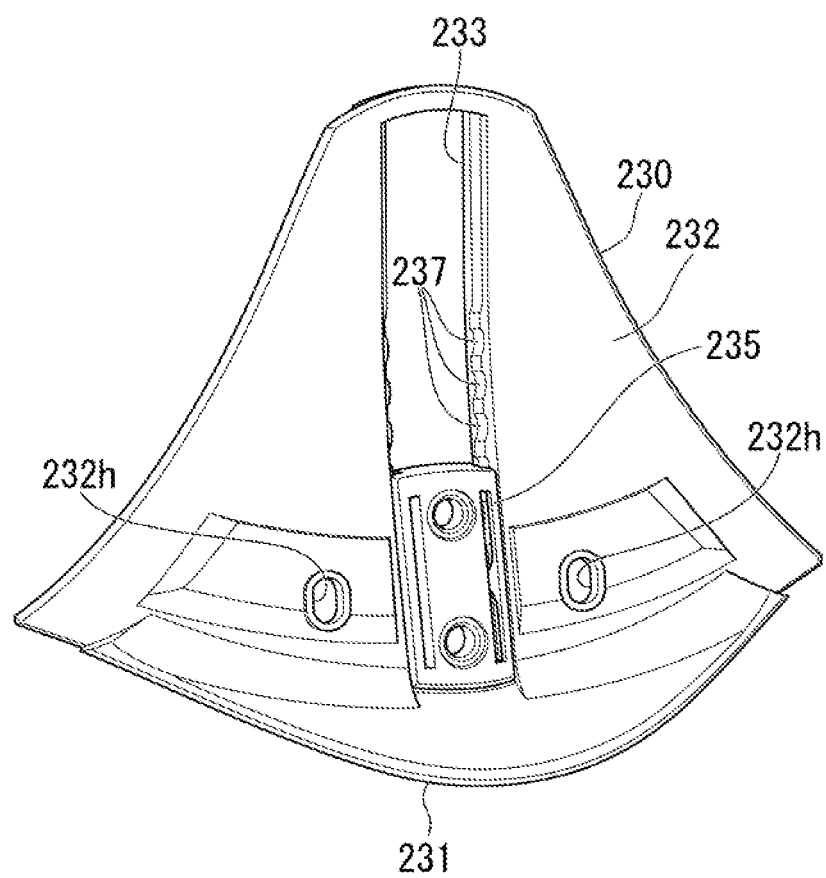
FIG. 6 is a perspective view showing a second bracket of the chair according to the first embodiment of the present invention as viewed obliquely from behind.
Figure 7:
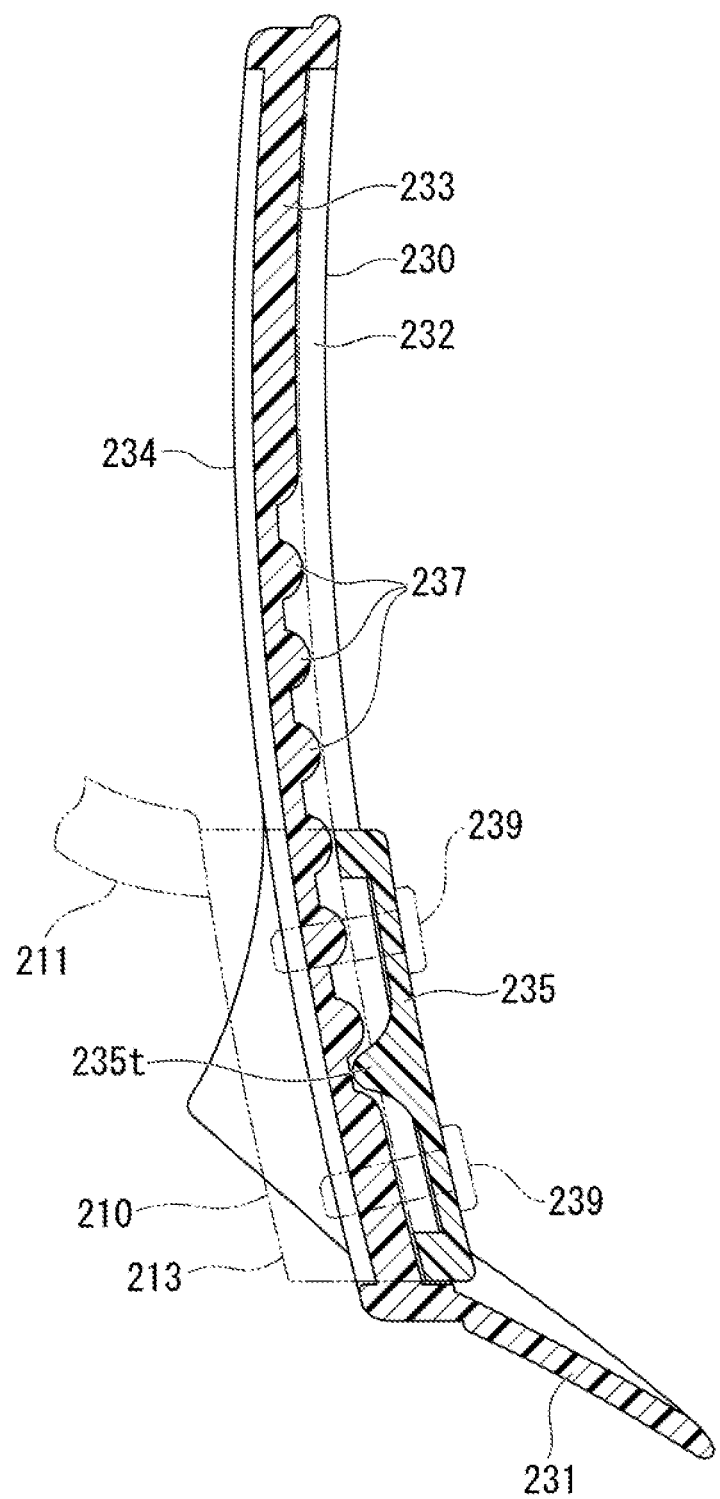
FIG. 7 is a cross-sectional view showing the second bracket of the chair according to the first embodiment of the present invention along a center of a slit in the width direction.

FIG. 6 is a perspective view showing the second bracket as obliquely viewed from the rear side. FIG. 7 is a cross-sectional view in which the second bracket is cut along the center of the slit in the width direction.

As shown in FIGS. 3, 5, and 6, the extension portion 232 is formed so that the width dimension thereof gradually decreases as it goes upward. The extension portion 232 is provided with a slit 233 which is continuous in the vertical direction.

As shown in FIGS. 3, 5, and 7, the outer peripheral portion of the slit 233 is provided with a guide wall 234 which protrudes forward. The arm portion 213 of the lumber support main body 210 is disposed at the front side of the slit 233.

As shown in FIGS. 6 and 7, notches 237 which protrude rearward are formed on the rear surface of the guide wall 234 at both sides in the width direction of the slit 233. The notches 237 are formed at a plurality of positions in the vertical direction with a gap therebetween.

A slide plate 235 is disposed at the rear side of the second bracket 230. As shown in FIG. 7, the slide plate 235 is provided with a projection 235t which protrudes forward and engages with the notch 237.

The arm portion 213 and the slide plate 235 face each other with the extension portion 232 interposed therebetween and are connected to each other by a pair of upper and lower bolts 239 (see FIG. 4) penetrating the slit 233.

Accordingly, the arm portion 213 and the slide plate 235 are slidable in the vertical direction along the slit 233. As the projection 235t of the slide plate 235 engages with the notch 237, the arm portion 213 and the slide plate 235 are fixed to each other at a plurality of stages along the slit 233 so that the height of the lumber support main body 210 can be adjusted.

When the lumber support 200 is attached to the back front frame 80F, firstly the first bracket 220 is slid along the load support surface 71f so that the attaching portion 223 is inserted into a gap S (the concave portion 88) between the tensile material 71 and the attachment portion 87.

Subsequently, the second bracket 230 is disposed at the rear side of the attachment portion 87, and the first bracket 220 and the second bracket 230 are connected to each other by the bolts 238.

Then, the lumber support main body 210 is disposed at the front side of the first bracket 220, the slide plate 235 is disposed at the rear side of the second bracket 230, and the arm portion 213 and the slide plate 235 are connected to each other by the bolts 239.

Subsequently, the back surface cover 240 is attached to the rear side of the second bracket 230.

Accordingly, the attachment of the lumber support 200 to the back front frame 80F is completed.

In the chair 100 with such a configuration, the back front frame 80F is provided with the attachment portion 87 which faces the tensile material 71 in a state where the attachment portion 87 is separated from the tensile material 71, and the attaching portion 223 of the lumber support 200 is inserted and fixed into the gap S between the tensile material 71 and the attachment portion 87. Accordingly, the attachment work of the lumber support 200 to the back front frame 80F can be easily performed by inserting the attaching portion 223 of the lumber support 200 into the gap S between the tensile material 71 and the attachment portion 87 from a direction along the load support surface 71f of the tensile material 71. Thus, it is possible to improve the workability at the time of attaching the lumber support 200 to the backrest 7.

Further, the attachment portion 87 protrudes from the back front frame 80F along the load support surface 71f With such a configuration, the attaching portion 223 of the lumber support 200 is inserted and fixed into the gap S between the tensile material 71 and the attachment portion 87 protruding from the back front frame 80F along the load support surface 71f Accordingly, since the attaching portion 223 of the lumber support 200 is covered with the attachment portion 87 of the back front frame 80F when the backrest 7 is viewed from the opposite side to the tensile material 71 with respect to the back front frame 80F, an appearance is improved.

Further, the back front frame 80F includes the concave portion 88 which is formed at a position facing the tensile material 71 with respect to the attachment portion 87 to accommodate the attaching portion 223. According to such a configuration, since the attaching portion 223 is accommodated in the concave portion 88, it is possible to prevent the attaching portion 223 of the lumber support 200 from being exposed to the outside and to improve an appearance.

Further, when the first bracket 220 and the second bracket 230 are connected to each other by the bolts 238 while the attachment portion 87 is sandwiched by the first bracket 220, the attaching portion 223, and the second bracket 230, the lumber support 200 can be strongly attached to the attachment portion 87 of the back front frame 80F.

Furthermore, the present invention is not limited to the above-described embodiment described with reference to the drawings and various modified examples within the technical scope are considered.

For example, in the above-described embodiment, the attachment portion 87 is sandwiched between the first bracket 220 and the second bracket 230, but the present invention is not limited thereto. For example, the bracket supporting the lumber support main body 210 may be provided with a groove into which the attachment portion 87 is inserted, and the bracket and the attachment portion 87 may be connected to each other by a connection member such as a bolt while the attachment portion 87 is inserted into the groove.

Further, the cross-sectional shape of the connection portion 83 of the back front frame 80F is merely an example and can be appropriately changed in response to the design of the chair 100. For example, the attachment portion 87 extends obliquely from the front side, but may be formed in other shapes, for example in a shape extending upward in the vertical direction.

Then, the configuration of the above-described embodiment is an example of the present invention and can be modified into various forms without departing from the gist of the present invention.

Second Embodiment

Hereinafter, a second embodiment of the present invention will be described with reference to the drawings.

Figure 8:
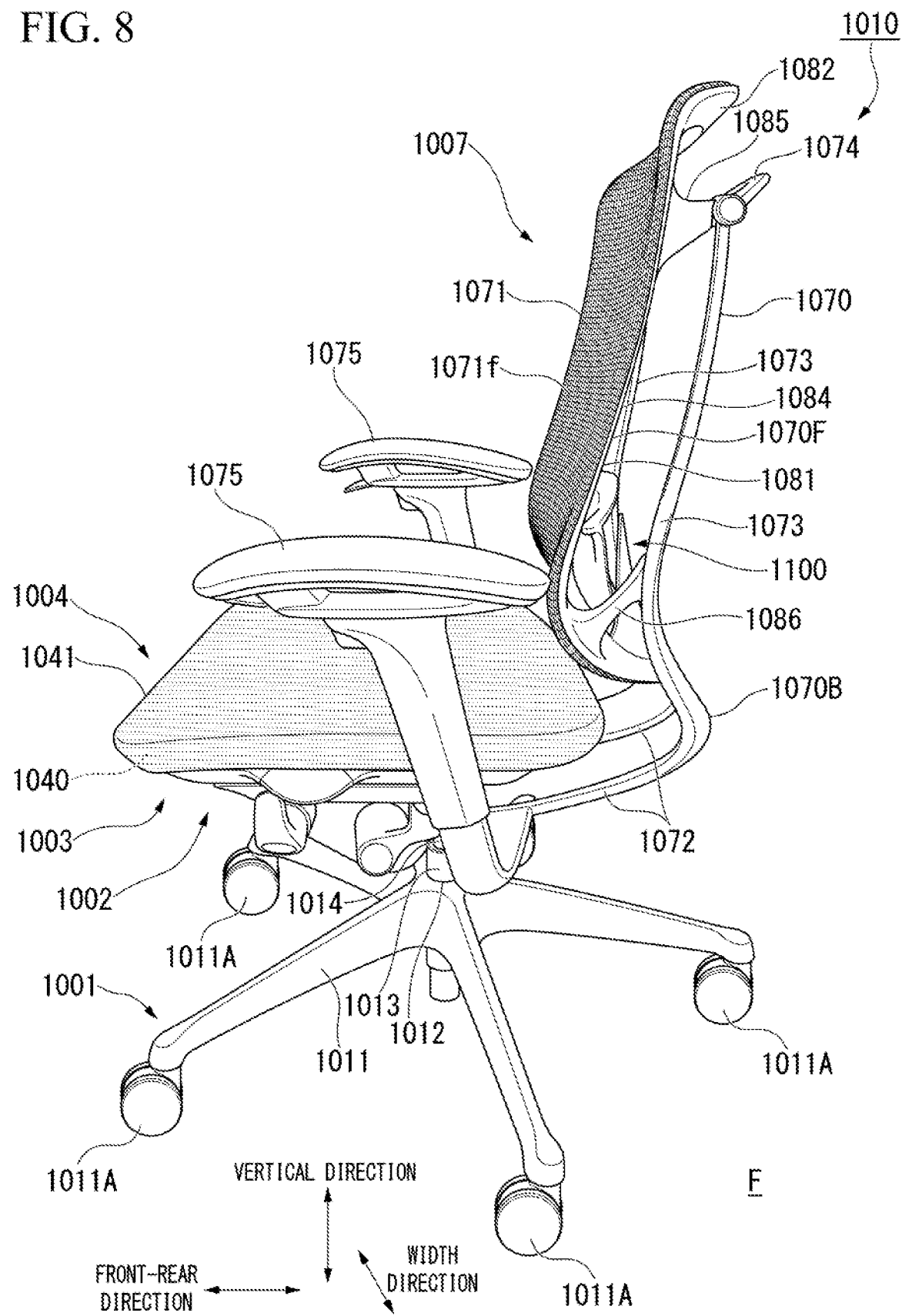
FIG. 8 is a perspective view showing a chair (furniture) according to a second embodiment of the present invention from a side.

As shown in FIG. 8, a chair (furniture) 1010 according to the second embodiment of the present invention includes a leg 1001 which is installed on a floor F, a box-shaped support base 1002 which is installed in the upper portion of the leg 1001, a seat receiving member 1003 that is attached to the upper portion of the support base 1002, a seat body 1004 which is slidably supported by the seat receiving member 1003 and on which a seated person (not shown) can sit, a backrest 1007 which extends from the support base 1002 and is able to support the back of the seated person sitting on the seat body 1004, and a lumber support (optional member) 1100 which is provided in the backrest 1007 to be attachable and detachable.

In the specification and the drawings, a side in which the seated person sitting on the seat body 1004 faces forward will be referred to as a "front side", the opposite side thereof will be referred to as a "rear side", and a direction connecting the front side and the rear side will be referred to as a "front-rear direction". A horizontal direction perpendicular to the front-rear direction will be referred to as a "width direction" and a direction connecting the upper and lower sides will be referred to as a "vertical direction".

The leg 1001 includes a multi-legged bar 1011 and a leg pillar 1012. Casters 1011A are attached to tip ends of the multi-legged bar 1011. The leg pillar 1012 stands up from the center portion of the multi-legged bar 1011 in the plan view, and incorporates a gas spring (not shown) configured to elevate the seat body 1004.

An outer tube 1013, which constitutes the lower portion of the leg pillar 1012, is fitted and supported on the multi-legged bar 1011 so as not to be rotatable. The support base 1002 is fixed to the upper end portion of an inner tube 1014 which constitutes the upper portion of the leg pillar 1012, and the inner tube 1014 supports the support base 1002. The lower end portion of the inner tube 1014 is supported by the outer tube 1013 to be rotatable within a plane along the horizontal direction.

An elevation adjustment mechanism of the leg pillar 1012 and a tilt adjustment mechanism of the backrest 1007 are built in the support base 1002.

The seat receiving member 1003 includes four link arms (not shown) which are attached to the upper portion of the support base 1002 and a pair of left and right fixed frames (not shown) which connect the link arms to each other.

The seat body 1004 includes a seat frame 1040 and a tensile material 1041 that is stretched over the seat frame 1040.

The backrest 1007 includes a back frame 1070 and a tensile material 1071 that is stretched over the back frame 1070. A front surface of the tensile material 1071 serves as a load support surface 1071$f$ which receives the load of the seated person. In the drawings other than FIGS. 8 and 9, the tensile material 1071 is not shown.

The back frame 1070 includes a rear frame member 1070B that is connected to the support base 1002 and serves as a strength member ensuring the strength of the back frame 1070, and a front frame member 1070F (frame member) which is provided at the front side of the rear frame member 1070B.

The rear frame member 1070B includes lower edge portions 1072, side edge portions 1073, and an upper edge portion 1074. The lower edge portions 1072, the side edge portions 1073, and the upper edge portion 1074 are integrally formed of, for example, metal such as aluminum or resin having a predetermined strength.

The lower edge portions 1072 are connected to the tilt adjustment mechanism provided inside the support base 1002 and are provided to extend along both left and right sides of the rear portion of the support base 1002. The lower edge portion 1072 is gradually inclined rearward as it goes upward. Further, the lower edge portions 1072 are respectively provided with armrests 1075 which are disposed at the sides of the seat body 1004.

Figure 9:
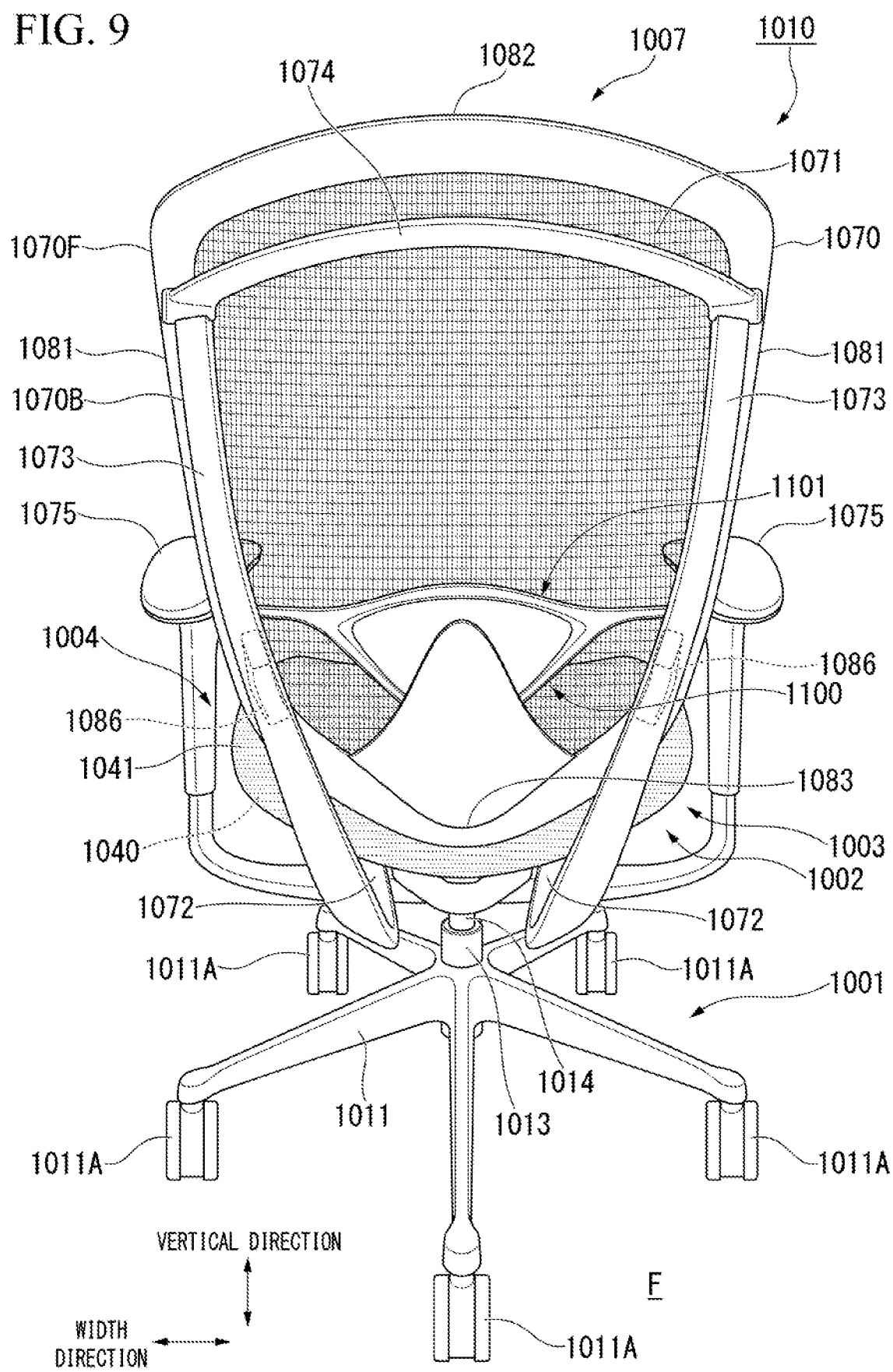
FIG. 9 is a perspective view showing the chair according to the second embodiment of the present invention as viewed from a rear side.

As shown in FIG. 9, the side edge portions 1073 are respectively connected to the upper end portions of two lower edge portions 1072. The side edge portion 1073 is gradually inclined outward (to be separated from the other side edge portion 1073) in the width direction as it goes upward. Further, the side edge portion 1073 includes a curved portion at a portion corresponding to the height in the vicinity of the waist of the seated person in the vertical direction in the side view. The lower side of the curved portion of the side edge portion 1073 is gradually inclined forward as it goes upward. The upper side of the curved portion of the side edge portion 1073 is gradually inclined rearward as it goes upward. The upper portions of two side edge portions 1073 are connected to each other by the upper edge portion 1074.

The front member 1070F includes a pair of vertical frame members 1081 that are separated from each other in the width direction of the backrest 1007 and extend in the vertical direction along the load support surface 1071*f*, an upper frame member 1082 which connects the upper ends of the pair of vertical frame members 1081, and a lower frame member 1083 which connects the lower ends of the pair of vertical frame members 1081. The pair of vertical frame members 1081, the upper frame member 1082, and the lower frame member 1083 are integrally formed of, for example, resin or the like into an annular shape and are formed to be elastically deformable in response to a force applied from the tensile material 1071.

Each outer circumferential edge of the pair of vertical frame members 1081, the upper frame member 1082, and the lower frame member 1083 is provided with a groove portion 1084 which is recessed toward the inside of the backrest 1007 (that is, toward the center portion as viewed from the front side or the rear side).

As described above, since the pair of vertical frame members 1081, the upper frame member 1082, and the lower frame member 1083 are formed in an annular shape, the groove portion 1084 is continuously formed in the circumferential direction of these integrated frame members. The groove portion 1084 is formed to be able to lock the tensile material 1071 when the outer peripheral end portion of the tensile material 1071 is caught in the groove portion 1084. The tensile material 1071 is disposed at the front side of the front frame member 1070F. The vicinity of the outer edge portion of the tensile material 1071 is wound around the outside of the front frame member 1070F and is caught into the groove portion 1084. The tensile material 1071 is configured to receive the load of the seated person leaning against the backrest 1007.

Each of the pair of vertical frame members 1081 is gradually inclined inward in the width direction as it goes downward. An upper connection portion 1085 and a lower connection portion 1086 extending rearward are integrally formed at the upper portion and the lower portion of each of the pair of vertical frame members 1081. The front end portions (the rear end portions) of the upper connection portion 1085 and the lower connection portion 1086 are respectively connected to the side edge portion 1073 of the rear frame member 1070B.

As shown in FIG. 8, the upper frame member 1082 extends in the width direction. Both end portions of the upper frame member 1082 in the width direction are connected to the upper end portions of the pair of vertical frame members 1081. The upper frame member 1082 is curved so that the center portion in the width direction is disposed above both end portions.

The lower frame member 1083 extends in the width direction. Both end portions of the lower frame member 1083 in the width direction are connected to the lower end portions of the pair of vertical frame members 1081. The lower frame member 1083 is curved so that the center portion in the width direction is disposed below both end portions.

Figure 10:
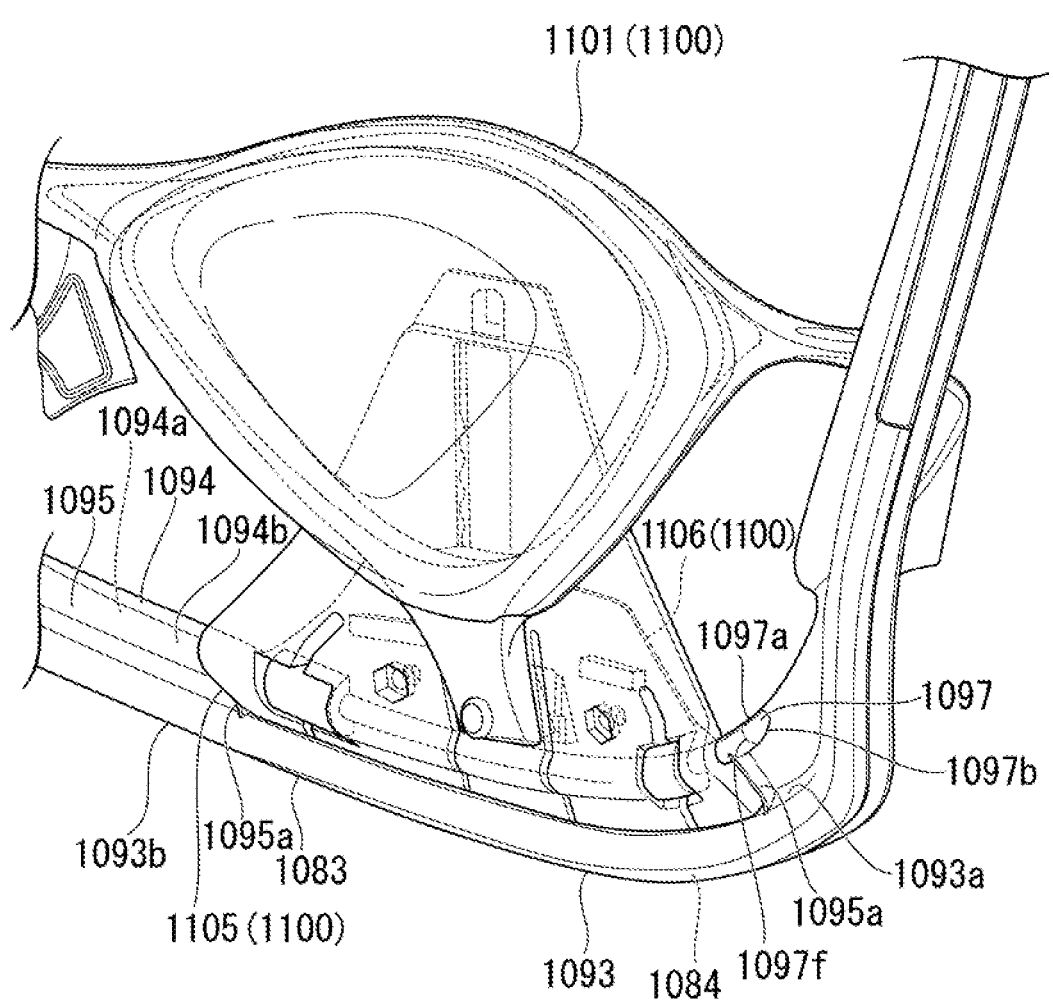
FIG. 10 is a perspective view showing a part of a backrest of the chair according to the second embodiment of the present invention.
Figure 11:
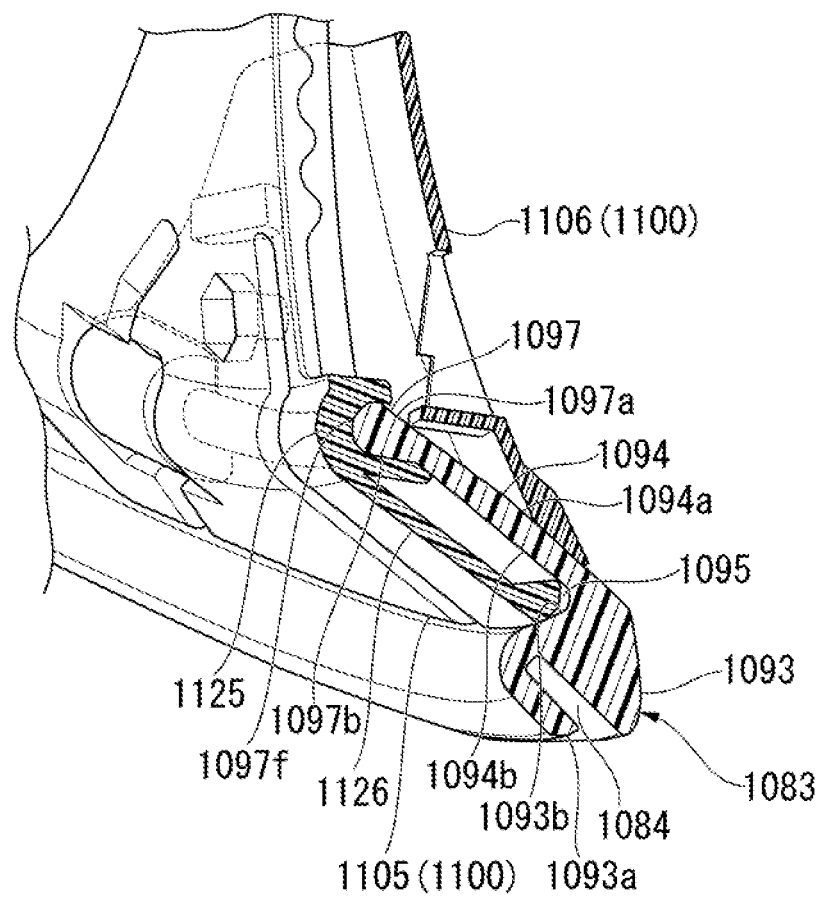
FIG. 11 is a cross-sectional perspective view showing a lower frame member of the backrest of the chair according to the second embodiment of the present invention.

In FIGS. 10 and 11, in order to specifically describe the shape of the lower frame member 1083 and to easily understand the shape of the lower frame member 1083 and the operational effects due to the shape of the lower frame member 1083, a lumber support main body (optional main body) 1101 which is a member constituting the lumber support 1100 attached to the lower frame member 1083 is also shown along with a first attaching member 1105 and a second attaching member 1106 of an attachment structure (an attachment structure for an optional member, hereinafter may be simply referred to as an "attachment structure") 1104 of the lumber support 1100.

As shown in FIGS. 10 and 11, the lower frame member 1083 includes a base portion 1093 which is disposed in the lower portion of the lower frame member 1083 and is provided with the groove portion 1084, and a protrusion portion 1094 (an attachment portion) which gradually protrudes forward from a rear end portion of an upper surface 1093*a* of the base portion 1093 as it goes upward. Further, a concave portion 1095 is formed to be surrounded by the front portion of the upper surface 1093*a* of the base portion 1093 and a lower surface 1094*b* of the protrusion portion 1094. Each of the base portion 1093 and the protrusion portion 1094 is formed throughout the lower frame member 1083 in the longitudinal direction (that is, the width direction of the chair 1010). The groove portion 1084 which is formed in the base portion 1093 is formed to gradually descend as it goes rearward and opens to the lower surface 1093*b* of the base portion 1093.

The protrusion portion 1094 includes a plate-shaped portion 1096 which is disposed at the base end side (that is, the side of the base portion 1093) and a bulging portion 1097 which is disposed at the tip end of the plate-shaped portion 1096. The plate-shaped portion 1096 and the bulging portion 1097 are integrated with each other. The thickness of the plate-shaped portion 1096 is formed to be substantially uniform in a direction protruding from the base portion 1093. The thickness of the bulging portion 1097 gradually increases as compared with the thickness of the plate-shaped portion 1096 as it goes forward from the tip end of the plate-shaped portion 1096 and then decreases to draw a semi-circle in the side view. That is, the surface of the bulging portion 1097 includes a lower surface 1097*b* which is connected to the front end portion of the lower surface 1094*b* of the protrusion portion 1094 and extends forward in a substantially horizontal direction, an upper surface 1097*a* which is connected to a front end portion of an upper surface 1094*a* of the protrusion portion 1094 and is substantially flush with the upper surface 1094*a*, and a front surface 1097*f* which connects the upper surface 1097*a* and the lower surface 1097*b* to each other and is formed in a semi-circular shape in the side view.

Wall portions 1095*a* and 1095*a* are formed at the intermediate portion of the concave portion 1095 in the width direction so as to be located at both sides of a locking region of an attaching portion 1102 to be described later. The wall portion 1095*a* is provided to regulate the movement of the attaching portion 1102 locked to the concave portion 1095 in the width direction.

The wall portion 1095*a* is formed in a plate shape having a plate surface substantially facing the width direction, and a portion of the wall portion 1095*a* other than the front edge portion is continuous to the inner surface of the concave portion 1095. The wall portion 1095*a* is integrated with the base portion 1093 and the protrusion portion 1094.

Figure 12:
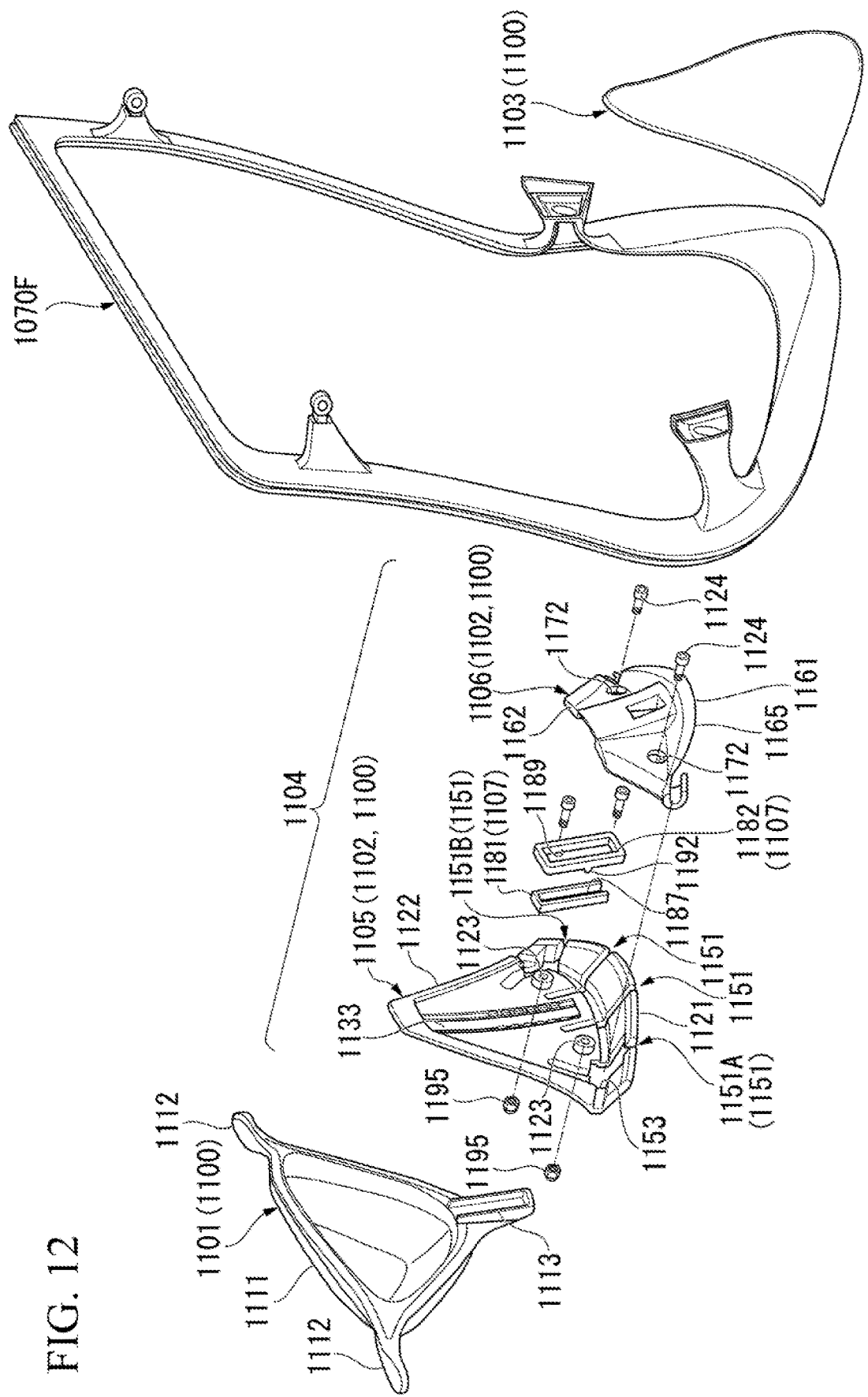
FIG. 12 is an exploded perspective view showing the backrest of the chair according to the second embodiment of the present invention.

As shown in FIG. 12, the lumber support 1100 includes a lumber support main body (optional main body) 1101 which is attached to the back frame 1070 and receives the load of the seated person sitting on the chair 1010 (see FIG. 8) as shown in FIGS. 10 to 12, an attachment structure 1104 which is attached to the lower frame member 1083 and the lumber support main body 1101 and supports the lumber support main body 1101, a back surface cover 1103 which covers the attachment structure 1104 from the rear side, and a lumber support height adjustment portion (hereinafter, simply referred to as a "height adjustment portion") 1107 configured to adjust the height of the lumber support main body 1101.

The lumber support main body 1101 is disposed at the rear side of the tensile material 1071 of the backrest 1007 (see FIGS. 8 and 9). The lumber support main body 1101 includes a main support portion 1111 which is disposed at the center portion of the backrest 1007 in the width direction, extension portions 1112 which extend outward in the width direction from both sides, in the width direction, of the upper portion of the main support portion 1111, and an arm portion 1113 which extends downward from the main support portion 1111 and is attachable to the height adjustment portion 1107 of the attaching portion 1102. The main support portion 1111, the extension portions 1112, and the arm portion 1113 are integrated with one another. The arm portion 1113 is provided with screw holes (see FIG. 15) 1114 into which bolts 1124 shown in FIG. 12 can be threaded. The extension portion 1112 is provided to be gripped when a user adjusts the height of the lumber support main body 1101.

Note that the shape or structure of the lumber support main body 1101 is not limited to the above-described embodiment.

Figure 13:
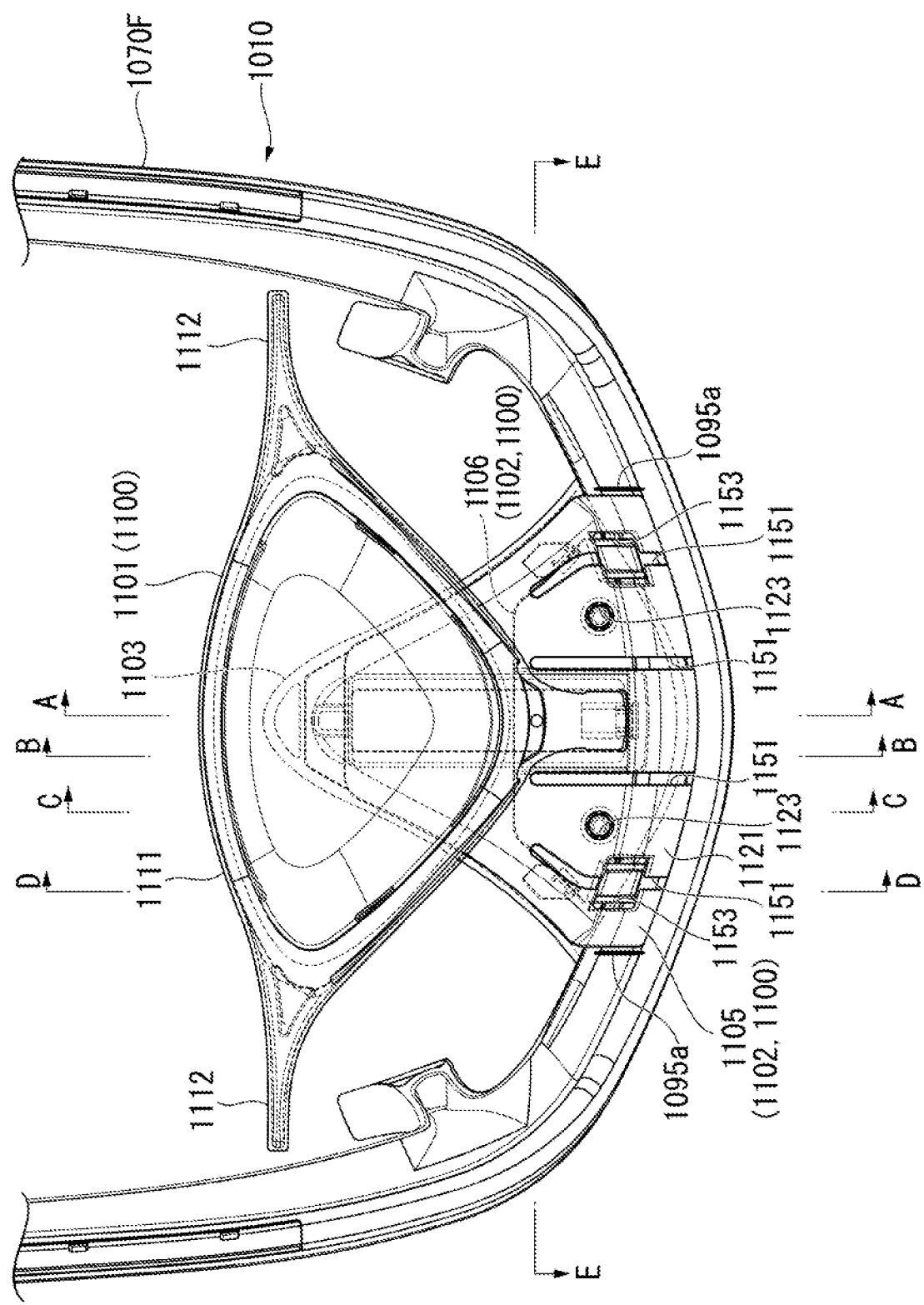
FIG. 13 is a front view showing a lower side of the backrest of the chair according to the second embodiment of the present invention.

The attachment structure 1104 includes a first attaching member 1105 that is attachable to the lower frame member 1083 and is disposed at the front side of the lower frame member 1083 at the time of attachment, and a second attaching member 1106 that is attachable to the lower frame member 1083 and is disposed at the rear side of the lower frame member 1083 at the time of attachment. As shown in FIGS. 12 and 13, the first attaching member 1105 and the second attaching member 1106 are disposed to overlap each other in the front-rear direction so that the centers thereof match in the width direction.

Figure 14A:
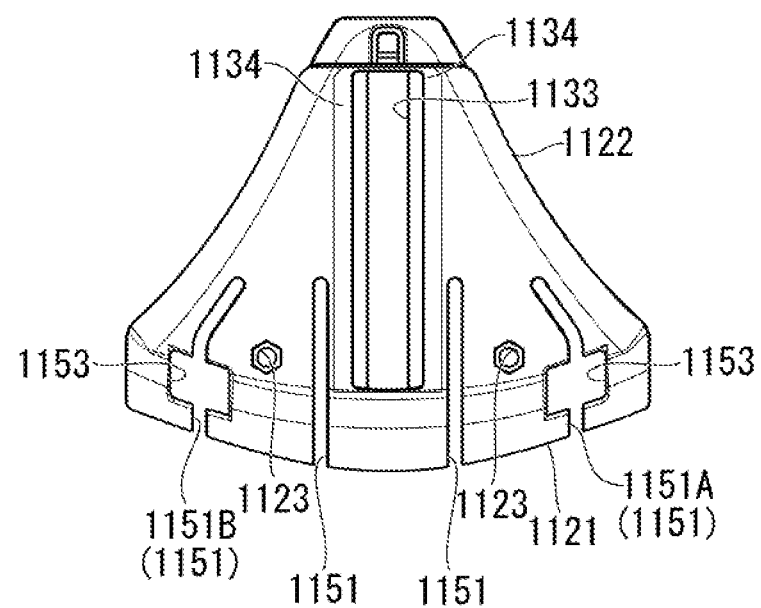
FIG. 14A is a front view showing a first attaching member constituting an attaching portion of an attachment structure for an optional member according to the second embodiment of the present invention.
Figure 14B:
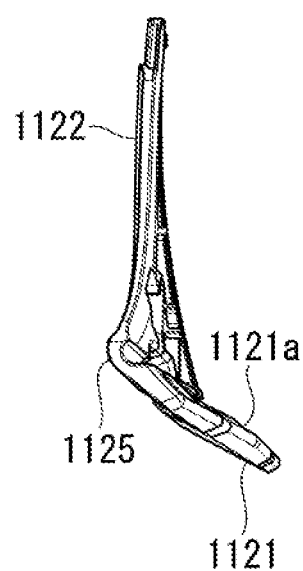
FIG. 14B is a side view showing the first attaching member constituting the attaching portion of the attachment structure for the optional member according to the second embodiment of the present invention.
Figure 14C:
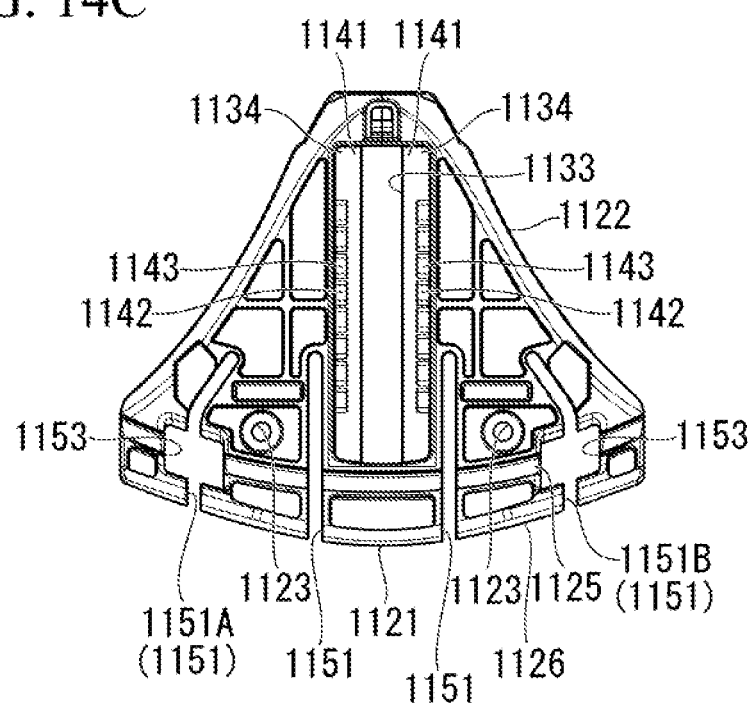
FIG. 14C is a rear view showing the first attaching member constituting the attaching portion of the attachment structure for the optional member according to the second embodiment of the present invention.

As shown in FIGS. 14A to 14C, the first attaching member 1105 includes a first base portion 1122 which extends in the vertical direction, and a first extension portion (attaching portion) 1121 which extends, from the lower edge portion of the first base portion 1122, in an inclination direction gradually directed downward as it goes rearward.

Figure 15:
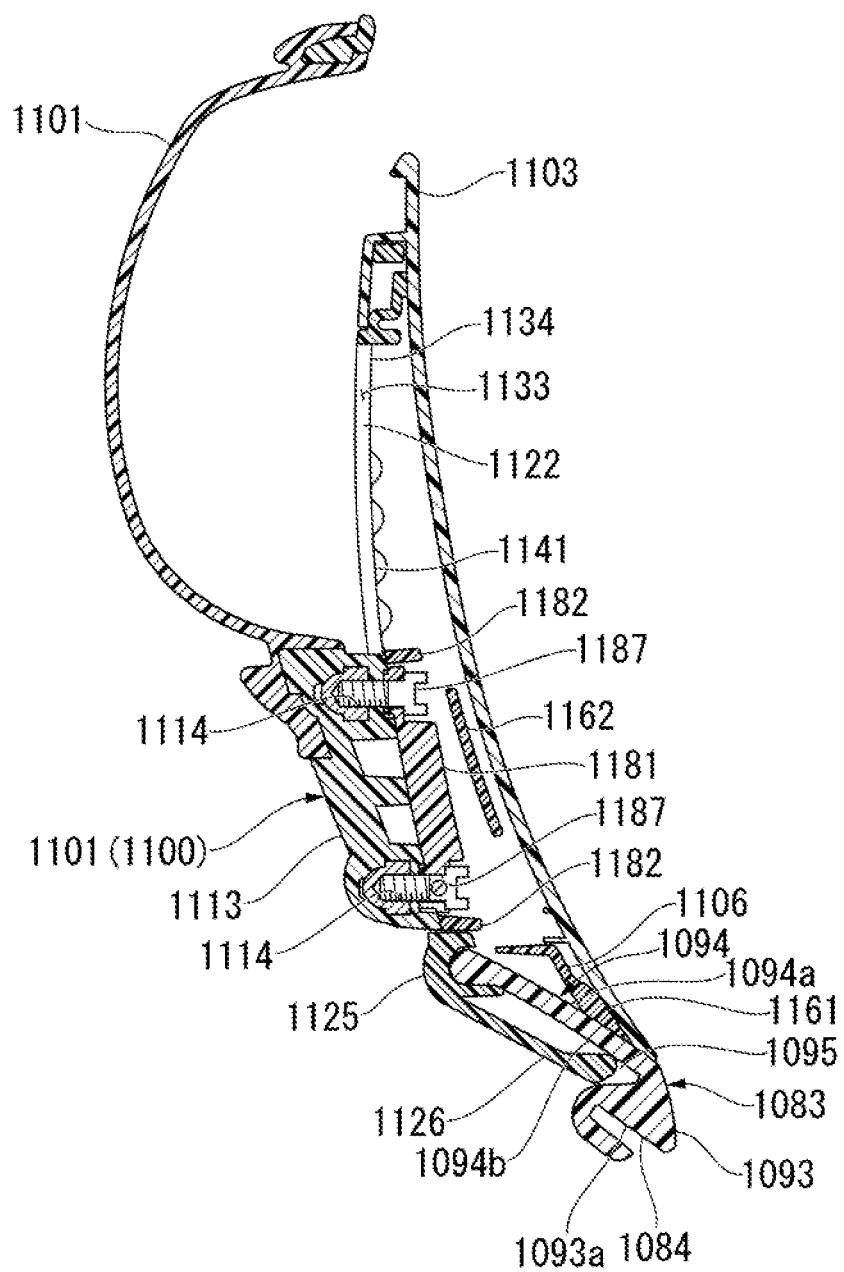
FIG. 15 is a cross-sectional view taken along a line A-A of FIG. 13.
Figure 16:
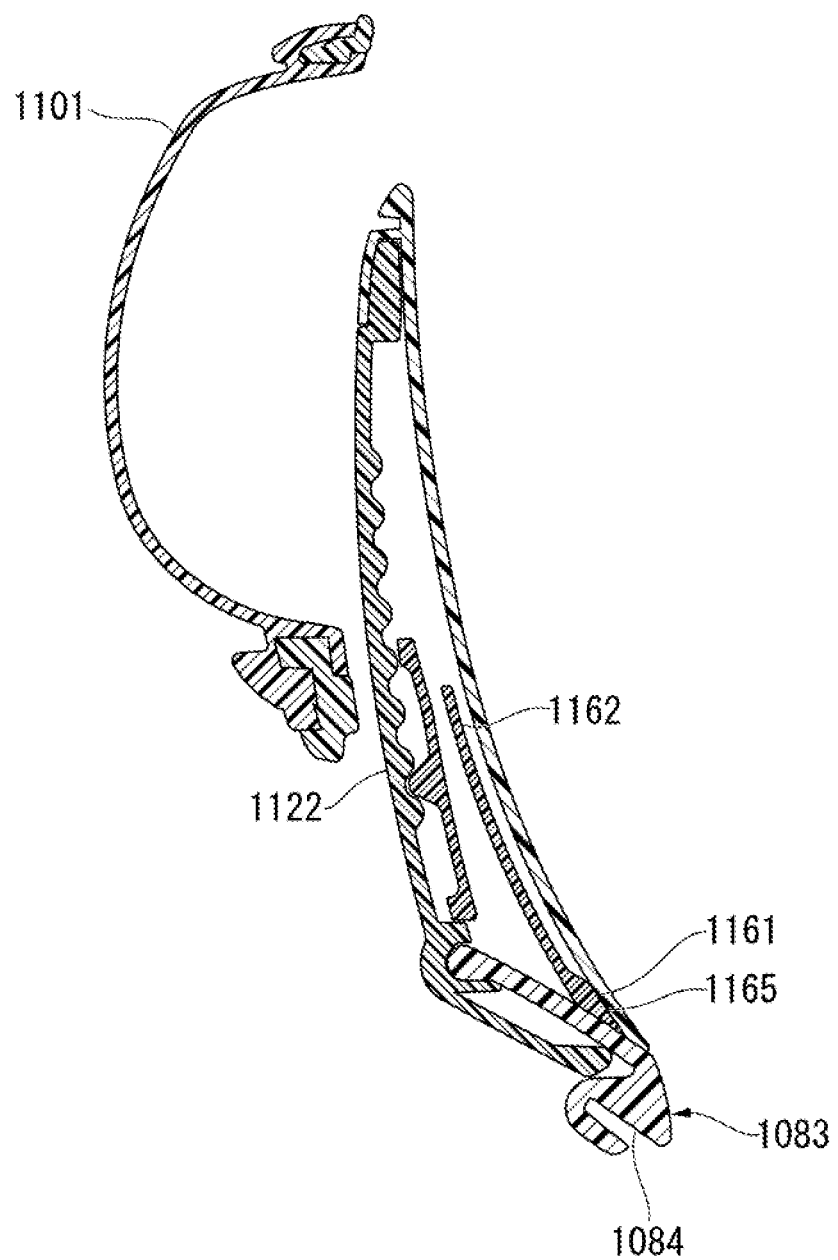
FIG. 16 is a cross-sectional view taken along a line B-B of FIG. 13.
Figure 17:
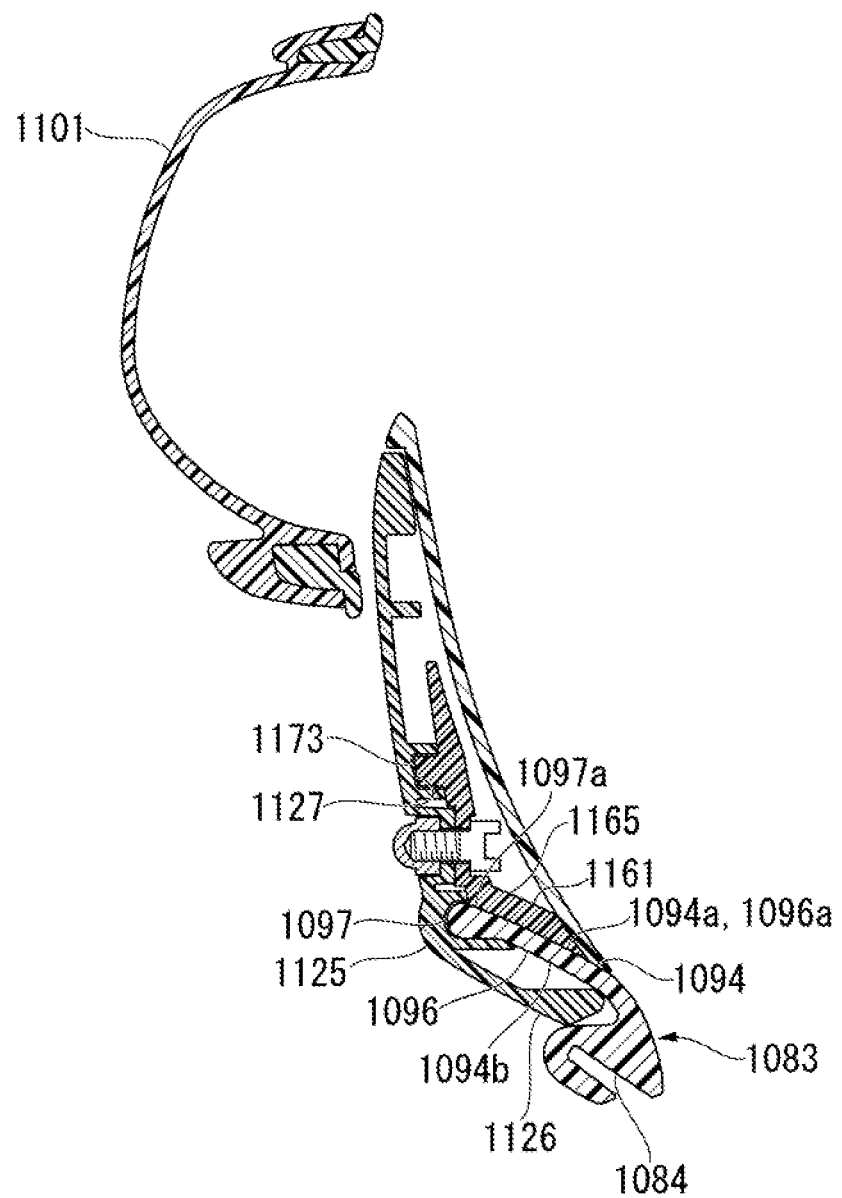
FIG. 17 is a cross-sectional view taken along a line C-C of FIG. 13.

As shown in FIGS. 15 to 17, the first extension portion 1121 is disposed inside the concave portion 1095 at the front side of the protrusion portion 1094 of the lower frame member 1083. The first extension portion 1121 includes a first contact portion 1125 which is disposed to contact the front surface 1097f and the lower surface 1097b of the bulging portion 1097 of the protrusion portion 1094, and a second contact portion 1126 which gradually extends rearward from the first contact portion 1125 as it goes downward and is disposed inside the concave portion 1095.

The first base portion 1122 is connected to the upper end portion of the first contact portion 1125.

The front end portion of the second contact portion 1126 contacts the inner surface of the concave portion 1025 (that is, the front portion of the upper surface 1093a of the base portion 1093 and the lower surface 1094b of the protrusion portion 1094).

As shown in FIGS. 14A and 14C, the width dimension of the first base portion 1122 is formed to gradually decrease as it goes upward. That is, the first base portion 1122 is formed in a substantially triangular shape as viewed from the front side or the rear side. As shown in FIG. 17, the lower portion of the first base portion 1122 is provided with two bolt holes 1123 which are separated from each other in the width direction. Two bolt holes 1123 are formed so that the bolts 1124 shown in FIG. 12 is insertable therethrough. Further, the first base portion 1122 is appropriately provided with a back surface cover engagement portion (not shown) capable of engaging with the back surface cover 1103.

As shown in FIGS. 14A, 14C, and 15, the first base portion 1122 is provided with a bolt hole 1133 formed at the substantially center portion in the width direction to extend in the vertical direction. The bolt hole 1133 is formed so that bolts 1131 shown in FIG. 12 is insertable therethrough. A pair of guide walls 1134 are formed at both sides of the bolt hole 1133 in the width direction. As shown in FIG. 15, the arm portion 1113 of the lumber support main body 1101 can be disposed at the front side of the bolt hole 1133 and the guide wall 1134, and the height adjustment portion 1107 can be disposed at the rear side of the bolt hole 1133 and the guide wall 1134. The height adjustment portion 1107 and the arm portion 1113 of the lumber support main body 1101 are connected to each other by the bolts 1131 through the bolt hole 1133.

As shown in FIGS. 14C, 15, and 16, the rear surface of each of the pair of guide walls 1134 is provided with a flat slide surface 1141 and a plurality of notch surfaces 1143 of a plurality of notches 1142 protruding rearward and formed at outside in the width direction (a side separated in the width direction) on each of the rear surfaces of the pair of guide walls 1134 at intervals in the vertical direction.

As shown in FIGS. 14A and 14C, the first extension portion 1121 and the lower portion of the first base portion 1122 are provided with four cutouts 1151 formed at intervals in the width direction so as to penetrate the first extension portion 1121 and the lower portion of the first base portion 1122 in the front-rear direction. The cutout 1151 extends in the front-rear direction from the rear edge of the first extension portion 1121 (that is, the outer circumferential edge of the first attaching member 1105 constituting the attaching portion 1102) through the first extension portion 1121, and further extends from the front end of the first extension portion 1121 to the upper side of the lower portion of the first base portion 1122.

Specifically, four cutouts 1151 respectively extend from the rear end (or the lower end) of the first extension portion 1121 to the intermediate portion of the first base portion 1122 in the height direction. The first extension portion 1121 and the lower portion of the first base portion 1122 are divided into five parts in the width direction due to four cutouts 1151 formed therein. When each of five divided parts is defined as a division portion 1152, the first contact portion 1125 in each of five division portions 1152 is disposed to contact the front surface 1097f and the lower surface 1097b of the bulging portion 1097 (see FIGS. 15 to 17) of the protrusion portion 1094, and the second contact portion 1126 in each of five division portions 1152 is disposed inside the concave portion 1095 (see FIGS. 15 to 17).

In two cutouts 1151A and 1151B, among four cutouts 1151, disposed at both ends in the width direction, hook opening portions 1153, each of which is opened to be wider than the width of the cutout 1151, are formed at a continuous portion between the first base portion 1122 and the first extension portion 1121.

Figure 18A:
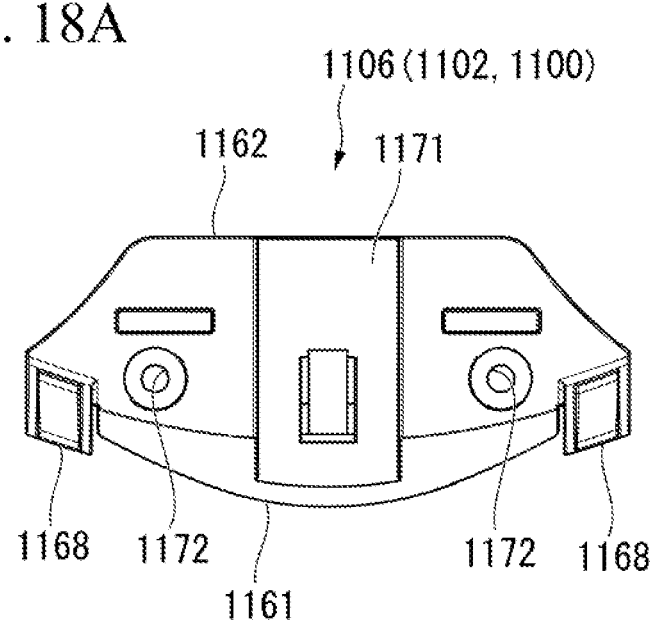
FIG. 18A is a front view showing a second attaching member constituting the attaching portion of the attachment structure for the optional member according to the second embodiment of the present invention.
Figure 18B:
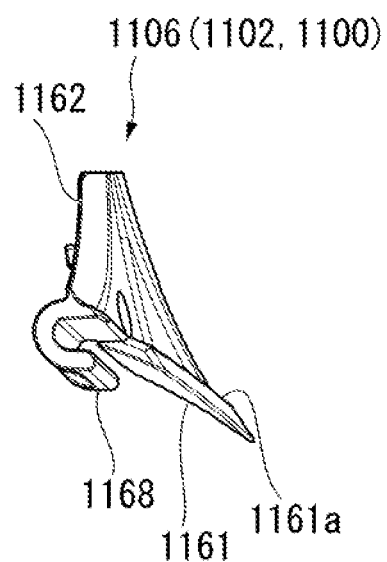
FIG. 18B is a side view showing the second attaching member constituting the attaching portion of the attachment structure for the optional member according to the second embodiment of the present invention.
Figure 18C:
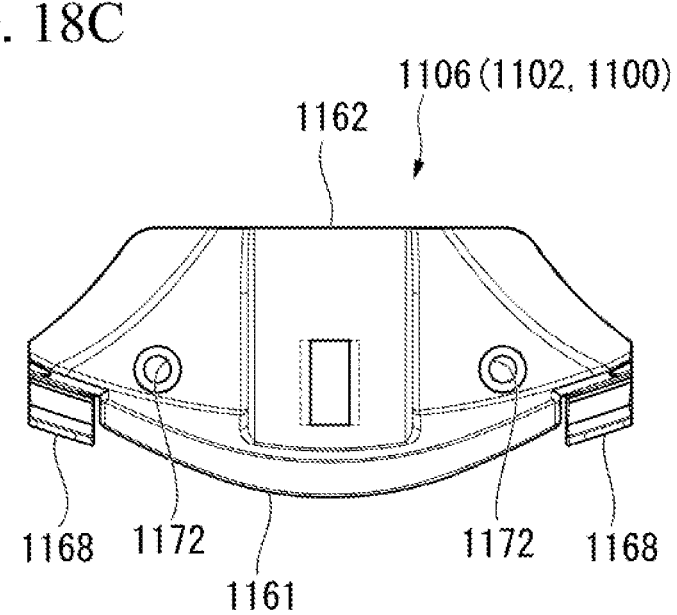
FIG. 18C is a rear view showing the second attaching member constituting the attaching portion of the attachment structure for the optional member according to the second embodiment of the present invention.

As shown in FIGS. 18A to 18C, the second attaching member 1106 includes a second base portion 1162 which extends in the vertical direction and a second extension portion 1161 which extends, from the lower edge portion of the second base portion 1162, in an inclination direction gradually directed downward as it goes rearward.

As shown in FIGS. 15 to 17, the second extension portion 1161 is disposed along an upper surface 1096a of the plate-shaped portion 1096 of the protrusion portion 1094 of the lower frame member 1083 (that is, the rear side of the upper surface 1094a of the protrusion portion 1094). The second extension portion 1161 includes a second contact portion 1165 which is formed at the intermediate portion of the second extension portion 1161 in the width direction and is disposed to contact the upper surface 1096b of the plate-shaped portion 1026 of the protrusion portion 1094, and hook portions 1168 which are formed at both end portions of the second extension portion 1161 in the width direction and are fittable on the bulging portion 1097 of the protrusion portion 1094 of the lower frame member 1083 from the outside (see FIGS. 18B and 19). As shown in FIGS. 18A and 18C, the upper end portion of the second contact portion 1165 and the upper end portions of the hook portions 1168 are connected to the second base portion 1162.

The second contact portion 1165 and the hook portion 1168 are not directly connected to each other.

As shown in FIG. 17, the front end portion of the second contact portion 1165 at both end portions in the width direction contact the upper surfaces 1097a of the bulging portions 1097 of the protrusion portion 1094, and a portion of the second contact portion 1165 at the rear side of the front end portion contacts the upper surface 1096a of the plate-shaped portion 1096 of the protrusion portion 1094. The front end portion of the second contact portion 1165 also contacts the first contact portion 1125 of the first attaching member 1105.

With the above-described configuration, the bulging portion 1097 of the protrusion portion 1094 is surrounded by the first contact portion 1125 and the second contact portion 1165 at each of both end portions in the width direction. Further, the plate-shaped portion 1096 of the protrusion portion 1094 is sandwiched between the second contact portions 1126 and 1165 in the vertical direction. When the first attaching member 1105 and the second attaching member 1106 are joined to each other in this state, the first contact portion 1125 and the second contact portion 1165 are locked to the protrusion portion 1094. Furthermore, the center portion of the second contact portion 1165 in the width direction contacts the upper surface 1096a of the plate-shaped portion 1096 of the protrusion portion 1094, but does not contact the bulging portion 1097 of the protrusion portion 1094.

As shown in FIGS. 18A to 18C and FIG. 19, the hook portion 1168 is provided with a concave portion 1169 which opens rearward. The hook portions 1168 are disposed at the front side of the lower frame member 1083 and are formed so that the bulging portion 1097 of the protrusion portion 1094 is fittable into the concave portions 1169. That is, the hook portions 1168 are formed to be hooked on the bulging portion 1097 from the front side. The hook portions 1168 disposed at the front side of the lower frame member 1083 are formed so that the hook opening portions 1153 of the first attaching member 1105 are respectively insertable therethrough and are respectively disposed inside the hook opening portions 1153.

The second base portion 1162 is formed to be larger than the width dimension of the arm portion 1113 of the lumber support main body 1101 and to be smaller than the width dimension of the first base portion 1122 of the first attaching member 1105. The second base portion 1162 is formed to be smaller than the height dimension of the first base portion 1122. The second base portion 1162 is disposed to cover the lower portion of the first base portion 1122 from the rear side.

In the front surface of the second base portion 1162, a groove portion 1171 which is recessed rearward is formed at the substantially center portion of the second base portion 1162 in the width direction throughout the height direction. The groove portion 1171 is disposed at the rear side of the bolt hole 1133 and the guide wall 1134 of the first base portion 1122.

The second base portion 1162 is provided with bolt holes 1172 through which the bolts 1124 shown in FIG. 12 for connecting the first base portion 1122 and the second base portion 1162 to each other are inserted. The front surface of the second base portion 1162 is provided with a second base portion side contact portion 1173 which contacts a first base portion side contact portion 1127 (see FIG. 17) formed in the rear surface of the first base portion 1122 of the first attaching member 1105. Note that the first base portion side contact portion 1127 and the second base portion side contact portion 1173 may be formed in a plane shape or may be formed in a shape fitted to each other.

As shown in FIG. 12, the bolts 1124 which join the first extension portion 1121 and the second extension portion 1161 of the second attaching member 1106 to each other are inserted through the bolt holes 1123 formed in the first attaching member 1105 and the bolt holes 1172 of the second attaching member 1106. The bolts 1124 which are inserted therethrough are held by nuts 1195 from the front side of the first attaching member 1105.

Similarly to the first base portion 1122, the second base portion 1162 is appropriately provided with a back surface cover engagement portion (not shown) which engages with the back surface cover 1103.

The back surface cover 1103 includes an engagement portion (not shown) which is able to engage with the back surface cover engagement portion of the first base portion 1122 and the back surface cover engagement portion of the second base portion 1162. As the engagement portion engages with the back surface cover engagement portion of the first base portion 1122 and the back surface cover engagement portion of the second base portion 1162, the back surface cover 1103 is attachable to the first attaching member 1105 and the second attaching member 1106.

The height adjustment portion 1107 is attached to the lumber support main body 1101 and is supported by the first attaching member 1105 and the second attaching member 1106 along with the lumber support main body 1101 so that the height thereof is adjustable. Specifically, as shown in FIGS. 15 and 16, the height adjustment portion 1107 is provided between a portion of the second attaching member 1106 where the groove portion 1171 of the second base portion 1162 is formed and a portion of the first attaching member 1105 where the guide wall 1134 and the bolt hole 1133 of the first base portion 1122 are formed.

As shown in FIGS. 12, 15, and 16, the height adjustment portion 1107 includes a slide plate 1181 and a positioner 1182 which is joined to the outer peripheral portion of the slide plate 1181, as viewed from the front-rear direction.

The slide plate 1181 is formed in a substantially rectangular block shape longer in the vertical direction as viewed from the front-rear direction, and opens to the lower side. The slide plate 1181 is provided with a bolt hole 1187 through which the bolts 1131 is inserted so that the slide plate 1181 is joined to the arm portion 1113 of the lumber support main body 1101. The slide plate 1181 is formed to be slidable in the vertical direction along the pair of slide surfaces 1141.

Figure 20:
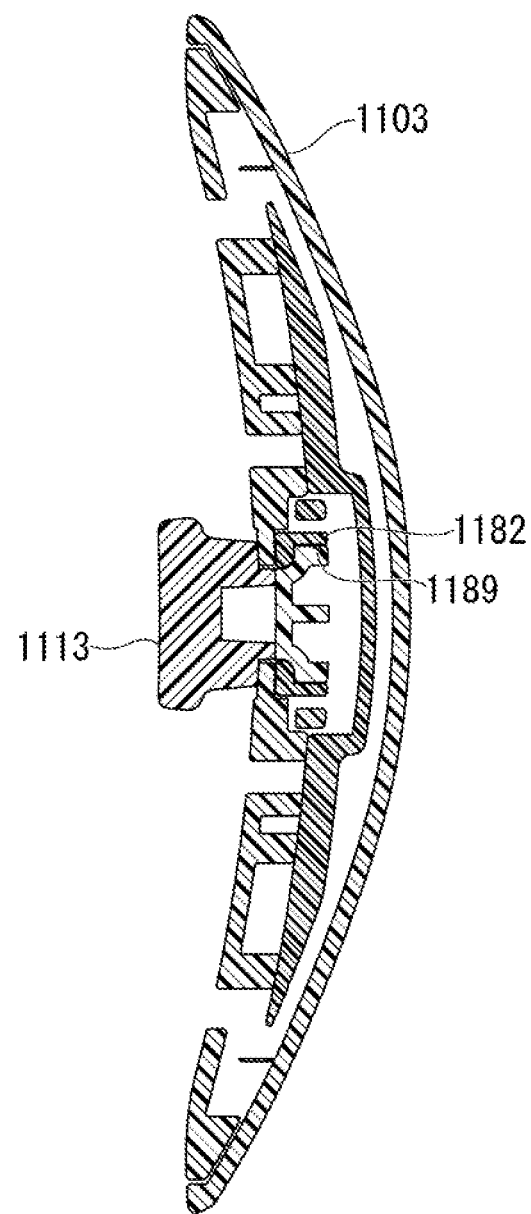
FIG. 20 is a cross-sectional view taken along a line E-E of FIG. 13.

The positioner 1182 is a frame-shaped member provided with an opening portion 1189 penetrating the positioner 1182 in the front-rear direction. The slide plate 1181 is fittable to the opening portion 1189 of the positioner 1182 (see FIG. 20). The positioner 1182 and the slide plate 1181 which are fitted to each other are disposed between the portion of the second attaching member 1106 where the groove portion 1171 of the second base portion 1162 is formed and the portion of the first attaching member 1105 where the bolt hole 1133 and the guide wall 1134 of the first base portion 1122 are formed.

As shown in FIG. 12, projection portions 1192 which protrude forward are formed at both sides of the positioner 1182 in the width direction. The positioner 1182 is formed to be slidable in the vertical direction along the pair of notch surface 1143. The projection portion 1192 is able to engage with each of the plurality of notches 1142 of the notch surface 1143.

The arm portion 1113 and the height adjustment portion 1107 of the lumber support main body 1101 face each other with the guide wall 1134 and the bolt hole 1133 of the first base portion 1122 interposed therebetween, and are connected to each other by the pair of upper and lower bolts 1131 penetrating the bolt hole 1133. Accordingly, the arm portion 1113 and the height adjustment portion 1107 are formed to be slidable in the vertical direction along the bolt hole 1133.

In the height adjustment portion 1107, the upward movement is regulated by the contact between the upper end portion of the positioner 1182 and the upper wall of the bolt hole 1133, and the downward movement is regulated by the contact between the lower end portion of the positioner 1182 and the lower wall of the bolt hole 1133. Accordingly, the movement range of the lumber support main body 1101 in the vertical direction is regulated.

When the height adjustment portion 1107 is disposed at the lower portion side of the movement region, the second base portion 1162 of the second attaching member 1106 is disposed at the rear side of the height adjustment portion 1107. When the height adjustment portion 1107 is disposed at the upper portion side of the movement region, the back surface cover 1103 is disposed at the rear side of the height adjustment portion 1107.

When the projection portion 1192 of the positioner 1182 of the height adjustment portion 1107 engages with the notch 1142 at a desired height, the arm portion 1413 and the height adjustment portion 1107 are fixed at a desired height of a plurality of height stages along the slit 1053. In this way, the lumber support main body 1101 can be disposed at a desired height.

Subsequently, a method of attaching the lumber support 1100 to the lower frame member 1083 will be described.

First, the first attaching member 1105 and the second attaching member 1106 are attached to the lower frame member 1083.

Specifically, the first attaching member 1105 is disposed at the front side of the lower frame member 1083, the first contact portion 1125 is brought into contact with the bulging portion 1097 of the protrusion portion 1094 of the lower frame member 1083, and the second contact portion 1126 is inserted into the concave portion 1095 of the lower frame member 1083. At this time, the second contact portion 1126 is disposed between two wall portions 1095*a* and 1095*a* formed in the concave portion 1095. Accordingly, the movement of the first attaching member 1105 in the width direction is regulated.

Figure 21:
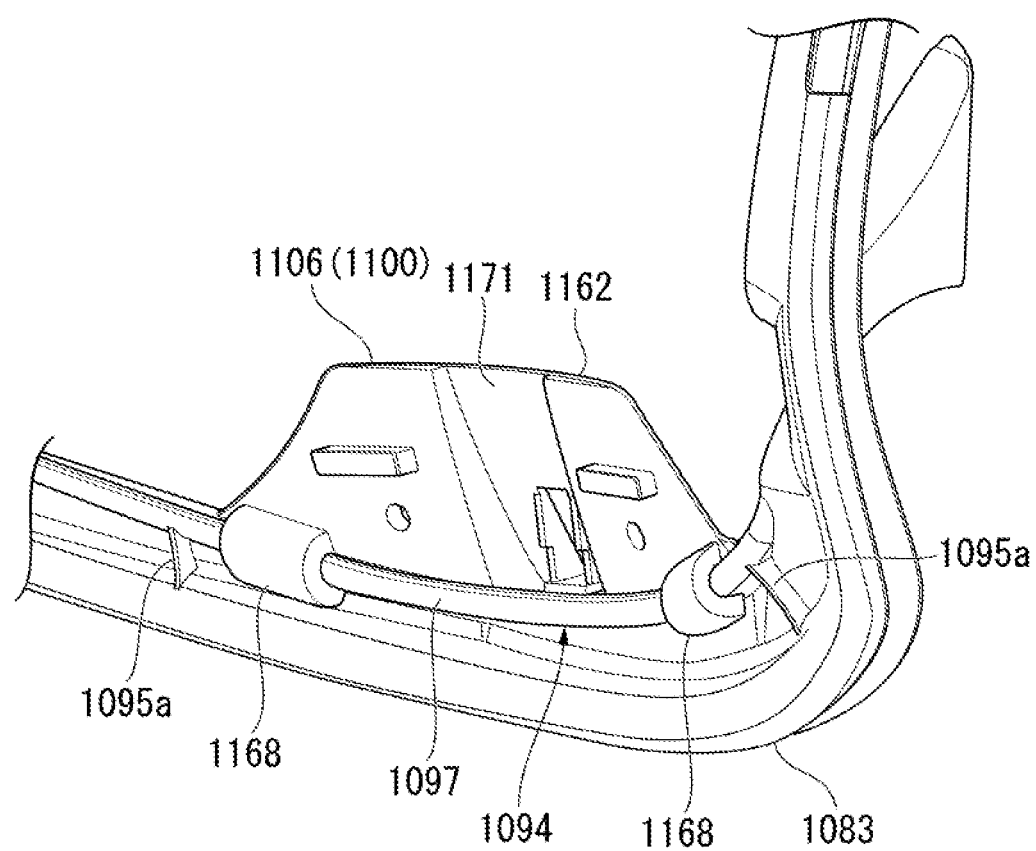
FIG. 21 is a diagram showing the second attaching member attached to the lower frame member of the chair according to the second embodiment of the present invention.
Figure 22:
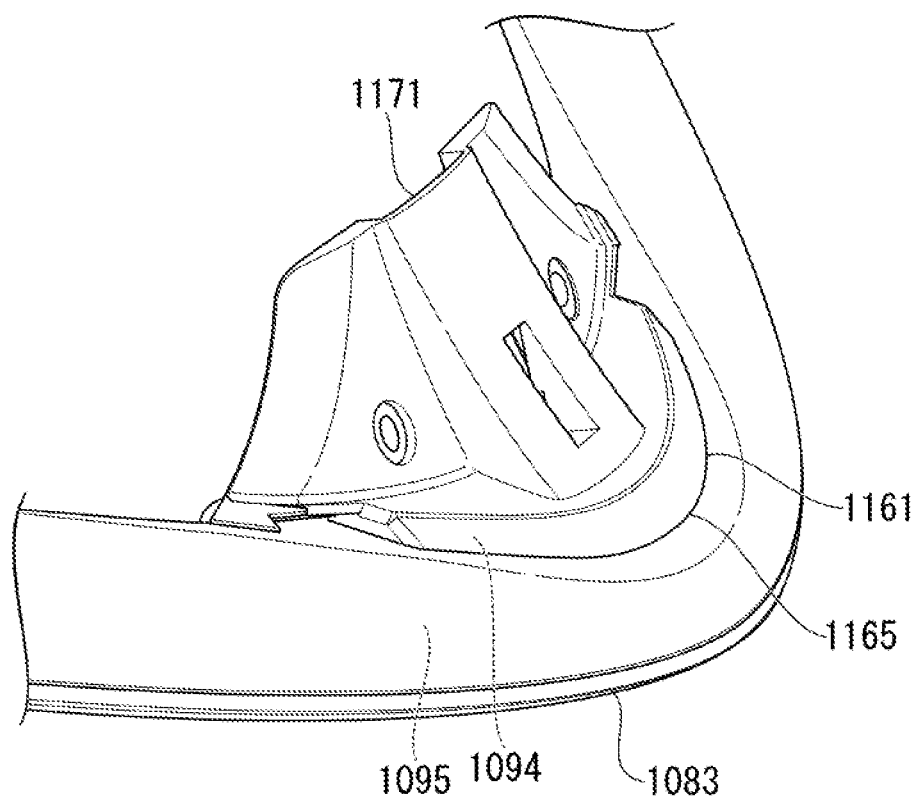
FIG. 22 is another diagram showing the second attaching member attached to the lower frame member of the chair according to the second embodiment of the present invention.

Before or after the installation of the first attaching member 1105, as shown in FIGS. 21 and 22, the second attaching member 1106 is disposed at the rear side of the lower frame member 1083 and the second contact portion 1165 is brought into contact with the upper surface 1096*a* of the plate-shaped portion 1096 of the protrusion portion 1094 of the lower frame member 1083. Note that the first attaching member 1105 is not shown in FIGS. 21 and 22.

Further, the hook portions 1168 of the second attaching member 1106 are caught to the bulging portion 1097 of the protrusion portion 1094 of the lower frame member 1083 from the front side and are disposed inside the hook opening portions 1153 of the first attaching member 1105. Subsequently, the first base portion side contact portion 1127 of the first base portion 1122 and the second base portion side contact portion 1173 of the second base portion 1162 are brought into contact with each other in the front-rear direction, and the first extension portion 1121 and the second base portion 1162 are fastened to each other by the bolts 1124.

When the first attaching member 1105 and the second attaching member 1106 are joined to each other, the relative positions of the first attaching member 1105 and the second attaching member 1106 are fixed and the first attaching member 1105 and the second attaching member 1106 are attached to the lower frame member 1083. At this time, the distal end portion of the second contact portion 1126 contacts the upper surface 1093*a* of the base portion 1093.

Next, the lumber support main body 1101 is attached to the first attaching member 1105 and the second attaching member 1106. The lumber support main body 1101 is disposed at the front side of the bolt hole 1133 of the first base portion 1122, and the height adjustment portion 1107 is disposed at the rear side of the bolt hole 1133 of the first base portion 1122. Subsequently, the height adjustment portion 1107 and the arm portion 1113 of the lumber support main body 1101 are joined by the bolts 1131 through the bolt hole 1133. The projection portions 1192 of the positioner 1182 of the height adjustment portion 1107 are made to engage with the notch 1142 of the guide wall 1134.

Next, the back surface cover 1103 is installed. The back surface cover 1103 is disposed at the rear side of the first base portion 1122 and the second base portion 1162 to engage with the first base portion 1122 and the second base portion 1162. Accordingly, the lumber support 1100 is attached to the front frame member 1070F. With the above-described procedure, the lumber support 1100 is attached to the lower frame member 1083.

Subsequently, operational effects of the backrest 1001 according to the above-described embodiment will be described.

As described above, according to the attachment structure 1104 of the embodiment, when the first extension portion 1121 and the second base portion 1162 are fastened to each other by the bolts 1124 and the first attaching member 1105 and the second attaching member 1106 are attached to the lower frame member (the attachment portion) 1083, the first attaching member (the attaching portion) 1105 can be displaced so as to accord with the lower surface (attached surface) 1094*b* of the protrusion portion 1094 while contacting the lower surface 1094*b*. Accordingly, the first attaching member 1105 can be attached to the lower surface 1094*b* of the protrusion portion 1094 while eliminating a gap formed by a difference in shape between the lower surface 1094*b* of the protrusion portion 1094 and the upper surface (that is, the contact surface) of the second contact portion 1126 of the first attaching member 1105. Thus, even when there is a difference in shape between the front frame member 1070F and the first attaching member 1105 manufactured by molding using a die, the first attaching member 1105 and the second attaching member 1106 can be satisfactorily attached to the lower surface 1094b and the upper surface 1094a of the protrusion portion 1094, and hence the attachment state between the lumber support 1100 and the front frame member 1070F can be robustly maintained.

Further, since the cutouts 1151 which open downward from the outer circumferential edge are formed, the first attaching member (attaching portion) 1105 can be elastically deformed in the width direction at the time of the fastening by the bolt. Accordingly, even when the lower frame member 1083 has a distortion in shape in the front view (for example, the lower frame member 1083 protrudes downward or the curvature of the curve of the lower frame member 1083 is different from a designed value), the lower frame member 1083 can be attached to the first attaching member (attaching portion) 1105 while absorbing the distortion.

Further, according to the attachment structure 1104 of the embodiment, since the first attaching member 1105 is attached to the lumber support main body 1101 to be attachable and detachable, a portion to be deformed in response to the lower surface 1094b of the protrusion portion 1094 can be manufactured in a compact size separately from the lumber support main body 1101 and only the first attaching member 1105 can be replaced if necessary even in the case of inspection or damage.

Further, according to the attachment structure 1104 of the embodiment, it is possible to deform totally five division portions 1152 provided at both sides, in the circumferential direction, of the cutouts 1151 of the first attaching member 1105 in response to the lower surface 1094b of the protrusion portion 1094 by changing the size (for example, the width dimension or the like) of the cutouts 1151 of the first attaching member 1105. Accordingly, even when there is a difference in shape between the first attaching member 1105 and the front frame member 1070F as described above, it is possible to satisfactorily attach the first attaching member 1105 and the second attaching member 1106 to the lower surface 1094b and the upper surface 1094a of the protrusion portion 1094 and to robustly maintain the attachment state between the lumber support 1100 and the front frame member 1070F. Further, it is possible to easily manufacture the first attaching member 1105 just by forming the cutouts 1151 without requiring a complex mechanism or manufacturing process.

Furthermore, according to the lumber support 1100 of the embodiment, even when there is a difference in shape between an attached surface such as the lower surface 1094b of the protrusion portion 1094 and each surface shape of the first attaching member 1105 of the lumber support 1100, it is possible to satisfactorily attach the lumber support 1100 to the attached surface and to robustly maintain the attachment state between the lumber support 1100 and the attachment portion.

Furthermore, according to the chair 1010 of the embodiment, even when there is a difference in shape between the attachment portion and the lumber support 1100, it is possible to satisfactorily attach the lumber support 1100 to the attached surface and to robustly maintain the attachment state between the lumber support 1100 and the attachment portion in the chair 1010.

Although the embodiment of the backrest according to the present invention has been described, the present invention is not limited to the above-described embodiment and can be appropriately modified without departing from the gist thereof.

For example, in the above-described embodiment, the attaching portion includes the first attaching member 1105 and the second attaching member 1106, but these members may be integrated with each other.

Further, in the above-described embodiment, the first attaching member 1105 and the lumber support main body 1101 are separated from each other, but the attaching portion may be integrated with the lumber support main body 1101.

Further, in the above-described embodiment, the cutout 1151 is formed only in the first attaching member 1105, but may be formed in the second attaching member 1106.

Furthermore, the optional member according to the present invention is not limited to the lumber support 1100 and may be any member such as a hanger and a headrest that is attachable to furniture. Further, the furniture including the optional member is not limited to the chair and may be furniture such as a desk and a shelf.

Further, at least one of the first contact portion 1125 of the first attaching member 1105, the second contact portion 1126 of the first attaching member 1105, and the second extension portion 1161 of the second attaching member 1106, as the attaching portion of the present invention, may be formed of a material that is relatively more elastically deformable than the other portions of the first attaching member 1105 and the second attaching member 1106, and may be integrated with the other portions by two color molding or the like. In such a case, it is not essential to form the cutout in the attaching portion.

Further, the division portions 1152 as the attaching portion of the present invention may be a member separated from the first attaching member 1105, and may be pivotally supported by a pivot shaft having an axis in a direction along the longitudinal direction of the lower frame member 1083. In such a case, it is possible to more reliably prevent a gap from being formed between the division portions 1152 and the lower frame member 1083 by appropriately setting a rotation range of each division portion 1152.

Third Embodiment

Hereinafter, a backrest according to a third embodiment of the present invention will be described with reference to FIGS. 23 to 37.

Figure 23:
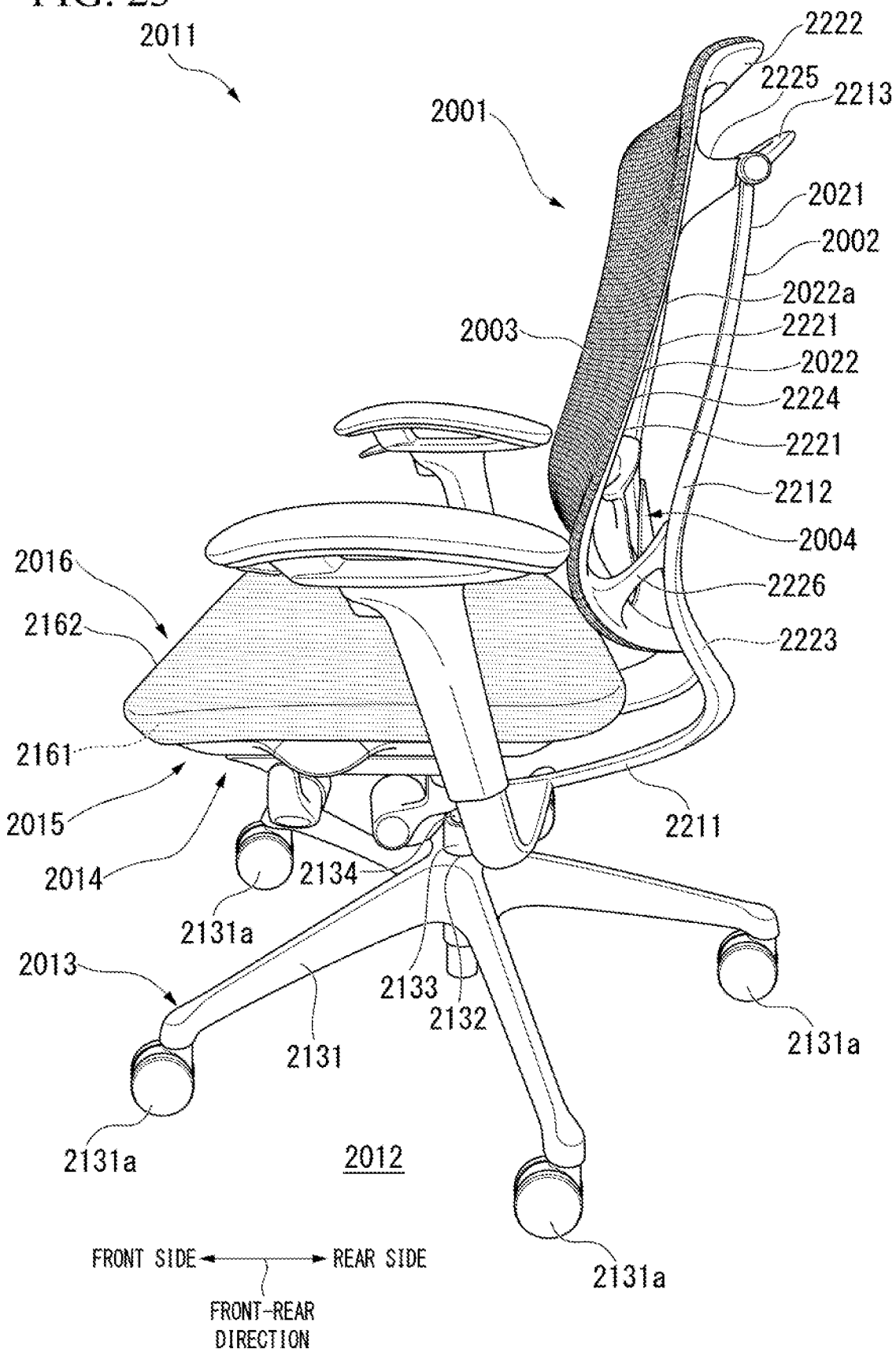
FIG. 23 is a perspective view showing an example of a chair provided with a backrest according to a third embodiment of the present invention.

A chair 2011 shown in FIG. 23 includes a leg 2013 which is installed on a floor 2012, a box-shaped support base 2014 which is installed on the upper portion of the leg 2013, a seat receiving member 2015 that is attached to the upper portion of the support base 2014, a seat body 2016 which is slidably supported by the seat receiving member 2015 and on which a seated person can sit, and a backrest 2001 which extends from the support base 2014 and is able to support the back of the seated person sitting on the seat body 2016. The backrest 2001 of the chair 2011 serves as a backrest according to the embodiment.

A side in which the seated person sitting on the seat body 2016 faces forward will be referred to as a "front side", the opposite side thereof will be referred to as a "rear side", and a direction connecting the front side and the rear side will be referred to as a "front-rear direction". A horizontal direction perpendicular to the front-rear direction will be referred to as a "width direction" and a direction connecting the upper and lower sides will be referred to as a "vertical direction".

The leg 2013 includes a multi-legged bar 2131 with casters 2131a and a leg pillar 2132 which stands up from the center portion of the multi-legged bar 2131 and incorporates a gas spring (not shown) as an elevation mechanism.

An outer tube 2133, which constitutes the lower portion of the leg pillar 2132, is fitted and supported on the multi-legged bar 2131 so as not to be rotatable. The support base 2014 is fixed to and supported by the upper end portion of an inner tube 2134 which constitutes the upper portion of the leg pillar 2132, and the lower portion of the inner tube 2134 is supported by the outer tube 2133 to be rotatable in the horizontal direction.

An elevation adjustment mechanism of the leg pillar 2132 and a tilt adjustment mechanism of the backrest 2001 are built in the support base 2014.

The seat receiving member 2015 includes four link arms (not shown) which are attached to the upper portion of the support base 2014 and a pair of left and right fixed frames (not shown) which connect the link arms to each other.

The seat body 2016 includes a seat frame 2161 and a surface material 2162 which is stretched over the seat frame 2161.

The backrest 2001 includes a backrest support member 2021 which is a reinforcement member pivotally supported by the support base 2014, a backrest main body 2022 which is supported by the front side of the backrest support member 2021, a surface material (tensile material) 2003 provided in an inner peripheral space of a back frame member 2022a which forms a part of the backrest main body 2022 and defines the outer peripheral shape of the backrest main body 2022, and a lumber support (optional member) 2004 which is attached to the backrest support member 2021. The surface material 2003 is not shown in the drawings other than FIGS. 23 and 24.

The lumber support 2004 is disposed at a position corresponding to the waist of the seated person sitting on the chair 2011. In the embodiment, the lumber support 2004 is configured to receive the load of the seated person applied from the front side (first side) to the rear side (the second side) in the front-rear direction (a surface perpendicular direction).

The backrest support member 2021 includes lower edge portions 2211, side edge portions 2212, and an upper edge portion 2213. The lower edge portions 2211, the side edge portions 2212, and the upper edge portion 2213 are integrally formed by, for example, metal such as aluminum or resin having a predetermined strength.

The lower edge portions 2211 are connected to the tilt adjustment mechanism inside the support base 2014, and extend from the left and right sides of the rear portion of the support base 2014. The lower edge portion 2211 is gradually inclined rearward as it goes upward. Further, the lower edge portions 2211 are respectively provided with armrests disposed at the sides of the seat body 2016.

The side edge portions 2212 are provided at two positions to be respectively continuous to the upper end portions of two lower edge portions 2211. Each side edge portion 2212 is gradually inclined outward (to be separated from the other side edge portion 2212) in the width direction as it goes upward.

The lower portion of the side edge portion 2212 is gradually inclined forward as it goes upward. The upper portion of the side edge portion 2212 is gradually inclined rearward as it goes upward. The upper portions of two side edge portions 2212 are connected to each other by the upper edge portion 2213.

The backrest main body 2022 includes a pair of vertical frame members 2221 which are disposed to be separated from each other in the width direction of the backrest 2001, an upper frame member 2222 that connects the upper ends of the pair of vertical frame members 2221 to each other, and a lower frame member (frame member) 2223 that connects the lower ends of the pair of vertical frame members 2221 to each other. The pair of vertical frame members 2221, the upper frame member 2222, and the lower frame member 2223 are integrally formed of, for example, resin or the like into an annular shape and are formed to be elastically deformable in response to a force applied from the surface material 2003. The pair of vertical frame members 2221, the upper frame member 2222, and the lower frame member 2223 are combined into the back frame member 2022a.

Each of the outer edge portions of the pair of vertical frame members 2221, the upper frame member 2222, and the lower frame member 2223 is provided with a groove portion 2224 which is recessed toward the inside of the backrest 2001 and is continuous in the circumferential direction. The groove portion 2224 is used to lock the surface material 2003 when the outer peripheral end portion of the surface material 2003 is caught thereinto. The surface material 2003 is disposed at the front side of the backrest main body 2022. The vicinity of the outer edge portion of the surface material 2003 is wound around the outside of the backrest main body 2022, and the outer edge portion of the surface material 2003 engages with the groove portion 2224. The surface material 2003 is used to receive the load of the seated person leaning against the backrest 2001.

Each of the pair of vertical frame members 2221 extends in the vertical direction. Specifically, each of the pair of vertical frame members 2221 is gradually inclined inward in the width direction as it goes downward. As shown in FIG. 25, each of the pair of vertical frame members 2221 (only one vertical frame member 2221 is shown in FIG. 25) includes a base portion 2221a which is disposed at the outside in the width direction and is provided with the groove portion 2224, and a protrusion portion 2221b which gradually protrudes forward from the rear edge portion of the base portion 2221a as it goes inward in the width direction. Each of the base portion 2221a and the protrusion portion 2221b is formed throughout the longitudinal direction (the height direction) of the pair of vertical frame members 2221.

Figure 24:
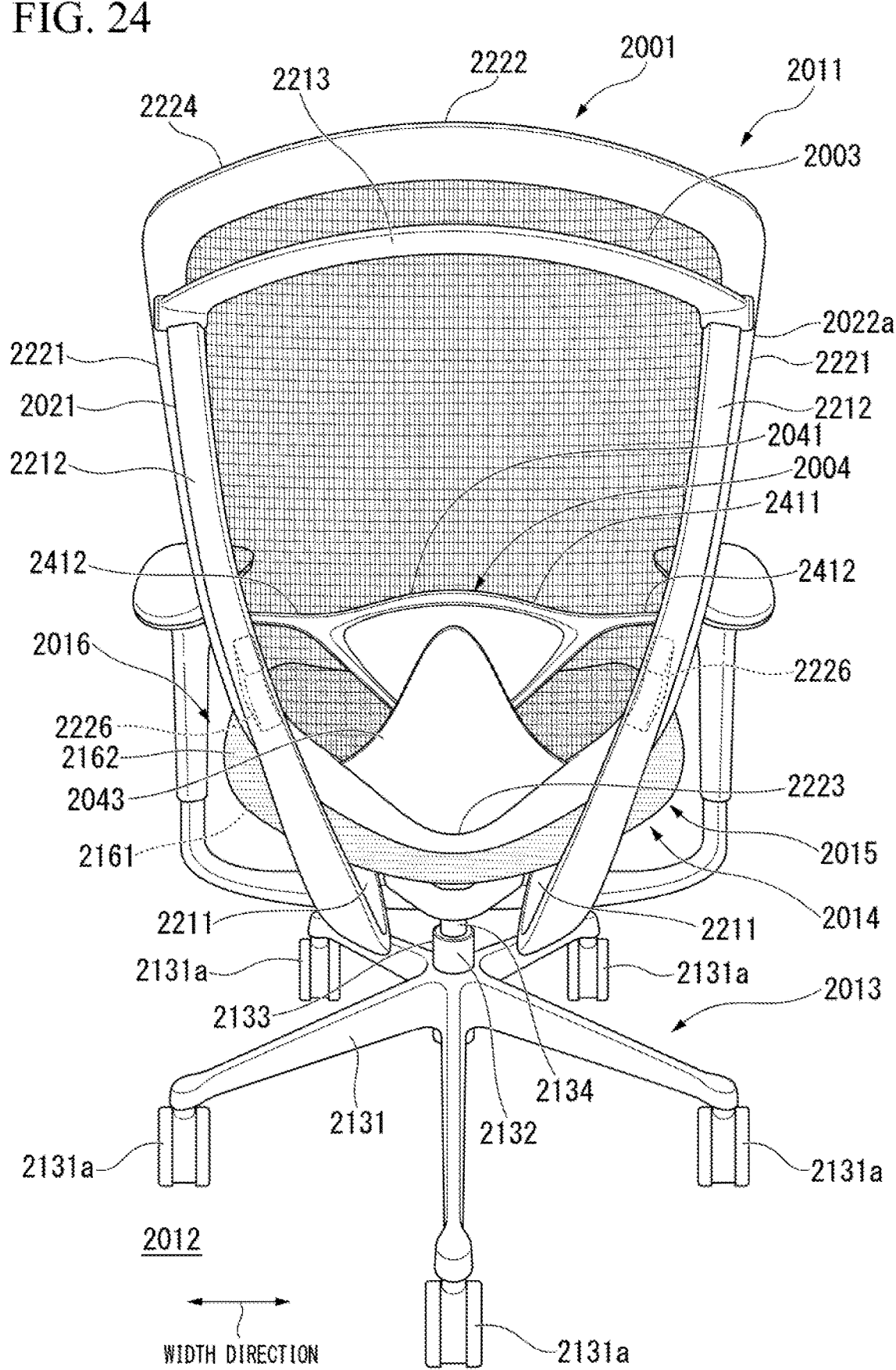
FIG. 24 is another perspective view showing the example of the chair provided with the backrest according to the third embodiment of the present invention.

As shown in FIG. 24, an upper connection portion 2225 and a lower connection portion 2226 extending rearward are integrally formed at the upper portion and the lower portion of each of the pair of vertical frame members 2221. The tip end portions (rear end portions) of the upper connection portion 2225 and the lower connection portion 2226 are respectively connected to the side edge portion 2212 of the backrest support member 2021.

As shown in FIG. 23, the upper frame member 2222 extends in the width direction and both end portions thereof in the width direction are connected to the upper end portions of the pair of vertical frame members 2221. The upper frame member 2222 is curved so that the center portion in the width direction protrudes upward in relation to both end portions.

The lower frame member 2223 extends in the width direction and both end portions thereof in the width direction are connected to the lower end portions of the pair of vertical frame members 2221. The lower frame member 2223 is curved so that the center portion in the width direction protrudes downward in relation to both end portions. The lower frame member 2223 is formed so that the lumber support 2004 is attachable thereto or detachable therefrom.

As shown in FIGS. 25 and 26, the lower frame member 2223 includes a base portion 2023 which is disposed at the lower portion side and is provided with the groove portion 2224, a protrusion portion 2024 which gradually protrudes forward from the rear edge portion of the base portion 2023 as it goes upward, and a concave portion 2025 which is surrounded by the base portion 2023 and the protrusion portion 2024. Each of the base portion 2023, the protrusion portion 2024, and the concave portion 2025 is formed throughout the longitudinal direction (the width direction) of the lower frame member 2223.

A portion of the upper surface 2023a of the base portion 2023 which is disposed at the front side of the protrusion portion 2024 is formed as a surface facing upward. The groove portion 2224 which is formed in the base portion 2023 opens in an obliquely rear direction as a lower rear side.

Both end portions of the base portion 2023 in the width direction are respectively continuous to the lower end portions of the base portions 2221a of the vertical frame members 2221 to be integrated therewith.

The protrusion portion 2024 includes a plate-shaped portion 2026 which is disposed at the base end side (the side of the base portion 2023) and is formed in a plate shape having a substantially uniform thickness in a direction protruding from the base portion 2023, and a bulging portion 2027 which is disposed at the tip end portion of the protrusion portion 2024 and bulges to be thicker than the plate-shaped portion 2026. The base portion 2023, the plate-shaped portion 2026, and the bulging portion 2027 are integrally formed with one another.

In the plate-shaped portion 2026, a surface facing a lower front side is defined as a front surface 2026a and a surface facing an upper rear side is defined as a rear surface 2026b. The front surface 2026a of the plate-shaped portion 2026 is continuous to the upper surface 2023a of the base portion 2023.

The front surface of the bulging portion 2027 is curved to protrude forward.

Both end portions of the protrusion portion 2024 in the width direction are respectively continuous to the lower end portions of the protrusion portions 2221b of the vertical frame members 2221 to be integrated therewith.

The concave portion 2025 is formed by the front surface 2026a of the plate-shaped portion 2026 of the protrusion portion 2024 and the upper surface 2023a of the base portion 2023, and opens forward. The upper surface 2023a of the base portion 2023 which forms the concave portion 2025 constitutes a rotation restraint surface 2028 of the present invention. The rotation restraint surface 2028 will be described below.

A first engaged portion 2063 to be described later is locked to a portion formed in the intermediate portion, in the width direction, of the lower frame member 2223 of the protrusion portion 2024. The portion in the intermediate portion of the protrusion portion 2024 in the width direction, to which the first engaged portion 2063 is locked, is set as a first locking portion 2024a.

A second engaged portion 2512 to be described later is locked to a portion formed at the intermediate portion of the lower frame member 2223 in the width direction of the concave portion 2025. The portion in the intermediate portion of the concave portion 2025 in the width direction, to which the second engaged portion 2512 is locked, is set as a second locking portion 2025a.

In the concave portion 2025, wall portions 2025b and 2025b are respectively formed at both sides of the second locking portion 2025a. The wall portions 2025b are provided to regulate the movement in the width direction of the second engaged portion 2512 locked to the second locking portion 2025a.

The wall portion 2025b is formed in a plate shape having a plate surface substantially facing the width direction, and a portion of the wall portion 2025b other than the front edge portion is continuous to the inner surface of the concave portion 2025. The wall portion 2025b is integrated with the base portion 2023 and the protrusion portion 2024.

Figure 27:
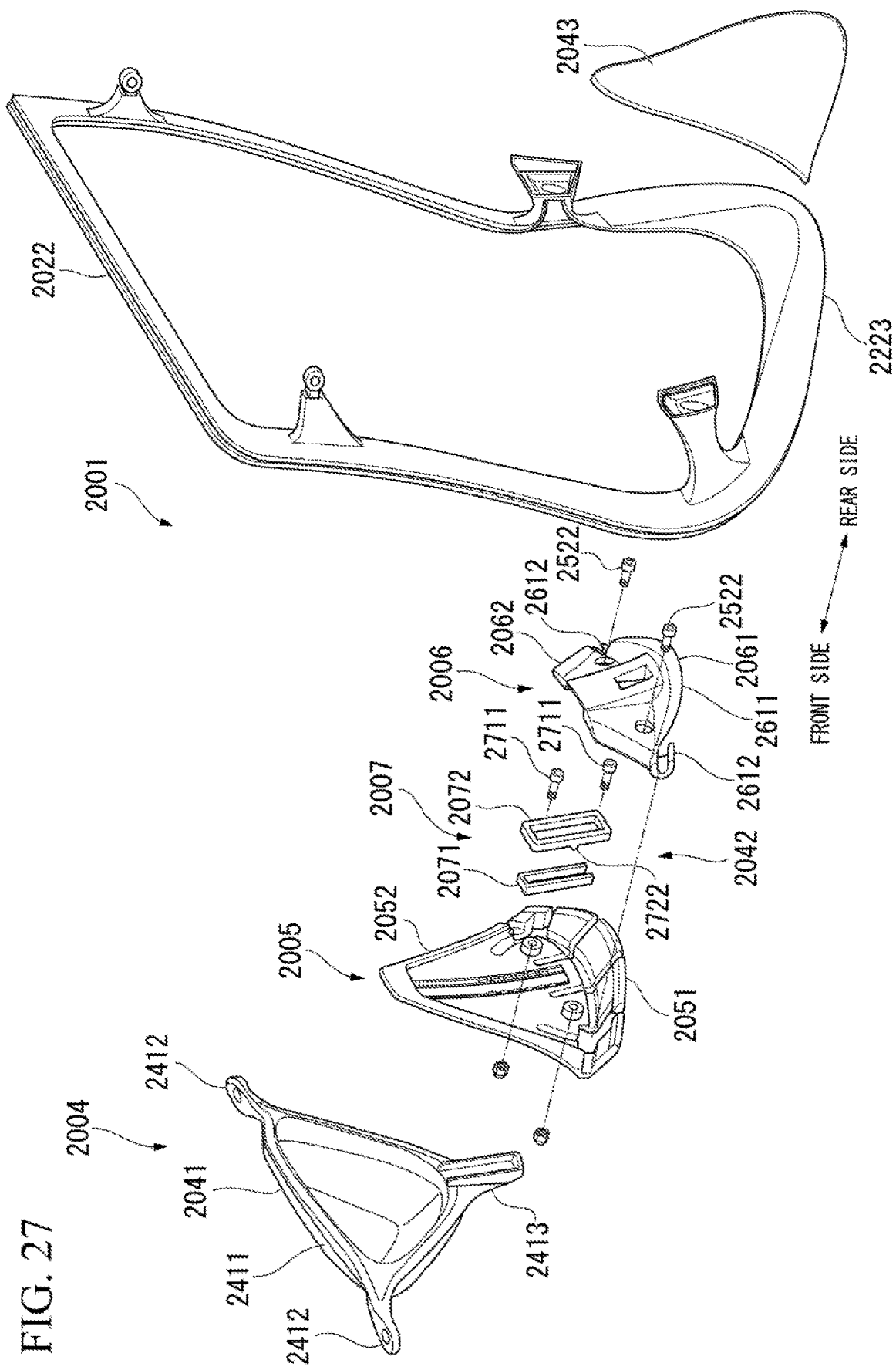
FIG. 27 is an exploded perspective view showing the backrest according to the third embodiment of the present invention.

As shown in FIGS. 25, 26, and 27, the lumber support 2004 includes a lumber support main body portion (main body portion) 2041 which receives the load of the seated person sitting on the chair 2011 (see FIG. 23), an attaching portion 2042 which is attached to the lower frame member 2223 and supports the lumber support main body portion 2041, and a back surface cover 2043 which covers the attaching portion 2042 from the rear side.

The lumber support main body portion 2041 is disposed along the rear side of the surface material 2003 of the backrest 2001. The lumber support main body portion 2041 includes a main support portion 2411 which is disposed at the center portion of the backrest 2001 in the width direction, elevation operation portions 2412 which extend outward in the width direction from both sides of the main support portion 2411 in the width direction and are configured to elevate the lumber support main body portion 2041, and an arm portion 2413 which extends downward from the main support portion 2411 and to which the height adjustment portion 2007 of the attaching portion 2042 is attached. The main support portion 2411, the elevation operation portions 2412, and the arm portion 2413 are integrally formed with one another.

Furthermore, the shape or structure of the lumber support main body portion 2041 is not limited to the above-described embodiment and can be appropriately changed.

The attaching portion 2042 includes a first attaching member 2005 that is disposed at the front side of the lower frame member 2223 and is attached to the lower frame member 2223, a second attaching member 2006 that is disposed at the rear side of the lower frame member 2223 and is attached to the lower frame member 2223, and a height adjustment portion 2007 which is attached to the lumber support main body portion 2041 and is supported by the first attaching member 2005 and the second attaching member 2006 to be adjustable in height along with the lumber support main body portion 2041.

The first attaching member 2005 and the second attaching member 2006 are disposed to overlap each other in the front-rear direction so that the centers thereof match each other in the width direction.

Figure 29A:
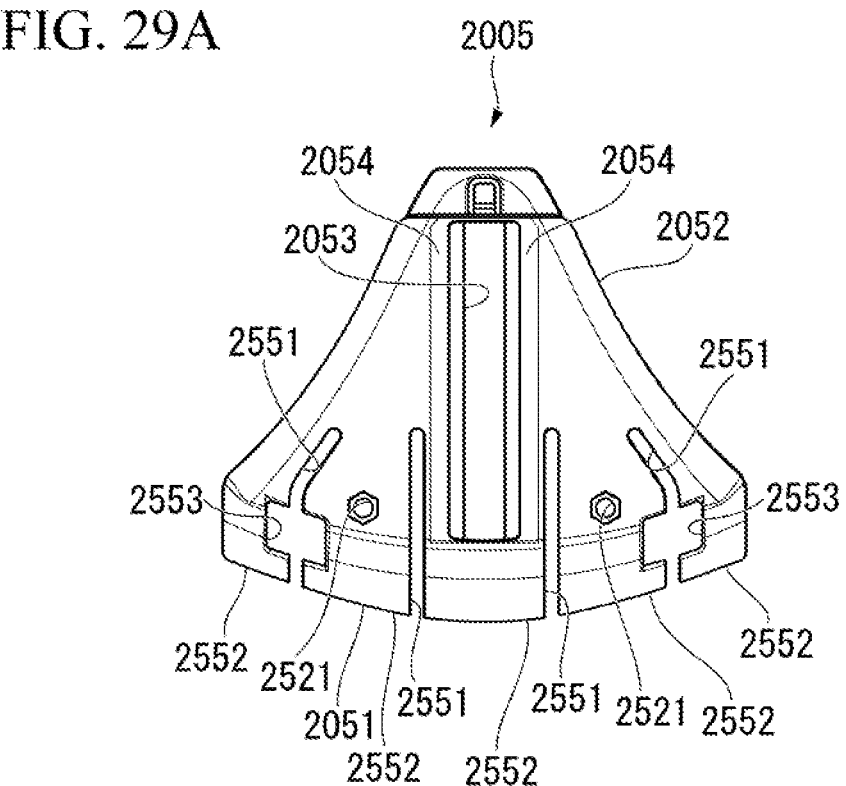
FIG. 29A is a front view showing a first attaching member according to the third embodiment of the present invention.
Figure 29B:
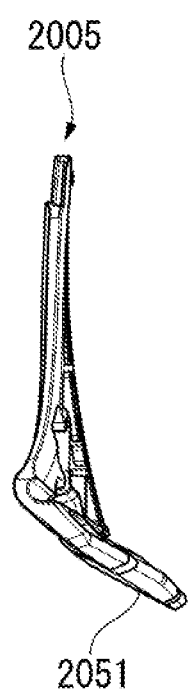
FIG. 29B is a side view showing the first attaching member according to the third embodiment of the present invention.
Figure 29C:
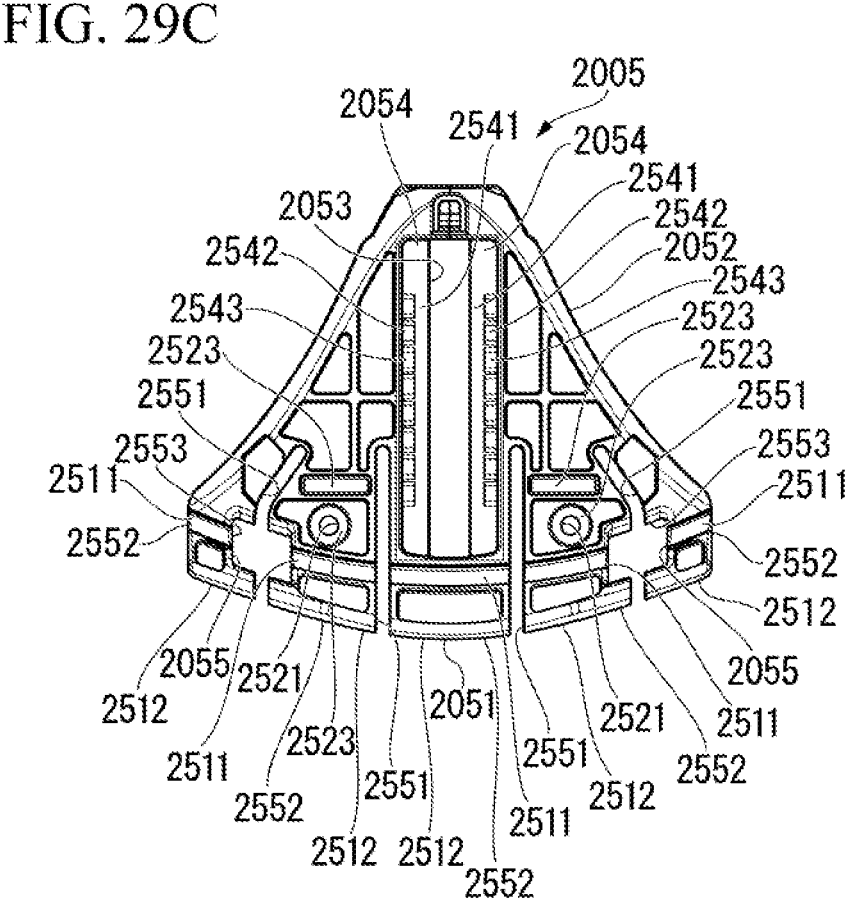
FIG. 29C is a rear view showing the first attaching member according to the third embodiment of the present invention.

As shown in FIGS. 29A to 29C, the first attaching member 2005 includes a first base portion 2052 which extends in the vertical direction and a first extension portion 2051 which extends, from the lower edge portion of the first base portion 2052, in an inclination direction gradually directed downward as it goes rearward.

Figure 30:
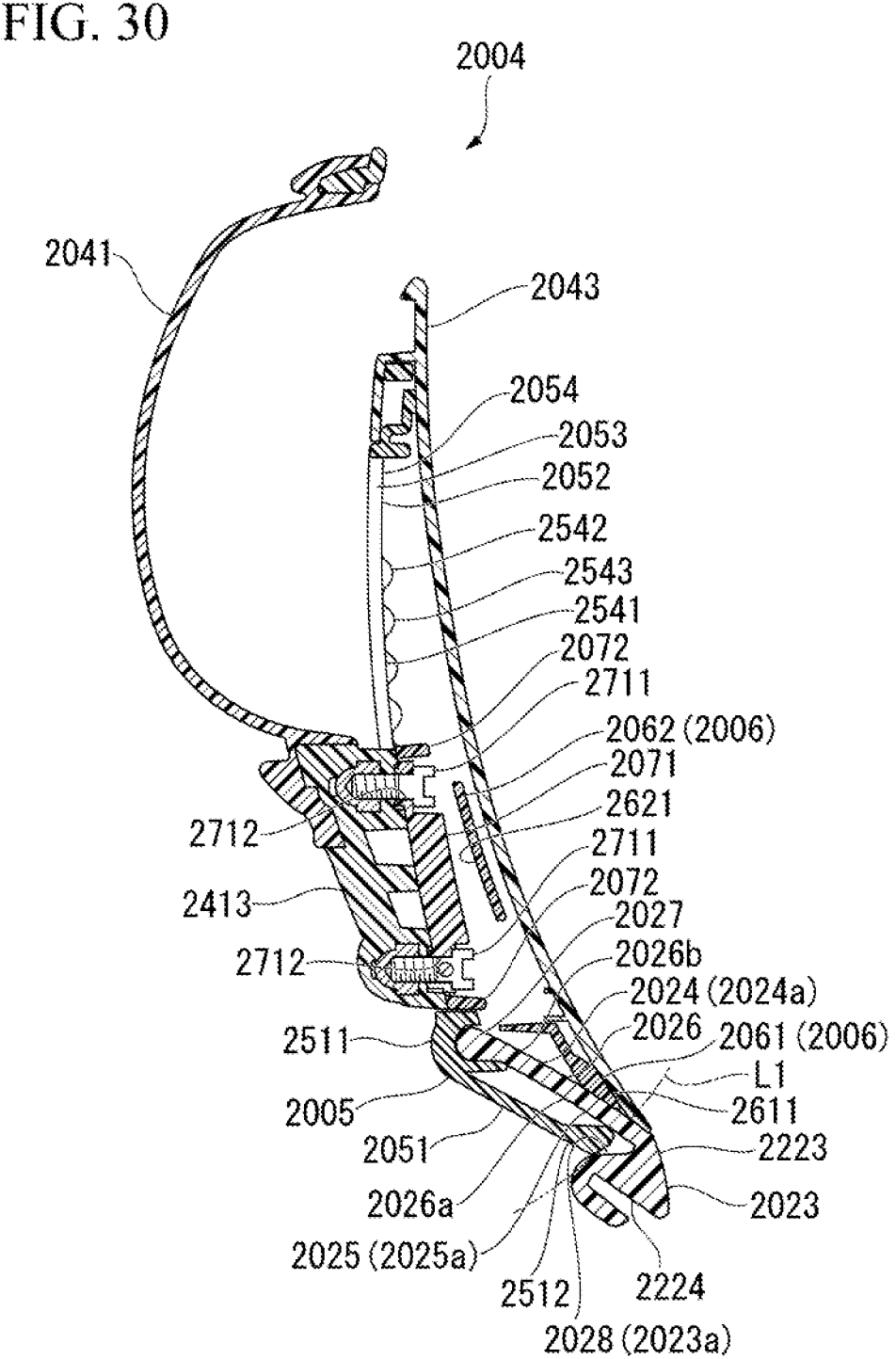
FIG. 30 is a cross-sectional view taken along a line G-G of FIG. 28.
Figure 31:
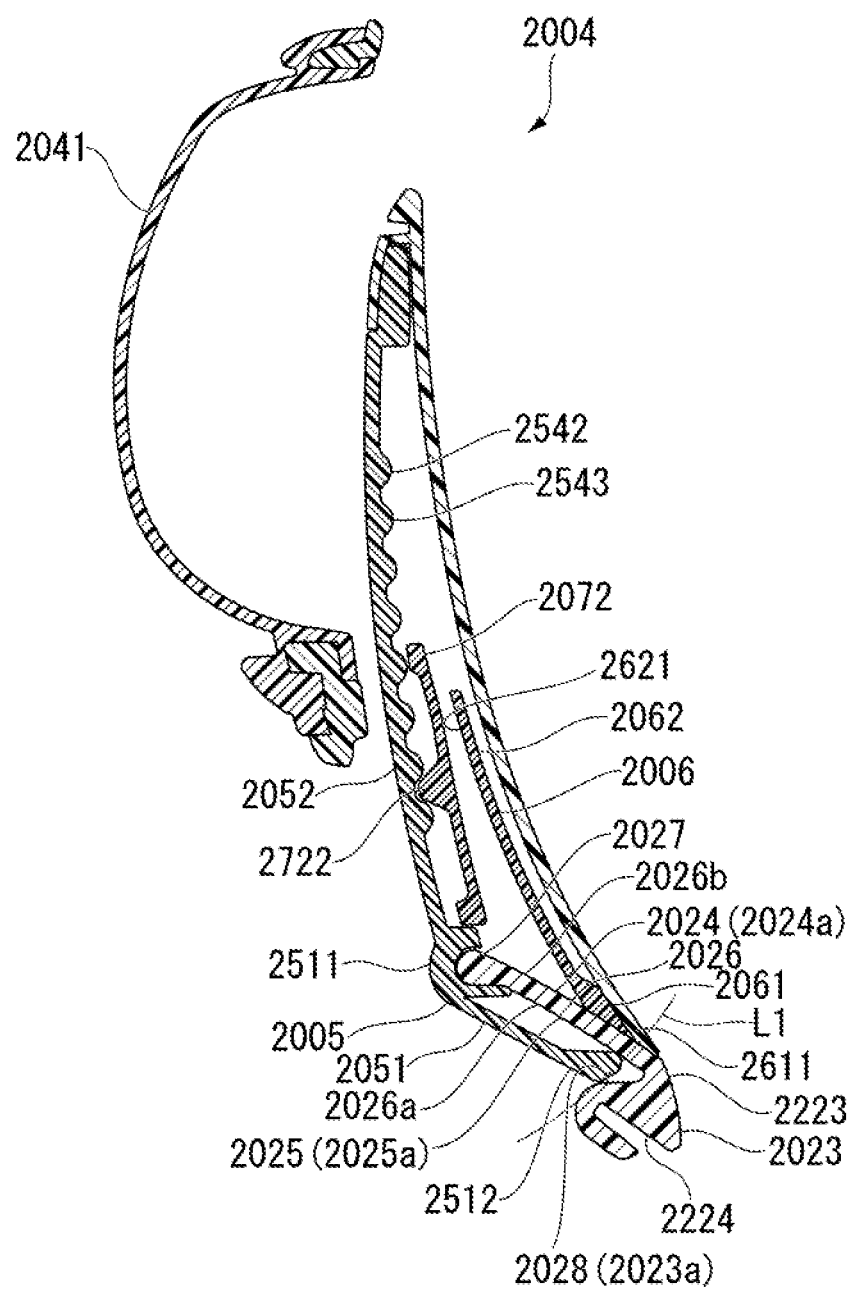
FIG. 31 is a cross-sectional view taken along a line H-H of FIG. 28.

As shown in FIGS. 30 to 32, the first extension portion 2051 is disposed, at the front side of the portion (first locking portion 2024a) formed at the intermediate portion of the protrusion portion 2024 of the lower frame member 2223 in the width direction of the lower frame member 2223, inside the portion (second locking portion 2025a) formed at the intermediate portion of the concave portion 2025 in the width direction of the lower frame member 2223, and.

The first extension portion 2051 includes a first contact portion 2511 which is disposed to contact the front surface and the lower surface of the bulging portion 2027 of the protrusion portion 2024 and a second engaged portion 2512 which gradually extends rearward from the first contact portion 2511 as it goes downward and is disposed inside the concave portion 2025.

The tip end portion of the second engaged portion 2512 contacts the inner surface of the concave portion 2025. Specifically, the tip end portion of the second engaged portion 2512 contacts the front surface 2026a of the plate-shaped portion 2026 of the protrusion portion 2024 and the rotation restraint surface 2028 (the upper surface 2023a of the base portion 2023) forming the concave portion 2025.

The rotation restraint surface 2028 is formed to intersect a locus L1 of the second engaged portion 2512 when the second engaged portion 2512 disposed inside the concave portion 2025 rotates forward about the bulging portion 2027.

As shown in FIGS. 29A to 29C, the first base portion 2052 is formed so that the width dimension gradually decreases upward. As shown in FIG. 32, two bolt holes 2521 are formed at the lower portion side of the first base portion 2052 with a gap therebetween in the width direction. Bolts 2522 which join the first base portion 2052 and a second base portion 2062 of the second attaching member 2006 to each other are inserted through two bolt holes 2521.

The rear surface of the first base portion 2052 is provided with first base portion side contact portions 2523 which contact second base portion side contact portions 2623 formed in the front surface of the second base portion 2062 of the second attaching member 2006.

The first base portion 2052 is appropriately provided with a back surface cover engagement portion (not shown) which engages with the back surface cover 2043.

As shown in FIGS. 29A to 29C and FIG. 30, in the first base portion 2052, a slit 2053 which extends in the vertical direction is formed at the substantially center portion in the width direction and a pair of guide walls 2054 are formed at both sides of the slit 2053 in the width direction.

As shown in FIG. 30, the arm portion 2413 of the lumber support main body portion 2041 is disposed at the front side of the slit 2053 and the guide wall 2054, and the height adjustment portion 2007 is disposed at the rear side of the slit 2053 and the guide wall 2054. The height adjustment portion 2007 and the arm portion 2413 of the lumber support main body portion 2041 are connected to each other through the slit 2053.

As shown in FIGS. 29A to 29C and FIG. 30, in each of the rear surfaces of the pair of guide walls 2054, a slide surface 2541 having a flat surface is formed at the inside in the width direction (on the side close to each other in the width direction), and a notch surface 2543, in which a plurality of notches 2542 protruding rearward are formed at intervals in the vertical direction, is formed at the outside in the width direction (on the side away from each other in the width direction).

As shown in FIGS. 29A to 29C, in the embodiment, four division slits 2551 are formed at intervals in the width direction in the first extension portion 2051 and the lower portion of the first base portion 2052 so as to penetrate the first extension portion 2051 and the lower portion of the first base portion 2052 in the front-rear direction. Each of four division slits 2551 extends from the lower end portion of the first extension portion 2051 (the tip end portion of the second engaged portion 2512) to the intermediate portion of the first base portion 2052 in the height direction. Since four slits are formed in the first extension portion 2051 and the lower portion of the first base portion 2052 at intervals in the width direction, these members are divided into five parts in the width direction. When each of five divided parts is defined as a division arm portion 2552, the first contact portion 2511 in each of five division arm portions 2552 is disposed to contact the front surface and the lower surface of the bulging portion 2027 of the protrusion portion 2024 (see FIGS. 30 to 32), and the second engaged portions 2512 in each of five division arm portions 2552 is disposed inside the concave portion 2025 (see FIGS. 30 to 32).

In two division slits 2551, among four division slits 2551, disposed at both ends in the width direction, hook opening portions 2553, each of which is opened to be wider than the width of the division slit 2551, are formed at a continuous portion between the first base portion 1122 and the first extension portion 1121 so as to be continuous to the two division slits 2551. Hook portions 2612 of the second attaching member 2006 to be described later (see FIGS. 33A to 33C) are disposed in the hook opening portions 2553.

Figure 33A:
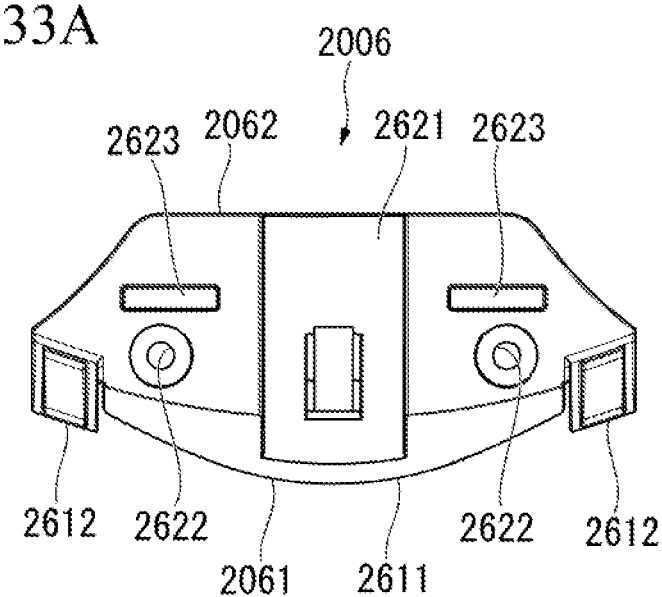
FIG. 33A is a front view showing a second attaching member according to the third embodiment of the present invention.
Figure 33B:
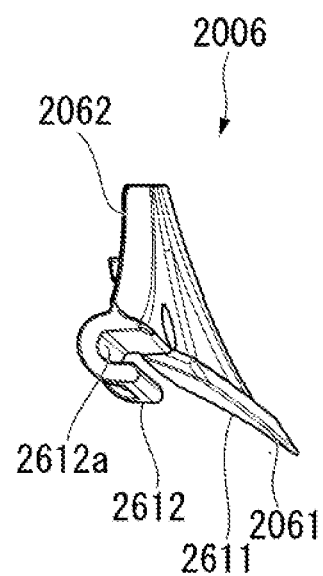
FIG. 33B is a side view showing the second attaching member according to the third embodiment of the present invention.
Figure 33C:
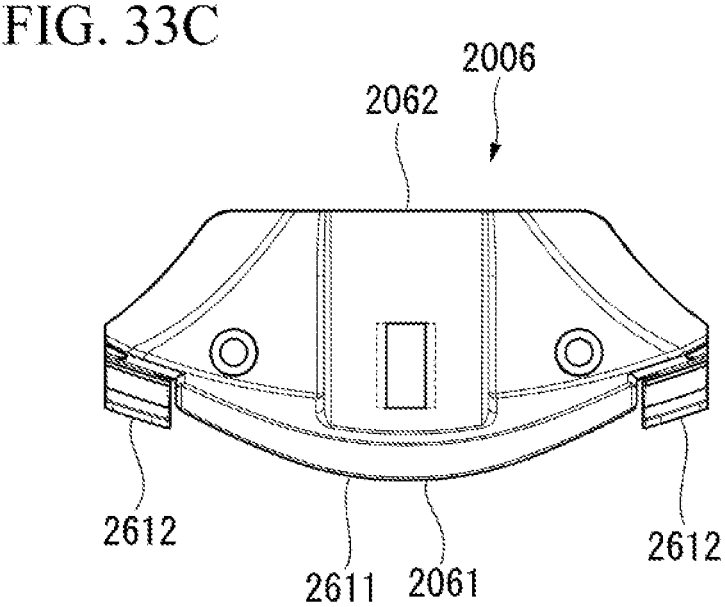
FIG. 33C is a rear view showing the second attaching member according to the third embodiment of the present invention.
Figure 34:
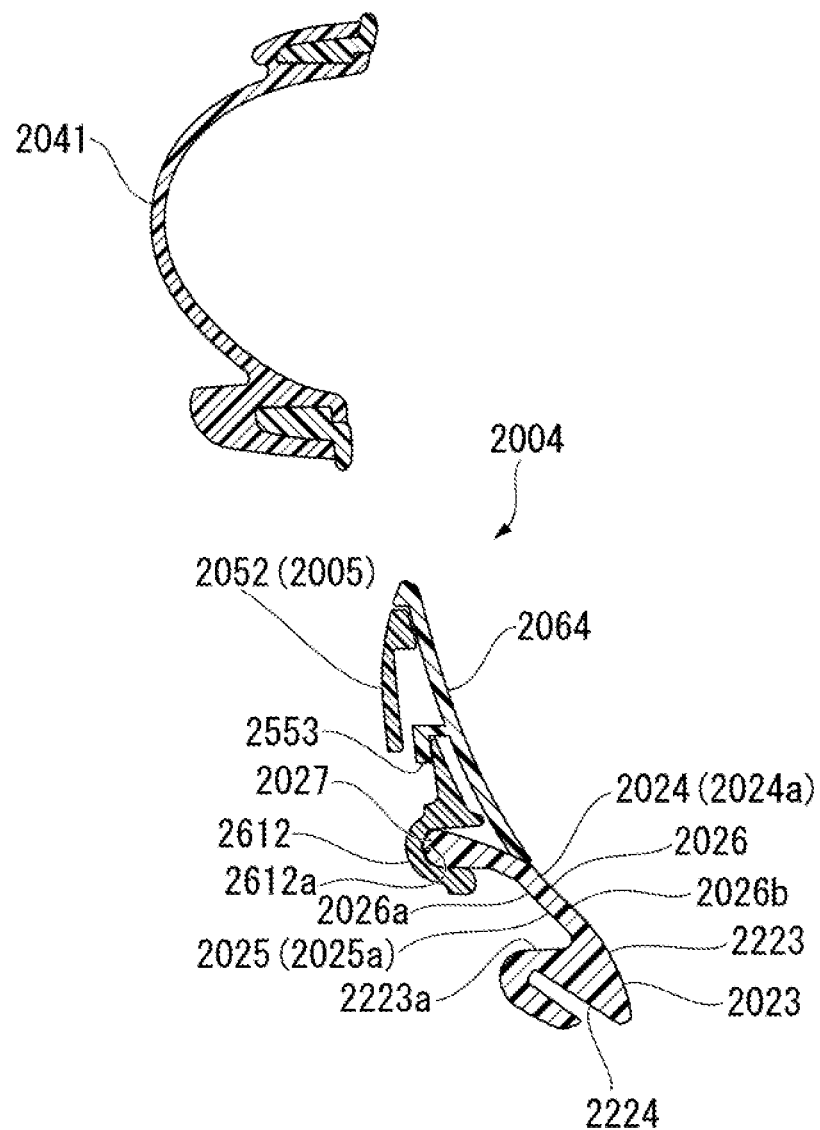
FIG. 34 is a cross-sectional view taken along a line J-K of FIG. 28.
Figure 35:
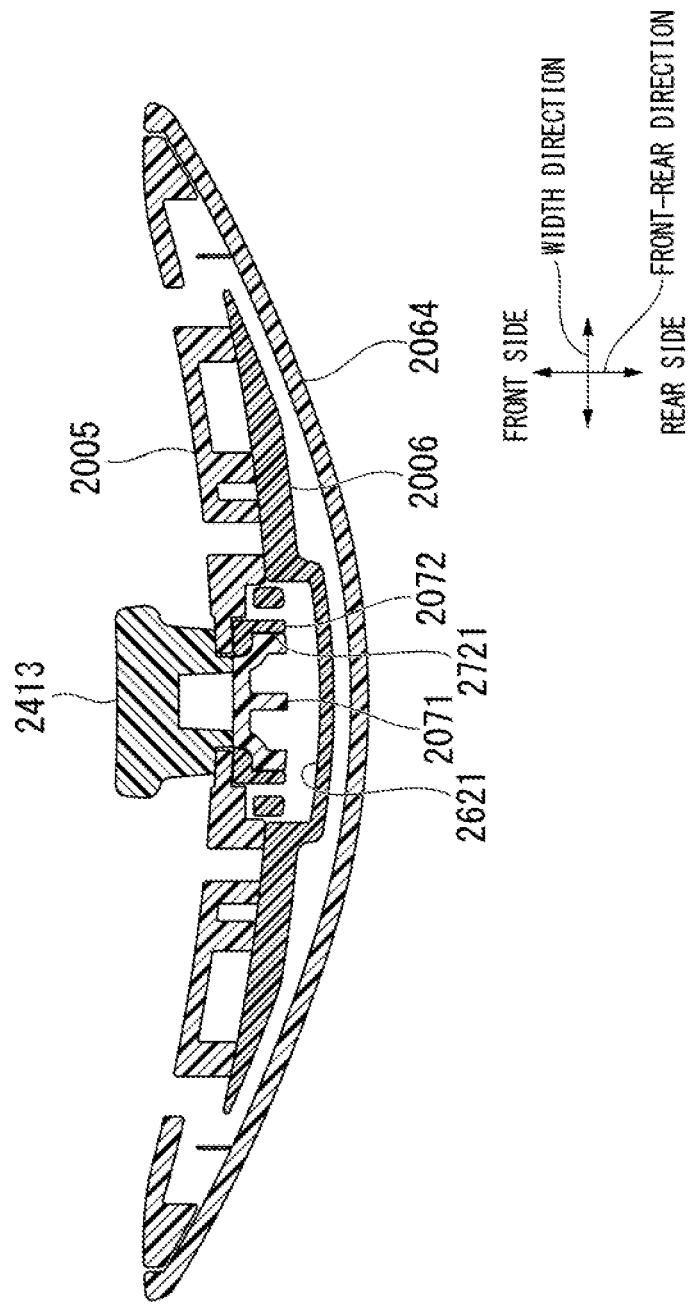
FIG. 35 is a cross-sectional view taken along the line J-K of FIG. 28.

As shown in FIGS. 33A to 33C, the second attaching member 2006 includes a second base portion 2062 which extends in the vertical direction and a second extension portion 2061 which extends, from the lower edge portion of the second base portion 2062, in an inclination direction gradually directed downward as it goes rearward.

As shown in FIGS. 30 to 32, the second extension portion 2061 is disposed along the rear surface 2026b of the plate-shaped portion 2026 of the portion (first locking portion 2024a) formed at the intermediate portion, in the width direction of the lower frame member 2223, of the protrusion portion 2024 of the lower frame member 2223. The second extension portion 2061 includes a second contact portion 2611 which is formed at the intermediate portion in the width direction and is disposed to contact the rear surface 2026b of the plate-shaped portion 2026 of the protrusion portion 2024 and hook portions 2612 which are formed at both end portions in the width direction and are caught by the bulging portion 2027 of the protrusion portion 2024 of the lower frame member 2223 (see FIGS. 33A to 33C and FIG. 34).

The upper end portions of the second contact portion 2611 and the hook portion 2612 are connected to the second base portion 2062. The second contact portion 2611 and the hook portion 2612 are not directly connected to each other.

As shown in FIG. 32, in each of both end portions of the second contact portion 2611 in the width direction, a front end portion contacts the upper surface of the bulging portion 2027 of the protrusion portion 2024 and a portion at the rear side of the front end portion contacts the rear surface 2026b of the plate-shaped portion 2026 of the protrusion portion 2024. The front end portion of the second contact portion 2611 contacts the first contact portion 2511 of the first attaching member 2005.

For this reason, both end portions, in the width direction, of the bulging portion 2027 of the protrusion portion 2024 are surrounded by the first contact portion 2511 and the second contact portion 2611, and the plate-shaped portion 2026 of the protrusion portion 2024 is sandwiched between the first contact portion 2511 and the second contact portion 2611 in the vertical direction. When the first attaching member 2005 and the second attaching member 2006 are joined to each other in this state, the first contact portion 2511 and the second contact portion 2611 are locked to the protrusion portion 2024. Here, both end portions, in the width direction, of both of the first contact portion 2511 and the second contact portion 2611 are defined as the first engaged portion 2063. The first engaged portion 2063 is provided with a concave portion 2631 which opens to the rear side to which the bulging portion 2027 is fitted.

Furthermore, the second contact portion 2611 does not contact the bulging portion 2027 of the protrusion portion 2024 although the center portion of the second contact portion 2611 in the width direction, except for both end portions in the width direction, contacts the rear surface 2026b of the plate-shaped portion 2026 of the protrusion portion 2024.

As shown in FIGS. 33A to 33C and FIG. 34, each hook portion 2612 is provided with a concave portion 2612a which opens rearward. The hook portions 2612 are disposed at the front side of the lower frame member 2223 and are caught at the front side of the bulging portion 2027 of the protrusion portion 2024 so that the bulging portion 2027 enters the concave portions 2612a. The hook portions 2612 which are disposed at the front side of the lower frame member 2223 are disposed inside the hook opening portions 2553 of the first attaching member 2005.

The second base portion 2062 is formed to be larger than the width dimension of the arm portion 2413 of the lumber support main body portion 2041 and to be smaller than the width dimension of the first base portion 2052 of the first attaching member 2005. The second base portion 2062 is formed so that the height dimension is smaller than that of the first base portion 2052. The second base portion 2062 is disposed to cover the lower portion of the first base portion 2052 from the rear side.

A groove portion 2621 which is recessed rearward is formed at the substantially center portion, in the width direction, of the front surface of the second base portion 2062 throughout the height direction. The groove portion 2621 is disposed at the rear side of the slit 2053 and the guide wall 2054 of the first base portion 2052.

The second base portion 2062 is provided with bolt holes 2622 through which bolts 2522 for connecting the first base portion 2052 and the second base portion 2062 to each other are inserted. The front surface of the second base portion 2062 is provided with the second base portion side contact portions 2623 which contact the first base portion side contact portions 2523 formed in the rear surface of the first base portion 2052 of the first attaching member 2005. Note that the first base portion side contact portion 2523 and the second base portion side contact portion 2623 may be formed in a plane shape or a shape fitting to each other.

The second base portion 2062 is appropriately provided with a back surface cover engagement portion (not shown) which engages with the back surface cover 2043.

As shown in FIGS. 30 and 31, the height adjustment portion 2007 is formed between a portion of the first base portion 2052 of the first attaching member 2005 where the slit 2053 and the guide wall 2054 are formed and a portion of the second base portion 2062 of the second attaching member 2006 where the groove portion 2621 is formed.

As shown in FIGS. 27, 30, and 31, the height adjustment portion 2007 includes a slide plate 2071 (see FIGS. 27 and 30) and a positioner 2072 which is joined to the outer peripheral portion of the slide plate 2071 as viewed in the front-rear direction.

The slide plate 2071 is formed in a substantially rectangular block shape whose outer shape is longer in the vertical direction as viewed in the front-rear direction. The slide plate 2071 is provided with bolt holes 2712 through which bolts 2711 are inserted to be joined to the arm portion 2413 of the lumber support main body portion 2041. The slide plate 2071 is slidable in the vertical direction along the pair of slide surfaces 2541.

The positioner 2072 is formed in a frame shape provided with an opening portion 2721 penetrating the positioner 2012 in the front-rear direction. The slide plate 2071 is fitted to the opening portion 2721 of the positioner 2072 (see FIG. 35). The positioner 2072 and the slide plate 2071 which are fitted to each other are disposed between the portion of the first base portion 2052 of the first attaching member 2005 where the slit 2053 and the guide wall 2054 are formed and the portion of the second base portion 2062 of the second attaching member 2006 where the groove portion 2621 is formed.

Projection portions 2722 which protrude forward are formed at both sides of the positioner 2072 in the width direction. The positioner 2072 is slidable in the vertical direction along the pair of notch surfaces 2543, and the projection portions 2722 are engageable with each of the plurality of notches 2542 of the notch surface 2543.

The height adjustment portion 2007 and the arm portion 2413 of the lumber support main body portion 2041 face each other with the slit 2053 and the guide wall 2054 of the first base portion 2052 interposed therebetween, and are connected to each other by the pair of upper and lower bolts 2711 penetrating the slit 2053. Accordingly, the arm portion 2413 and the height adjustment portion 2007 are slidable along the slit 2053 in the vertical direction. In the height adjustment portion 2007, the upward movement is regulated by the contact between the upper end portion of the positioner 2072 and the upper wall of the slit 2053, and the downward movement is regulated by the contact between the lower end portion of the positioner 2072 and the lower wall of the slit 2053. Accordingly, the movement range of the lumber support main body portion 2041 in the vertical direction is regulated.

When the height adjustment portion 2007 is disposed at the lower portion side of the movement region, the second base portion 2062 of the second attaching member 2006 is disposed at the rear side of the height adjustment portion 2007. When the height adjustment portion 2007 is disposed at the upper portion side of the movement region, the back surface cover 2043 is disposed at the rear side of the height adjustment portion 2007.

As the projection portions 2722 of the positioner 2072 of the height adjustment portion 2007 engage with the notch 2542 at a desired height, the arm portion 2413 and the height adjustment portion 2007 are fixed at a desired height among a plurality of height stages along the slit 2053. In this way, the lumber support main body portion 2041 can be disposed at a desired height.

The back surface cover 2043 includes an engagement portion (not shown) which is engageable with the back surface cover engagement portion of the second base portion 2062 and the back surface cover engagement portion of the first base portion 2052, and when the engagement portion engages with the back surface cover engagement portion of the first base portion 2052 and the back surface cover engagement portion of the second base portion 2062, the back surface cover 2043 is attached to the first attaching member 2005 and the second attaching member 2006.

Next, a method of attaching the lumber support 2004 to the lower frame member 2223 will be described.

First, the first attaching member 2005 and the second attaching member 2006 are attached to the lower frame member 2223.

The first attaching member 2005 is disposed at the front side of the lower frame member 2223, the first contact portion 2511 is brought into contact with the bulging portion 2027 of the protrusion portion 2024 of the lower frame member 2223, and the second engaged portion 2512 is inserted into the concave portion 2025 of the lower frame member 2223.

Figure 36:
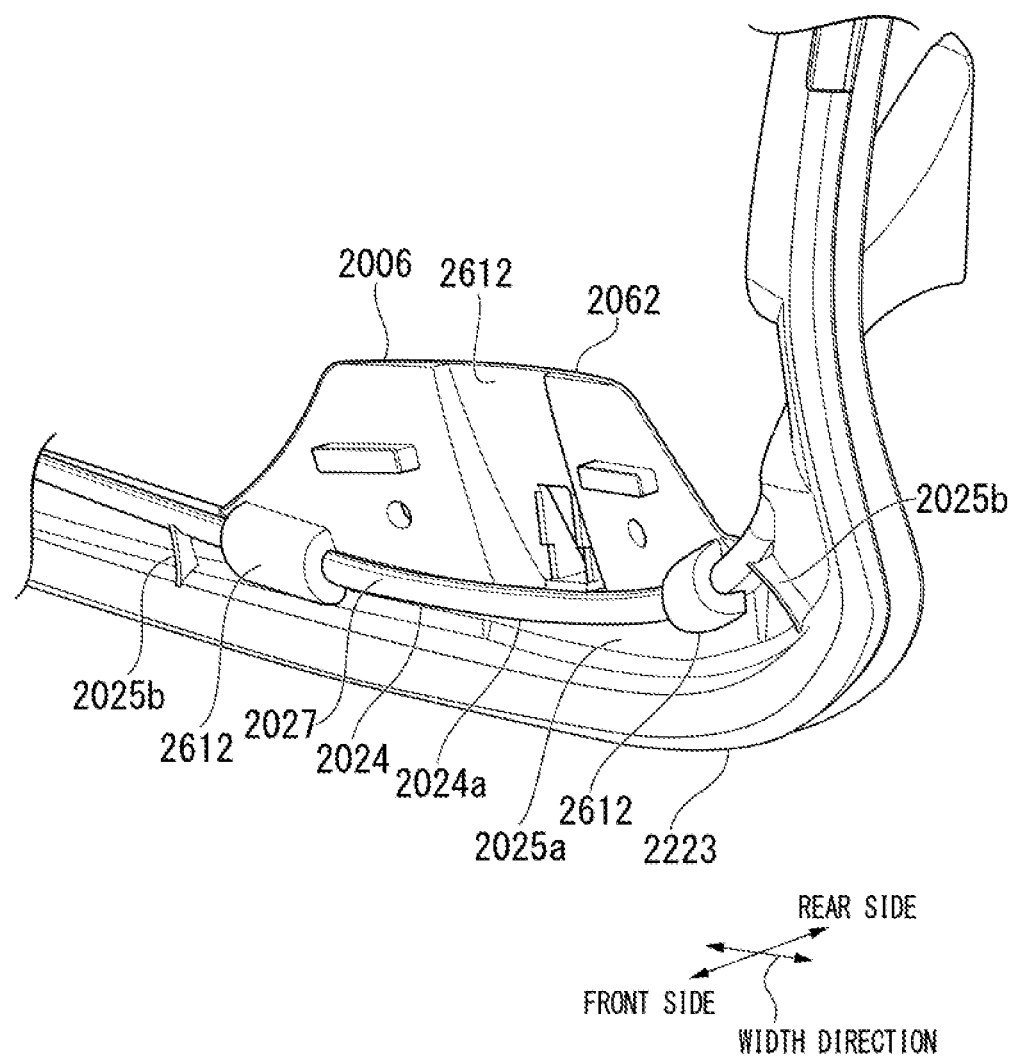
FIG. 36 is a diagram showing the second attaching member attached to the lower frame member according to the third embodiment of the present invention.
Figure 37:
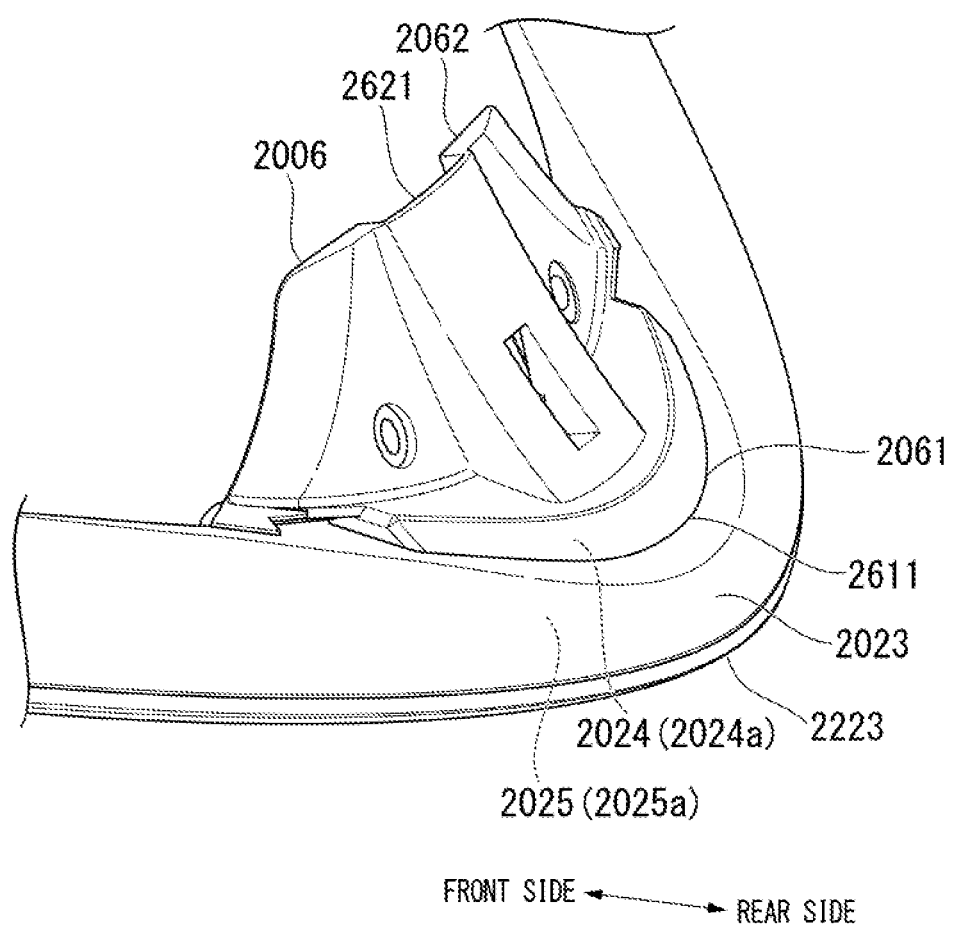
FIG. 37 is another diagram showing the second attaching member attached to the lower frame member according to the third embodiment of the present invention.

As shown in FIGS. 36 and 37, before or after the installation of the first attaching member 2005, the second attaching member 2006 is disposed at the rear side of the lower frame member 2223, and the second contact portion 2611 is brought into contact with the rear surface 2026b of the plate-shaped portion 2026 of the protrusion portion 2024 of the lower frame member 2223. Furthermore, the first attaching member 2005 is not shown in FIGS. 36 and 37.

Further, the hook portions 2612 of the second attaching member 2006 are caught at the front side of the bulging portion 2027 of the protrusion portion 2024 of the lower frame member 2223, and are disposed inside the hook opening portions 2553 of the first attaching member 2005.

Then, the first base portion side contact portions 2523 of the first base portion 2052 and the second base portion side contact portions 2623 of the second base portion 2062 are respectively brought into contact with each other in the front-rear direction, and the first base portion 2052 and the second base portion 2062 are fastened by the bolts 2522.

When the first attaching member 2005 and the second attaching member 2006 are joined to each other in this way, the positions of the first attaching member 2005 and the second attaching member 2006 are fixed and the first attaching member 2005 and the second attaching member 2006 are attached to the lower frame member 2223. At this time, the tip end portion of the second engaged portion 2512 is in contact with the upper surface 2023a of the base portion 2023 (the rotation restraint surface 2028).

Subsequently, the lumber support main body portion 2041 is attached to the first attaching member 2005 and the second attaching member 2006.

The lumber support main body portion 2041 is disposed at the front side of the slit 2053 of the first base portion 2052 and the height adjustment portion 2007 is disposed at the rear side of the slit 2053 of the first base portion 2052. Then, the height adjustment portion 2007 and the arm portion 2413 of the lumber support main body portion 2041 are joined to each other by the bolts 2711 through the slit 2053. The projection portions 2722 of the positioner 2072 of the height adjustment portion 2007 are caused to engage with the notch 2542 of the guide wall 2054.

Subsequently, the back surface cover 2043 is installed. The back surface cover 2043 is disposed at the rear side of the first base portion 2052 and the second base portion 2062 to engage with the first base portion 2052 and the second base portion 2062. Accordingly, the lumber support is attached to the backrest main body 2022.

In this way, the lumber support 2004 is attached to the lower frame member 2223.

Next, the operational effects of the backrest 2001 according to the embodiment will be described with reference to the drawings.

In the backrest 2001 according to the embodiment, when the seated person sitting on the chair 2011 leans against the backrest 2001, a rearward load is applied to the lumber support main body portion 2041 and the rearward load is applied from the lumber support main body portion 2041 to the attaching portion 2042.

Since the first engaged portion 2063 of the attaching portion 2042 sandwiches the protrusion portion 2024 of the first locking portion 2024a of the lower frame member 2223 and is locked to the protrusion portion 2024, the rearward displacement is restrained. For this reason, moment in a rotation direction about the bulging portion 2027 of the protrusion portion 2024 is applied to the attaching portion 2042. To a portion (upper portion) of the attaching portion 2042 on a side closer to a connection portion with the lumber support main body portion 2041 than the bulging portion 2027, a force caused by this moment is applied rearward, and to the second engaged portion 2152 corresponding to the opposite side thereof, the force is applied forward. Accordingly, the second engaged portion 2512 tries to rotate forward (to be separated from the concave portion 2025) about the bulging portion 2027 of the protrusion portion 2024.

In the embodiment, the rotation restraint surface 2028 is formed in the concave portion 2025 of the second locking portion 2025a into which the second engaged portion 2512 is inserted. As described above, the rotation restraint surface 2028 is formed to intersect the locus of the second engaged portion 2512 when the second engaged portion 2512 disposed inside the concave portion 2025 rotates forward about the bulging portion 2027. Accordingly, when the second engaged portion 2512 tries to rotate to be separated from the concave portion 2025 by a force caused by the moment, the rotation thereof is restrained by the contact with the rotation restraint surface and hence the separation of the second engaged portion 2512 from the concave portion 2025 is more reliably prevented. As a result, since it is possible to more reliably prevent the attaching portion 2042 from being separated from the lower frame member 2223, it is possible to more reliably prevent the lumber support 2004 from being separated from the lower frame member 2223.

The protrusion portion 2024 of the first locking portion 2024a gradually protrudes forward from the rear edge portion of the base portion 2023 as it goes upward. Accordingly, when a load is applied to the lumber support 2004 so that the load is applied to the protrusion portion 2024 from the front side, the protrusion portion resists the load. Further, both end portions of the protrusion portion 2024 are continuously connected to the protrusion portions 2221b of the pair of vertical frame members 2221. Accordingly, the load acting on the protrusion portion 2024 of the first locking portion 2024a is also transmitted to the protrusion portions 2221b of the pair of vertical frame members 2221. For this reason, it is possible to reliably support the lumber support even when a large load is applied from the lumber support 2004 to the protrusion portion 2024 of the first locking portion 2024a, and therefore it is possible to more reliably prevent the lumber support 2004 from being separated from the lower frame member 2223.

Further, the first engaged portion 2063 is fitted to the bulging portion 2027 of the protrusion portion 2024 from the front side and sandwiches the plate-shaped portion 2026 of the protrusion portion 2024 in the vertical direction. Accordingly, it is possible to more reliably prevent the first engaged portion 2063 from being separated from the protrusion portion 2024 due to the load applied to the lumber support main body portion 2041 from the front side to the rear side.

Further, since the first engaged portion 2063 includes the concave portion 2631 which is opened rearward and is fitted to the protrusion portion 2024 from the front side, the first engaged portion 2063 cam be easily and reliably locked to the protrusion portion 2024.

Further, since the attaching portion 2042 is composed of two members, that is, the first attaching member 2005 and the second attaching member 2006 respectively attached to the lower frame member 2223, the attaching portion 2042 can be easily attached to the lower frame member 2223. In the embodiment, since the first attaching member 2005 and the second attaching member 2006 can be connected to each other while the first attaching member 2005 is disposed at the front side of the lower frame member 2223 and the second attaching member 2006 is disposed at the rear side thereof, the attaching portion 2042 can be easily attached to the lower frame member 2223 as compared with a case in which an attaching portion is attached to the lower frame member 2223 while deforming one member.

Although the embodiment of the backrest according to the present invention has been described, the present invention is not limited to the above-described embodiment and can be appropriately modified without departing from the gist thereof.

For example, in the above-described embodiment, the attaching portion 2042 includes the first attaching member 2005 and the second attaching member 2006, but the attachment portion may be formed as one member including the first engaged portion 2063 and the second engaged portion 2512.

Further, in the above-described embodiment, the lumber support 2004 as the optional member is attachable to the lower frame member 2223, but an attaching portion having the same configuration as that of the attaching portion 2042 may be used when an optional member other than the lumber support 2004, such as a headrest or a hanger, is attached to the frame member of the backrest 2001.

In the embodiment, the optional member is configured to receive a load in a direction from the front side to the rear side in the front-rear direction, the direction of the load received by the optional member may be appropriately set as long as the direction is the surface perpendicular direction of the surface material 2003.

Further, in the above-described embodiments, the optional member is attached to the lower frame member 2223, but may be attached to the vertical frame member 2221 or the upper frame member 2222. Further, the protrusion portion 2024 and the concave portion 2025 may be formed in the vertical frame member 2221 or the upper frame member 2222.

Further, in the above-described embodiment, the protrusion portion 2024 of the first locking portion 2024a protrudes forward from the base portion 2023 as it goes upward. In contrast, the protrusion portion 2024 of the first locking portion 2024a may protrude upward from the base portion 2023 in the vertical direction.

Further, in the above-described embodiment, the first locking portion 2024a and the second locking portion 2025a are formed at the intermediate portion of the lower frame member 2223 in the width direction, but may be formed at the entire of the lower frame member 2223 in the width direction or a desired position of the lower frame member 2223 in the width direction.

INDUSTRIAL APPLICABILITY

According to the present invention, it is possible to improve workability at the time of attaching an optional member such as a lumber support to a backrest.

Further, according to the present invention, even when there is a difference in shape between an optional member and an attachment portion, it is possible to satisfactorily attach an attaching portion to an attached surface and to robustly maintain the attachment state between the optional member and the attachment portion.

Further, according to the present invention, it is possible to more reliably prevent an optional member from being separated from a frame member due to the moment caused by the load applied to the optional member.

REFERENCE SIGNS LIST

4 Seat body
7 Backrest
30 Support structure
71 Tensile material
71e Outer peripheral end portion
71f Load support surface
80F Back front frame (frame member)
80b Back surface
83 Connection portion
87 Attachment portion
88 Concave portion
100 Chair
200 Lumber support (optional member)
210 Lumber support main body
220 First bracket (first member)
223 Attaching portion
230 Second bracket (second member)
238 Bolt (connection member)
F Floor
S Gap
1010 Chair (furniture)
1100 Lumber support (optional member)
1102 Attaching portion
1104 Attachment structure (attachment structure for an optional member)
2001 Backrest
2003 Surface material
2004 Lumber support (optional member)
2005 First attaching member
2006 Second attaching member
2011 Chair
2023 Base portion
2024a First locking portion
2025a Second locking portion
2027 Bulging portion
2028 Rotation restraint surface
2041 Lumber support main body portion (main body portion)
2042 Attaching portion
2063 First engaged portion
2223 Lower frame member (frame member)
2512 Second engaged portion
2631 Concave portion
L1 Locus

The invention claimed is:

1. A backrest comprising:
a tensile material on which a load support surface configured to receive a load of a seated person is formed;
a frame member that supports an outer peripheral end portion of the tensile material;
an attachment portion which is formed in the frame member and faces the tensile material in a state where the attachment portion is separated from the tensile material in a direction intersecting the load support surface; and
an optional member that is attachable to and detachable from the attachment portion,
wherein the optional member includes an attaching portion which extends in a direction along the load support surface, is inserted into a gap between the tensile material and the attachment portion, and is fixed to the attachment portion, the attachment portion protrudes from the frame member along the load support surface, and the optional member includes:

a first member that includes the attaching portion;

a second member that is disposed on a side separated from the tensile material with respect to the attachment portion; and a connection member that connects the first member and the second member to each other in a state where the attachment portion is sandwiched between the attaching portion of the first member and the second member.

2. The backrest according to claim 1, wherein the frame member includes a concave portion which is disposed on a side facing the tensile material with respect to the attachment portion and accommodates the attaching portion.

3. The backrest according to claim 1, wherein the optional member is a lumbar support.

4. The backrest according to claim 3, wherein the lumbar support includes a lumbar support main body which is supported by the attaching portion and is disposed at a rear side of the tensile material.

5. The backrest according to claim 1, wherein the attaching portion is capable of being displaced so as to accord with a shape of an attached surface while contacting the attached surface, the attached surface which is a lower surface of the attachment portion.

6. The backrest according to claim 5, wherein the option member includes an optional main body which is attached to the attaching portion in a freely attachable and detachable manner.

7. The backrest according to claim 5, wherein a cutout which penetrates the attaching portion in a thickness direction of the attaching portion and extends from a center of the attaching portion toward an outer periphery of the attaching portion is formed in the attaching portion.

8. The backrest according to claim 7, wherein:

the cutout reaches the outer periphery of the attaching portion and opens outward from the outer periphery;

the attaching portion includes a plurality of division portions divided by the cutout; and each of the plurality of division portions is capable of being displaced so as to accord with the shape of the attached surface.

9. The backrest according to claim 5, wherein the attaching portion is integrally formed with the optional member and is elastically deformed to contact the attached surface.

10. A chair comprising:

a support structure which is installed on a floor;

a seat body which is supported by the support structure; and the backrest according to claim 1, the backrest being supported by the support structure.

11. A backrest comprising:

a surface material that is configured to receive a load of a seated person;

a frame member that supports an outer peripheral end portion of the surface material; and an optional member that is attached to the frame member and configured to receive a load applied from a first side to a second side in a surface perpendicular direction of the surface material, wherein the frame member includes:

a base portion which supports the surface material;

a first locking portion which protrudes from the base portion to the first side in the surface perpendicular direction, and has a bulging portion formed at a tip end portion of the first locking portion and bulging in relation to a base end side of the first locking portion; and a second locking portion which is surrounded by the base portion and the first locking portion, and is formed in a concave shape to open to the first side in the surface perpendicular direction, wherein the optional member includes:

a main body portion which is configured to receive a load applied from the first side to the second side in the surface perpendicular direction; and an attaching portion which is attached to the frame member and supports the main body portion, wherein the attaching portion includes:

a first engaged portion which is fitted to the bulging portion from the first side in the surface perpendicular direction and sandwiches the first locking portion in a direction perpendicular to the surface perpendicular direction; and a second engaged portion which is formed, on a side separated from the main body portion with respect to the first engaged portion, to be continuous with the first engaged portion, and is inserted into the second locking portion from the first side in the surface perpendicular direction, and wherein a rotation restraint surface is formed on an inner surface of the second locking portion, the rotation restraint surface intersecting a locus of the second engaged portion when the second engaged portion inserted into the second locking portion rotates about the bulging portion toward a direction separated from the second locking portion.

12. The backrest according to claim 11, wherein the attaching portion includes a first attaching member and a second attaching member that are connected to each other, the first engaged portion is provided in the first attaching member and the second attaching member, and the first locking portion is sandwiched between the first attaching member and the second attaching member, and the second engaged portion is provided in the first attaching member.

13. The backrest according to claim 11, wherein the first engaged portion includes a concave portion which opens to the second side in the surface perpendicular direction and is fitted to the first locking portion from the first side in the surface perpendicular direction.

* * * * *